(12) United States Patent
Rapparini

(10) Patent No.: US 11,801,950 B2
(45) Date of Patent: Oct. 31, 2023

(54) SYSTEM AND METHOD FOR PACKAGING POWDERS

(71) Applicant: ICA SPA, Bologna (IT)

(72) Inventor: Gino Rapparini, Bologna (IT)

(73) Assignee: ICA S.P.A., Bologna (IT)

( * ) Notice: Subject to any disclaimer, the term of this patent is extended or adjusted under 35 U.S.C. 154(b) by 234 days.

(21) Appl. No.: 16/330,970

(22) PCT Filed: Sep. 8, 2017

(86) PCT No.: PCT/IB2017/055425
§ 371 (c)(1),
(2) Date: Mar. 6, 2019

(87) PCT Pub. No.: WO2018/047108
PCT Pub. Date: Mar. 15, 2018

(65) Prior Publication Data
US 2019/0233140 A1 Aug. 1, 2019

(30) Foreign Application Priority Data

Sep. 8, 2016 (IT) .................. 102016000091025
Dec. 2, 2016 (IT) .................. 102016000122878

(51) Int. Cl.
*B65B 1/26* (2006.01)
*B65B 57/00* (2006.01)
(Continued)

(52) U.S. Cl.
CPC ............... *B65B 1/26* (2013.01); *B65B 1/12* (2013.01); *B65B 1/42* (2013.01); *B65B 37/10* (2013.01);
(Continued)

(58) Field of Classification Search
CPC .... B65B 1/12; B65B 1/26; B65B 1/42; B65B 37/10; B65B 39/005; B65B 57/00; B65B 2210/10; B65G 65/46; B65G 65/463
(Continued)

(56) References Cited

U.S. PATENT DOCUMENTS 2,142,990 A * 1/1939 Belcher ................. B65B 39/04
141/44
2,674,396 A * 4/1954 Peterson ................. B65B 1/18
141/183
(Continued)

FOREIGN PATENT DOCUMENTS

CA    895493    3/1972
CN  201406192    2/2010
(Continued)

OTHER PUBLICATIONS

International Search Report for corresponding International Application No. PCT/IB207/055426, dated Feb. 7, 2018; 5 pages.
(Continued)

*Primary Examiner* — Robert F Long
*Assistant Examiner* — Eduardo R Ferrero
(74) *Attorney, Agent, or Firm* — Fattibene and Fattibene, LLC; Paul A. Fattibene

(57) ABSTRACT

The present document presents a system and a method for packaging powders in containers (S) through a hopper (T) and a first tube (TC) connected to the hopper (T). Air is sucked both in the area of the first tube and in the area of the hopper. The powder is then drawn directly from inside the hopper thus keeping the flow rate and the degree of compacting of the system constant. Moreover, the powder sucked inside the first tube is thus compacted and can be
(Continued)

conveyed compacted towards the outlet. In this way it is possible to control the dosing of the product exiting from the system with high precision.

13 Claims, 34 Drawing Sheets

(51) Int. Cl.
  *B65B 1/12* (2006.01)
  *B65B 37/10* (2006.01)
  *B65B 1/42* (2006.01)
  *B65B 39/04* (2006.01)
  *B65G 65/46* (2006.01)
  *B65B 39/00* (2006.01)
  *B65B 31/04* (2006.01)

(52) U.S. Cl.
  CPC .............. *B65B 39/04* (2013.01); *B65B 57/00* (2013.01); *B65G 65/463* (2013.01); *B65B 31/044* (2013.01); *B65B 39/005* (2013.01); *B65B 2210/10* (2013.01)

(58) Field of Classification Search
  USPC ........................................................ 141/256
  See application file for complete search history.

(56) References Cited

U.S. PATENT DOCUMENTS

| | | | | | |
|---|---|---|---|---|---|
| 2,988,249 | A * | 6/1961 | Wahl | ...................... | B65B 37/10 222/404 |
| 3,047,034 | A * | 7/1962 | Sassmannshausen | ....................... | B65G 65/463 222/413 |
| 3,656,517 | A * | 4/1972 | Taylor | ...................... | B65B 1/363 141/1 |
| 3,664,385 | A * | 5/1972 | Carter | ....................... | B65B 1/12 141/12 |
| 3,822,809 | A * | 7/1974 | Foucault | ................. | B65G 33/24 222/71 |
| 3,879,917 | A * | 4/1975 | Bassendale | ............. | B65B 9/213 53/469 |
| 3,984,320 | A * | 10/1976 | Barefoot | ................. | B01D 29/25 210/406 |
| 4,084,390 | A * | 4/1978 | Schmachtel | ............... | B65B 1/22 53/511 |
| 4,162,148 | A * | 7/1979 | Furstenberg | ........ | B01D 46/0065 96/425 |
| 4,558,724 | A * | 12/1985 | Carlsson | .................. | B65B 39/04 141/286 |
| 4,703,782 | A * | 11/1987 | Henkel, Sr. | ................ | B65B 1/26 141/114 |
| 4,895,274 | A * | 1/1990 | Morimoto | ................. | B65B 1/12 222/181.2 |
| 5,042,539 | A * | 8/1991 | McGregor | ............... | B65B 37/00 141/114 |
| 5,327,947 | A * | 7/1994 | McGregor | ................ | B65B 1/08 100/145 |
| 5,333,762 | A * | 8/1994 | Andrews | ................. | B65G 65/46 198/671 |
| 5,581,984 | A * | 12/1996 | Domke | ...................... | B65B 1/28 53/167 |
| 5,720,550 | A * | 2/1998 | Akiyama | .................. | B65B 1/26 366/139 |
| 5,921,295 | A * | 7/1999 | Zelazny | .................. | B65B 39/00 141/286 |
| 5,988,234 | A * | 11/1999 | Wegman | .................... | B65B 1/12 141/93 |
| 6,021,821 | A * | 2/2000 | Wegman | .................... | B65B 1/12 141/129 |
| 6,024,141 | A * | 2/2000 | Wegman | .................... | B65B 1/12 141/129 |
| 6,056,025 | A * | 5/2000 | Wegman | .................... | B65B 1/12 141/70 |
| 6,098,677 | A * | 8/2000 | Wegman | .................... | B65B 1/12 141/256 |
| 6,102,088 | A * | 8/2000 | Wegman | .................... | B65B 1/12 141/256 |
| 6,155,028 | A * | 12/2000 | Nagata | .................. | B30B 15/302 141/71 |
| 6,318,418 | B1 * | 11/2001 | Grossmann | ............... | B65B 1/28 141/286 |
| 6,340,036 | B1 * | 1/2002 | Toyoizumi | ................ | B65B 1/12 141/275 |
| 6,497,259 | B1 * | 12/2002 | Wegman | .................... | B65B 1/12 141/256 |
| 6,688,345 | B1 * | 2/2004 | Iglesias | .................... | B65B 37/10 141/256 |
| 7,004,210 | B1 * | 2/2006 | Wegman | .................... | B65B 1/12 141/256 |
| 7,028,448 | B2 * | 4/2006 | Engesser | .................... | B65B 1/12 141/256 |
| 7,137,759 | B1 * | 11/2006 | Ambs | ..................... | B65G 37/00 406/55 |
| 2003/0230353 | A1 * | 12/2003 | Schlosser | ................. | B65B 1/28 141/286 |
| 2004/0011425 | A1 * | 1/2004 | Wegman | ............ | G03G 15/0877 141/311 A |
| 2004/0237543 | A1 * | 12/2004 | Auer | ....................... | C09C 3/041 62/64 |
| 2005/0184103 | A1 * | 8/2005 | Palma | .................... | B65G 65/46 222/413 |
| 2006/0163283 | A1 * | 7/2006 | Grady | ................... | F27D 1/1626 222/168 |
| 2007/0131707 | A1 * | 6/2007 | Poole | ........................ | B65B 1/30 222/14 |
| 2007/0294982 | A1 * | 12/2007 | Knoke | ...................... | B65B 1/36 53/451 |
| 2009/0020563 | A1 * | 1/2009 | Morimoto | ................. | B65B 1/12 222/413 |
| 2012/0180435 | A1 * | 7/2012 | Stelluti | ..................... | B65B 1/24 53/469 |
| 2014/0000758 | A1 * | 1/2014 | Kuhn | ........................ | B65B 9/20 141/37 |
| 2014/0238536 | A1 | 8/2014 | Kumakura | ....................... | 141/67 |
| 2016/0325939 | A1 * | 11/2016 | Walton | ................. | B65G 65/463 |
| 2018/0178931 | A1 * | 6/2018 | Seno | ....................... | B65B 39/12 |
| 2019/0077531 | A1 * | 3/2019 | Trebbi | .................... | B65B 65/02 |
| 2019/0118981 | A1 * | 4/2019 | Kuss | ..................... | B65B 51/146 |

FOREIGN PATENT DOCUMENTS

| | | |
|---|---|---|
| DE | 2553879 | 6/1977 |
| DE | 2555347 | 6/1977 |
| DE | 2906314 | 8/1979 |
| EP | 2765099 | 8/2014 |
| JP | 2004091011 | 3/2004 |
| JP | 2006341449 | 12/2006 |
| SU | 203537 | 9/1967 |

OTHER PUBLICATIONS

English translation of Russian Office Action and Search Report dated Feb. 7, 2020 in corresponding Russian application No. 2019105799/10(011029); 6 pages.

* cited by examiner

SYSTEM AND METHOD FOR PACKAGING POWDERS

TECHNICAL FIELD

The present invention concerns the field of packaging of powders. In particular, the present invention concerns a system for packaging powders. Moreover, the present invention concerns a method for packaging such powders.

BACKGROUND

Packages containing powdered materials like for example flour are found on the market in extremely large quantities. Industrially, screw conveyors are used to convey the powdered material inside the package where it will be enclosed. The optimisation of the filling process of such packages is demanding since a powdered material has an amount of air inside it that thus increases the volume thereof and makes precise weighing thereof difficult.

In many cases, in feeding systems it is important to remove the air from inside the product to be dosed. The removal of the air can indeed allow the volume of product to be transported (for the same weight) to be reduced. Moreover, the removal of air from inside the product to be dosed can allow the organoleptic properties of the product to be kept for longer and therefore can increase the lifetime of the product by preventing, for example oxidation processes. Therefore, for this purpose, the food industry often uses deaerators, both horizontal and vertical. The deaeration process allows the elimination of the air incorporated in the powder and therefore allows packages to be made that for the same volume are heavier. The operating principle is based on the continuous extraction of the air existing, under normal conditions, between the particles of product, through the creation of vacuum inside the tube for conveying the powders inside the machine. Through such a technique, the problem of packaging even very light and very volatile powders is thus solved. Such a solution does not, however, solve the problem of obtaining precise dosing. The flow rate of powders inside the conveying tube is subject to substantial variations due to the fact that the powders, even if compacted, are not homogeneous but rather are in discontinuous or non-homogeneous blocks.

Therefore, in light of what is described above, the present invention tackles the problem of allowing powders to be packaged with high precision in the dosing of the product.

SUMMARY

The present invention is based on the idea of making a vacuum area inside the tube where the powder is transported and inside the hopper. Given that the vacuum area extends to inside the hopper, the flow of powder is effectively drawn, the powder is effectively compacted and the flow rate is kept constant, thus allowing the dosing of the product to be controlled with high precision. In the present invention, the terms "above", "below", "lower", and "upper", unless specified otherwise, refer to the condition of the various elements considering a section view of the final architecture of the packaging system in which the package occupies the lowest level. The terms "downstream" and "upstream" refer to the direction of the flow of powdered material towards the package in which it is packaged.

According to an embodiment of the present invention, a system for packaging powders is provided comprising a hopper adapted for receiving the powders and a first tube comprising an inlet connected to the hopper, wherein the first tube internally comprises an screw conveyor configured so as to rotate about an axis inside the first tube so as to convey the powders towards an outlet of the first tube, wherein the first tube is made of filtering material and is arranged inside a second tube so as to make a gap between the first tube and the second tube, wherein the gap is configured so as to be able to be sealed and wherein the second tube comprises a first opening configured to be able to suck air from the gap and from the hopper. The packaging system according to this embodiment makes it possible to suck the air contained inside the hopper and the first tube through its outer surface. Through such suction the powder is drawn directly from inside the hopper thus keeping the flow rate constant. Moreover, the powder sucked inside the first tube is uniformly compacted and the screw conveyor can thus convey the compacted powder towards the outlet. In this way, it is possible to very precisely control the dosing of the product exiting the system according to this embodiment of the invention.

According to a further embodiment of the invention, a system for packaging powders is provided in which the first opening of the second tube is positioned close to the inlet of the first tube, for example a first distance from the inlet of the first tube less than half of the total length of the first tube. This embodiment makes it possible to remove air from inside the first tube close to the inlet of the tube connected to the hopper. In this way, the suction of air from inside the hopper is promoted and made more effective. According to further embodiments, the distance of the first opening from the inlet of the first tube is less than ⅓ of the total length of the first tube, even more preferably less than ¼, ⅕, ⅙, ⅐, ⅛, ⅑ or ⅒ of the total length of the first tube.

According to a further embodiment of the invention, a system for packaging powders is provided in which the first opening is connected to a vacuum pump. This makes it possible to remove large amounts of air from the gap so as to be able to form a large vacuum area. For example, the suction pressure of the vacuum pump can be of the order of a tenth of a bar, for example it can be in the range from 0.2 bar to 0.6 bar.

According to a further embodiment of the invention, a system for packaging powders is provided further comprising a pressure sensor positioned inside the hopper so as to be able to adjust the vacuum pump based on the detected measurement. This solution is advantageous since, through the control of the pressure sensor, which can for example be a depression sensor, it makes it possible to have a constant flow rate inside the screw conveyor.

According to a further embodiment of the invention, a system for packaging powders is provided in which the pressure sensor positioned inside the hopper is connected to a controller for controlling the pressure. This solution is particularly advantageous since it makes it possible to automatically adjust the pressure level inside the hopper from the signal detected by the pressure sensor, and thus to adjust the pressure according to a predetermined depression value so as to obtain a constant flow rate of powders. For example, such a pressure sensor can preferably be a depression sensor configured so as to detect a pressure difference with the outside.

According to a further embodiment of the invention, a system for packaging powders is provided in which the depression sensor is positioned a vertical distance from the upper end of the first tube greater than half of the height of the hopper, more preferably greater than ¾ of the height of the hopper. This solution is particularly advantageous since it makes it possible to detect the depression in a position in which it can be measured whether the powders are actually "sucked" inside the first tube and thus whether there is a constant flow rate.

According to a further embodiment of the invention, a system for packaging powders is provided in which the second tube comprises a second opening to be able to blow air inside said gap. The air blown makes it possible to partially compensate for the air sucked through the first opening so as to be able to control the degree of compacting of the powders inside the first tube. In this way, it is possible to keep the degree of compacting constant, equal to a predetermined degree of compacting. Indeed, it has been observed that in the case of excessive compacting of the powders through suction from the first opening, the advancing of the powders in the system could be blocked. Thanks to the presence of the second opening it is thus possible to partially compensate for the suction effect from the first opening and precisely control the degree of compacting of the powders. The air blown can for example be air at atmospheric pressure. This second opening is preferably connected to a valve which can be directly connected with the atmosphere or to a chamber with controlled atmosphere. In the first case there is the advantage of having lower costs whereas in the second case there will be the possibility of actively controlling the type of gas inserted inside the gap. However, in both cases the pressure will preferably be equal to atmospheric pressure or less so as not to require the presence of a compressor. Indeed, thanks to the depression that is created inside the gap due to the suction of air, the air at atmospheric pressure (in the case of opening of the valve) will be drawn inside the gap thus adjusting the degree of compacting of the powders.

According to particularly advantageous embodiments of the present invention, the air that is introduced through the second opening can be replaced by a controlled gas atmosphere, preferably inert gases, even more preferably a single inert gas, for example nitrogen. This solution is particularly advantageous because it makes it possible to effectively control the amount of oxygen present inside the system. Indeed, in many cases it is preferable to decrease as much as possible the amount of oxygen contained inside the packages so as to keep the organoleptic properties of the product. Having an opening from which the air contained inside the powders is removed and an opening through which a controlled gas atmosphere can be introduced, makes it effectively possible to remove much of the oxygen contained in the powders sucking a large amount of air. Moreover, it makes it possible to partially compensate for such removal of air through the insertion of an inert gas, which for example ensures the regular rotation of the screw conveyor C that would otherwise be blocked by the excessive degree of compacting of the powders.

According to a further embodiment of the invention, the air blown through the second opening is cold air, for example with a temperature comprised between 15° C. and 30° C. The temperature inside the first tube tends to rise by friction, which for example can occur between the screw conveyor and the compacted powders or also between the first tube (which is made of filtering material and thus rough) and the compacted powders. The cold air blown thus allows the temperature inside the first tube to be reduced. In this way, it is possible to prevent an overheating of the system (which can occur at a temperature of the mechanical members above 50-60° C.) but particularly it is possible to protect the quality of the powdered material from possible deterioration due to high temperatures.

According to a further embodiment of the invention, a system for packaging powders is provided further comprising a pressure sensor positioned inside the gap and configured so as to be able to adjust the amount of air blown through the second opening based on the detected pressure value. This solution is particularly advantageous since it makes it possible to prevent excessive compacting of the powders. Preferably, such control from the pressure detected by the pressure sensor (which can for example be a depression sensor) can be combined with the control from the temperature detected so as to have a single controller capable of adjusting the amount of air blown both from the depression and from the temperature detected.

According to a further embodiment of the invention, the air blown through the second opening is dry air, for example it can have a relative humidity comprised between 30% and 50%. Dry air allows the product not to be loaded with moisture avoiding hardening it.

According to a further embodiment of the invention, a system for packaging powders is provided in which the second opening is positioned close to the outlet of the first tube, for example a distance from the inlet of the first tube greater than half of the total length of the first tube. This solution makes it possible to blow the cold air into the gap directly close to the outlet of the tube so as to be able to cool the outer surface of the first tube along most of its length. According to further embodiments of the present invention, the distance of the second opening from the inlet of the first tube is preferably greater than ⅔ of the total length of the first tube, even more preferably greater than ¾ of the total length of the first tube, even more preferably greater than ⅘ of the length of the first tube and even more preferably greater than ⅚ of the length of the first tube.

According to a further embodiment of the invention, a system for packaging powders is provided in which the second opening is connected to a regulator. This makes it possible to precisely adjust the amount of air blown inside the cavity according to the desired degree of compacting of the powders, keeping it constant. Therefore, by adjusting the amount of air blown through such a regulator, it is possible to obtain a constant flow rate irrespective of what the required degree of compacting is.

According to a further embodiment of the invention, a system for packaging powders is provided in which inside the second tube there is a spiral configured so as to convey air from the second opening to the first opening. The definition of a path of the air inside the second tube makes it possible to effectively convey the air blown inside the gap on a large portion of the outer surface of the first tube.

According to a further embodiment of the invention, a system for packaging powders is provided further comprising one or more temperature detectors to detect the temperature of one or more components of the system. The system can advantageously be configured to adjust one or more of the physical parameters of the air or of the gas introduced through the second opening based on the detected temperature. For example, the temperature of the air introduced can be adjusted based on the temperature detected. Moreover, for example, the pressure or the relative humidity of the air introduced can also be adjusted based on the temperature detected.

According to a further embodiment of the invention, a system for packaging powders is provided in which a shutter is arranged at the outlet of the first tube. The shutter makes it possible to control the dosing of the product with high precision. For example, if, due to the high degree of compacting and/or the depression inside the first tube, a part of the powders exiting from the first tube remains anchored to it and does not detach by gravity, through the shutter it is possible to extremely precisely cut the amount of compacted powder to be inserted inside the package arranged at the outlet of the first tube. As an example, such a shutter can be formed by a pair of plates which make it possible to effectively cut the amount of powder as well as ensure closure of the tube. Therefore, the loss of product in the passage from one package to be filled to the next is avoided.

According to a further embodiment of the invention, a system for packaging powders is provided in which the shutter is formed by a pair of opposite plates. Such a solution is particularly advantageous since such a type of closure is quicker with respect to the case in which the shutter is made up of a single plate. This is because with a pair of plates the distance travelled by each plate is half. Moreover, a second advantage concerns the fact that with a pair of plates the problem of the movement of the remainder in outlet is prevented. Indeed, in the case in which there is a single plate, the remainder in outlet, not having a counter-resistance, would be moved along the closing direction of the plate. On the other hand, having a pair of plates, the product deviated laterally by one plate meets the product deviated by the other plate, which arrives in the opposite direction. Therefore, a counter-resistance is thus formed that makes it possible to centrally deviate the product moved by each of the two plates, and allows the cut product to be made to fall to the center of the container. Therefore, with such a shutter system formed by a pair of opposite plates there are both of the advantages described above.

According to a further embodiment of the invention, a system for packaging powders is provided in which a rotatable terminal is arranged at the outlet of the first tube; the rotatable terminal internally comprises cutting means configured so as to cut the compacted powders exiting from the first tube when the rotatable terminal rotates.

According to a further embodiment of the invention, a system for packaging powders is provided in which a conical terminal is arranged at the outlet of the first tube. This, thanks to the conical shape, makes it possible to effectively convey the compacted powders inside the package arranged at the outlet of the first tube.

According to a further embodiment of the invention, a system for packaging powders is provided in which the conical terminal has a plurality of grooves on its outside. This, through convection, makes it possible to effectively cool also the compacted powder present inside the first tube at the conical terminal.

According to a further embodiment of the invention, a system for packaging powders is provided in which the first tube is made of sintered porous metal, for example steel, copper alloy or nickel alloy, with high uniformity of the pores. An example of such a material is PORAL® of Sintertech. A metallic material like for example steel or bronze provides good rigidity. This characteristic is advantageous given that the first tube internally has a movement member such as the screw conveyor which conveys the compacted powders.

According to a further embodiment of the invention, a system for packaging powders is provided in which the first tube made of filtering material has a filtering fineness proportioned to the minimum dimension of the grain size of the powder to be packaged. This makes it possible to have a vast range of usable powders. For example, the filtering fineness can be adapted for filtering up to 99.9% of powders having a diameter greater than or equal to 35.0 µm, 26.0 µm, 20.0 µm, 14.0 µm, 12.0 µm, 13.0 µm, 8.6 µm, 7.5 µm, 6.0 µm, 5.0 µm, 3.6 µm, 3.0 µm, 2.3 µm, 1.2 µm, 1.0 µm or 0.5 µm.

According to a further embodiment of the invention, a system for packaging powders is provided in which the second tube comprises a third opening to be able to feed the gap with pressurised air. This makes it possible to prevent long stopping periods of the system caused by possible clogging, for example by the clogging of the first tube. A clogged condition of the system can be effectively solved by feeding the third opening with pressurised air.

According to a further embodiment of the invention, a system for packaging powders is provided in which the dimensions of the system and of its components can be enlarged and reduced proportionally. This solution is particularly advantageous since it makes it possible to use it both for small and large amounts of material to be inserted in each package.

According to an embodiment of the present invention, a system for packaging powders is provided in which the first tube is connected to an extension tube positioned downstream of the first tube; wherein the screw conveyor extends longitudinally in the extension tube.

According to an embodiment of the present invention, a system for packaging powders is provided in which the system comprises a rotatable terminal close to the outlet of the extension tube; the rotatable terminal internally comprises cutting means configured so as to cut the compacted powders exiting from the extension tube when the rotatable terminal rotates. This solution is particularly advantageous since it makes it possible to cut the powders exiting from the extension tube and to obtain more precise dosing of the product exiting from the screw conveyor. This is because, due to the high degree of compacting and/or the depression inside the first tube, a part of the powders exiting from the first tube remains anchored to it and does not detach by gravity. Through the cutting means it is thus possible to extremely precisely cut the amount of compacted powder to be inserted inside the package arranged at the outlet of the first tube. This solution, moreover, thanks to the fact that the powders are cut through the rotation of the rotatable terminal, makes it possible not to have to use cutting means positioned externally and thus occupying much more space.

According to a further embodiment of the present invention, a system for packaging powders is provided in which the extension tube is arranged inside a rotatable tube; wherein the rotatable tube is rotatable about the extension tube; wherein the rotatable terminal is connected to the rotatable tube so as to be able to rotate with it. This makes it possible to control the rotation of the rotatable terminal, and thus of the cutting means contained inside it, through the rotation of the second tube. This solution is particularly advantageous since it makes it possible to adjust the rotation of the cutting means at any point of the rotatable tube. Therefore, in this way it is possible to adjust the rotation in a position also distant from the cutting means and thus not disturbing the cutting means. Moreover, the second tube can be replaced by any other structure capable of connecting the rotatable terminal with the upper flange, like for example a grid. A further alternative is represented by a system of rods capable of mechanically connecting the rotatable terminal with the upper flange.

According to a further embodiment of the present invention, a system for packaging powders is provided in which the extension tube and the rotatable tube are concentric. This solution is advantageous since it makes it possible to have a particularly compact system since, as stated, it is formed by two concentric tubes.

According to a further embodiment of the present invention, a system for packaging powders is provided in which the cutting means are a plurality of wires arranged like a fan. This solution is particularly advantageous since it allows the compacted powders to be cut by carrying out a rotation of the rotatable terminal and in the same way there is no need to make the rotatable terminal go back to the starting position after having carried out said cutting.

According to a further embodiment of the present invention, a system for packaging powders is provided in which the center of the fan coincides with the axis of the extension tube. This solution is particularly advantageous since it makes it possible to have a symmetrical cut and thus to have cutting means that occupy an amount of space that can be reduced to the point of having a diameter equal to the diameter of the extension tube.

According to a further embodiment of the present invention a system for packaging powders is provided that further comprises a vertical packager comprising a forming tube configured so as to receive a film coming from a reel; the forming tube internally contains the extension tube. This solution is particularly advantageous since it makes it possible to obtain a system for packaging powders having both a high packaging speed thanks to the vertical packager and a high precision in the dosing of the powders exiting from the first tube thanks to the cutting means.

According to a further embodiment of the present invention a system for packaging powders is provided in which the extension tube and the forming tube are concentric. This solution is particularly advantageous since it makes it possible to have a system of packaging compacted powders having three concentric tubes and therefore symmetrical and particularly compact. Such a system is both capable of cutting the powders effectively and of conveying the aforementioned powders inside packages made through such a vertical packager.

According to a further embodiment of the present invention, a system for packaging powders is provided in which the forming tube has at least one opening configured so as to be able to blow gas inside the forming tube. Such a solution has two particular advantages: the first concerns the possibility of compensating for the depression inside the package preventing possible damage to it, and the second advantage concerns the possibility of cooling the tubes by introducing particularly cold gas.

According to a further embodiment of the present invention, a system for packaging powders is provided in which the opening is positioned close to the upper edge of the forming tube. This provision is particularly advantageous since it makes it possible not to hamper the unwinding of the reel on the outer surface of the forming tube.

According to a further embodiment of the present invention, a system for packaging powders is provided in which the forming tube internally contains the rotatable tube.

According to a further embodiment of the present invention a system for packaging powders is provided in which the rotatable terminal comprises an inner opening concentric with the extension tube so as to convey the powders through the opening; wherein the cutting means are positioned inside the opening. This solution makes it possible to have cutting means around which the compacted powders are conveyed. This thus makes it possible to have cutting means in direct contact with the compacted powders and thus makes it possible to effectively cut said powders. Moreover, this solution also makes it possible not to need to use cutting means positioned externally and thus occupying more space.

According to a further embodiment of the present invention, a system for packaging powders is provided in which the inner opening of the rotatable terminal has a maximum diameter equal to the inner diameter of said first tube.

According to a further embodiment of the present invention a system for packaging powders is provided in which the inner opening of the rotatable terminal is cylindrical in shape, wherein the axis of the cylinder coincides with the axis of the screw conveyor. This solution has the advantage of having a constant section through which the compacted powders are conveyed, thus not having problems of obstruction.

According to a further embodiment of the present invention, a system for packaging powders is provided in which the inner opening of the rotatable terminal is frusto-conical in shape; wherein the axis of the cone coincides with the axis of the screw conveyor. This solution makes it possible to reduce the passage section of the compacted powders and thus to direct them towards the center of the cone.

According to a further embodiment of the present invention, a system for packaging powders is provided that comprises at least one opening in the feeding tube of the hopper so as to be able to blow gas into the product that is fed inside the hopper. Such a solution is particularly advantageous in the case in which it is wished to blow an inert gas, like for example nitrogen. This is because by combining this introduction of gas with the removal of air from the first opening it is possible to obtain compacted powders having a low amount of air inside them. Such air will have an extremely low amount of oxygen because the air contained inside the hopper has been "enriched" with nitrogen. Therefore, such a provision is particularly advantageous in the case in which powders are being handled that required an extremely low amount of oxygen inside them to prevent possible oxidation, such as coffee powders. Alternatively or in addition, the opening can be provided in the hopper itself.

According to a further embodiment of the invention, a method is provided for packaging powders in containers through a system that conveys the powders through a hopper and a first tube connected to the hopper towards the containers, wherein the method comprises the following step:

a) suction of air from the inner region of the hopper and of the first tube so as to compact the powders.

Given that the air is removed both from inside the first tube and from inside the hopper, the powder is effectively drawn from inside the hopper and is uniformly compacted. In this way, it is possible to keep the flow rate of the system constant. In this way, it is possible to control the dosing of the product exiting towards the containers with high precision.

According to a further embodiment of the invention, a method is provided for packaging powders further comprising a step of cutting such compacted powders exiting from the first tube so as to dose the amount of powders to be inserted in the containers. This makes it possible to further optimise the precision of dosing of the product exiting towards the containers.

According to a further embodiment of the invention, a method is provided for packaging powders further comprising a step of cutting such compacted powders exiting from the first tube, for example through the closing of a shutter, so as to dose the amount of powders to be inserted in the containers. The cutting makes it possible to control the dosing of the product with high precision. For example, if due to the high degree of compacting and/or the depression inside the first tube a part of the powders exiting from the first tube remains anchored to it and does not detach by gravity, through the shutter it is possible to extremely precisely cut the amount of compacted powder to be inserted inside the package arranged at the outlet of the first tube.

According to a further embodiment of the invention, a method is provided for packaging powders in which the cutting of the powders exiting from the first tube is carried out through the rotation of a rotatable terminal internally comprising cutting means and positioned close to the outlet of an extension tube positioned below the first tube; wherein the extension tube is connected to the first tube. This method is particularly advantageous since it makes it possible to cut the powders exiting from the first tube and to obtain a more precise dosing of the product exiting from the screw conveyor. This is because, due to the high degree of compacting and/or the depression inside the first tube, a part of the powders exiting from the first tube remains anchored to it and does not detach by gravity. Through the cutting means it is thus possible to extremely precisely cut the amount of compacted powder to be inserted inside the package arranged at the outlet of the first tube.

According to a further embodiment of the invention, a method is provided for packaging powders in which the cutting of the powders exiting from the first tube is carried out through the rotation of a rotatable terminal internally comprising cutting means.

According to a further embodiment of the present invention, a method is provided for packaging powders in which the rotation of the rotatable terminal is provided by the rotation of a rotatable tube about its axis, wherein the extension tube is contained inside the rotatable tube; wherein the rotatable terminal is connected to the rotatable tube. This makes it possible to control the rotation of the rotatable terminal, and thus of the cutting means contained inside it, through the rotation of the rotatable tube. This solution is particularly advantageous since it makes it possible to adjust the rotation of the cutting means at any point of the rotatable tube. Therefore, in this way it is possible to adjust the rotation in a position distant from the cutting means and thus not disturbing the cutting means.

According to a further embodiment of the present invention, a method is provided for packaging powders in which the rotation of the rotatable terminal is provided by the rotation of a rotatable tube about its axis.

According to a further embodiment of the present invention, a method is provided for packaging powders in which the rotatable terminal is rotated by an angle greater than or equal to the angular distance between two cutting means.

According to a further embodiment of the present invention, a method is provided for packaging powders that further comprises a step of forming tubular elements through a vertical packager so as to convey the compacted powders inside the tubular elements; wherein the vertical packager comprises a forming tube around which a film coming from a reel is received. This solution is particularly advantageous since it makes it possible to obtain a method for packaging powders having both a high packaging speed thanks to the vertical packager and a high precision in the dosing of the powders exiting from the first tube thanks to the cutting means.

According to a further embodiment of the present invention, a method is provided for packaging powders that further comprises a step of introducing gas into the gap formed between the forming tube and the rotatable tube through an opening of the forming tube so as to compensate for the depression inside the tubular elements. Such a solution has two particular advantages: the first concerns the possibility of compensating for the depression inside the package preventing possible damage to it, and the second advantage concerns the possibility of cooling the tubes by introducing particularly cold gas. According to a further embodiment of the present invention, a method is provided for packaging powders that further comprises a step of introducing gas into the forming tube so as to compensate for the depression inside the tubular elements.

According to a further embodiment of the invention, a method is provided for packaging powders further comprising a step of introducing air inside the gap so as to adjust the degree of compactness of the powders inside the first tube. The air blown makes it possible to partially compensate for the air sucked through the first opening so as to be able to control the degree of compacting of the powders inside the first tube. Indeed, it has been observed that in the case of excessive compacting of the powders through suction from the first opening, the advancing of the powders in the system could be obstructed. Thanks to the presence of the second opening it is thus possible to compensate for the suction effect from the first opening and to precisely control the degree of compacting of the powders. Therefore, thanks to the air blown into the second opening it is thus possible to obtain a constant flow rate having a certain required degree of compacting. For example, the air blown can be air at atmospheric pressure, or a controlled atmosphere. Such a step of introducing air inside the gap is preferably carried out at the same time as the step of sucking air from the inner region of the hopper and of the first tube so as to have continuous control of the degree of compacting of the powders. Moreover, it is also possible, depending on the operative conditions, to decide to modify the amount of air blown while the system is operating.

According to a further embodiment of the present invention, a method is provided for packaging powders in which the gas inserted inside the gap to adjust the degree of compacting of the powders is an inert gas, preferably nitrogen. Such a solution is particularly advantageous since: by combining this introduction of gas with the removal of air from the first opening it is thus possible to obtain a compacted gas having a low amount of air inside it and such air will have an extremely low amount of oxygen. This is because the air contained inside the system has been "enriched" with nitrogen. Therefore, such a provision is particularly advantageous in the case in which powders are being handled that require an extremely low amount of oxygen to prevent possible oxidation, such as coffee.

According to a further embodiment of the invention, a method is provided for packaging powders in which the amount of air blown through the second opening is adjusted from the signal of a pressure sensor positioned inside the gap so as to detect the degree of compacting of the powders. This solution is particularly advantageous since it makes it possible to prevent excessive compacting of the powders. Preferably, such control from the pressure detected by the pressure sensor (which can for example be a depression sensor) can be combined with the control from the temperature detected so as to have a single controller capable of adjusting the amount of air blown both from the pressure and from the temperature detected.

According to a further embodiment of the invention, a method is provided further comprising a step of detecting the temperature of one or more of the components of the system and a step of introducing air inside the first tube, wherein one or more of the parameters of the air introduced from temperature, pressure or relative humidity is adjusted based on the temperature detected.

According to a further embodiment of the invention, a method is provided in which the suction of air from the inner region of the hopper and of the first tube so as to compact the powders is carried out through a vacuum pump in which the vacuum pump is adjusted from a pressure measurement detected through a pressure sensor positioned inside the hopper. This solution is advantageous since it makes it possible, through the signal of the pressure sensor, to influence the flow rate of powders inside the screw conveyor and to be able to make it constant by drawing the powders inside the hopper thanks to the depression formed there.

According to a further embodiment of the invention, a method is provided in which the suction of air from the inner region of the hopper and of the first tube so as to compact the powders is carried out from a signal detected by a pressure sensor positioned inside the hopper and connected to a controller for controlling the vacuum pump, wherein such detection is preferably carried out a vertical distance from the first tube equal to at least half the height of the hopper. This solution is particularly advantageous since it makes it possible to automatically adjust the vacuum pump from the signal detected by the pressure sensor so as to obtain a constant flow rate inside the hopper. Moreover, thanks to the fact that the pressure sensor (which can for example be a depression sensor) is positioned at the top of the hopper, it is effectively possible to adjust the depression inside the hopper so that the powders are drawn inside the hopper thanks to the depression formed there.

According to a further embodiment of the present invention, a method is provided for packaging powders that further comprises a step of introducing gas inside the hopper. This solution is particularly advantageous since it makes it possible to create a controlled atmosphere inside the hopper like for example an oxygen-poor atmosphere. This thus makes it possible to effectively reduce the amount of oxygen contained inside the first tube.

According to a further embodiment of the present invention, a method is provided for packaging powders in which the gas introduced into the hopper is an inert gas, preferably nitrogen.

According to a further embodiment of the present invention, a method is provided for packaging powders in which the powders are ground coffee and the containers that are filled are coffee capsules.

According to a further embodiment of the present invention, a method is provided for packaging powders in which the step of filling a package is carried out at the same time as the step of cutting the package previously filled.

According to a further embodiment of the invention, a method is provided for packaging powders further comprising a step of introducing air on the outer surface of said first tube so as to cool said first tube. The air blown can for example have a temperature comprised between 15° C. and 30° C. The temperature of the system can tend to increase by friction between the parts of the system and the compacted powder. The cold air blown thus makes it possible to lower the temperature inside the first tube. In this way, it is possible to prevent overheating of the system (which occurs for example at a temperature of the mechanical members above 50-60° C.) but particularly it is possible to protect the quality of the powdered material from possible deterioration due to high temperatures.

According to a further embodiment of the invention, a method is provided for packaging powders further comprising a step of introducing dry air inside the first tube, for example with a relative humidity comprised between 30% and 50%. The dry air makes it possible not to load the product with moisture avoiding hardening it.

According to an embodiment of the invention, a method is provided for packaging powders through a packaging system comprising a hopper that receives the powders and a first tube that comprises an inlet connected to the hopper, wherein the first tube internally comprises an screw conveyor that rotates about an axis inside the first tube so as to convey the powders towards the outlet of the first tube; wherein the first tube is made of filtering material and is arranged inside a second tube so as to make a gap between the first tube and the second tube, wherein the gap is configured so as to be able to be sealed; wherein the second tube comprises a first opening through which, based on the present method, a step of sucking air from the gap and from the hopper is carried out. Through such suction the powder is drawn directly and effectively from inside the hopper thus keeping the flow rate at the inlet of the first tube constant. Moreover, the powder sucked inside the first tube is thus compacted and the screw conveyor can thus convey the compacted powder towards the outlet. In this way it is possible very precisely control the dosing of the product exiting from the system according to this embodiment of the invention.

According to a further embodiment of the invention, a method is provided for packaging powders further comprising a step of introducing air inside the gap through a second opening of the second tube. The air blown makes it possible to partially compensate for the air sucked through the first opening so as to be able to control the degree of compacting of the powders inside the first tube. In this way, it is possible to keep the degree of compacting constant, equal to a predetermined degree of compacting. It has indeed been observed that in the case of excessive compacting of the powders through suction from the first opening, the advancing of the powders in the system could be obstructed. Thanks to the presence of the second opening it is thus possible to compensate for the suction effect from the first opening and to precisely control the degree of compacting of the powders. The air blown can for example be air at atmospheric pressure.

According to a further embodiment of the invention, the air blown through the second opening is cold air, for example with a temperature comprised between 15° C. and 30° C. The temperature inside the first tube tends to rise by friction, which for example can occur between the screw conveyor and the compacted powders or also between the first tube (which is made of filtering material and thus rough) and the compacted powders. The cold air blown thus makes it possible to lower the temperature inside the first tube. In this way it is possible to prevent overheating of the system (which can occur at a temperature of the mechanical members above 50-60° C.) but particularly it is possible to protect the quality of the powdered material from possible deterioration due to high temperatures.

According to a further embodiment of the invention, the air blown through the second opening is dry air, for example it can have a relative humidity comprised between 30% and 50%. The dry air makes it possible not to load the product with moisture avoiding hardening it.

According to an embodiment of the invention, a method is provided for packaging powders in which the air blown inside the second opening is adjusted through a regulator. This makes it possible to precisely adjust the amount of air blown inside the cavity according to the desired degree of compacting of the powders.

BRIEF DESCRIPTION OF THE FIGURES

The present invention will be described with reference to the attached figures in which the same reference numerals and/or marks indicate the same parts and/or similar and/or corresponding parts of the system.

DETAILED DESCRIPTION

Hereinafter, the present invention is described with reference to particular embodiments, as illustrated in the attached tables of drawings. However, the present invention is not limited to the particular embodiments described in the following detailed description and represented in the figures, but rather the described embodiments simply exemplify the various aspects of the present invention, the purpose of which is defined by the claims. Further modifications and variations of the present invention will become clear to those skilled in the art.

Figure 1:
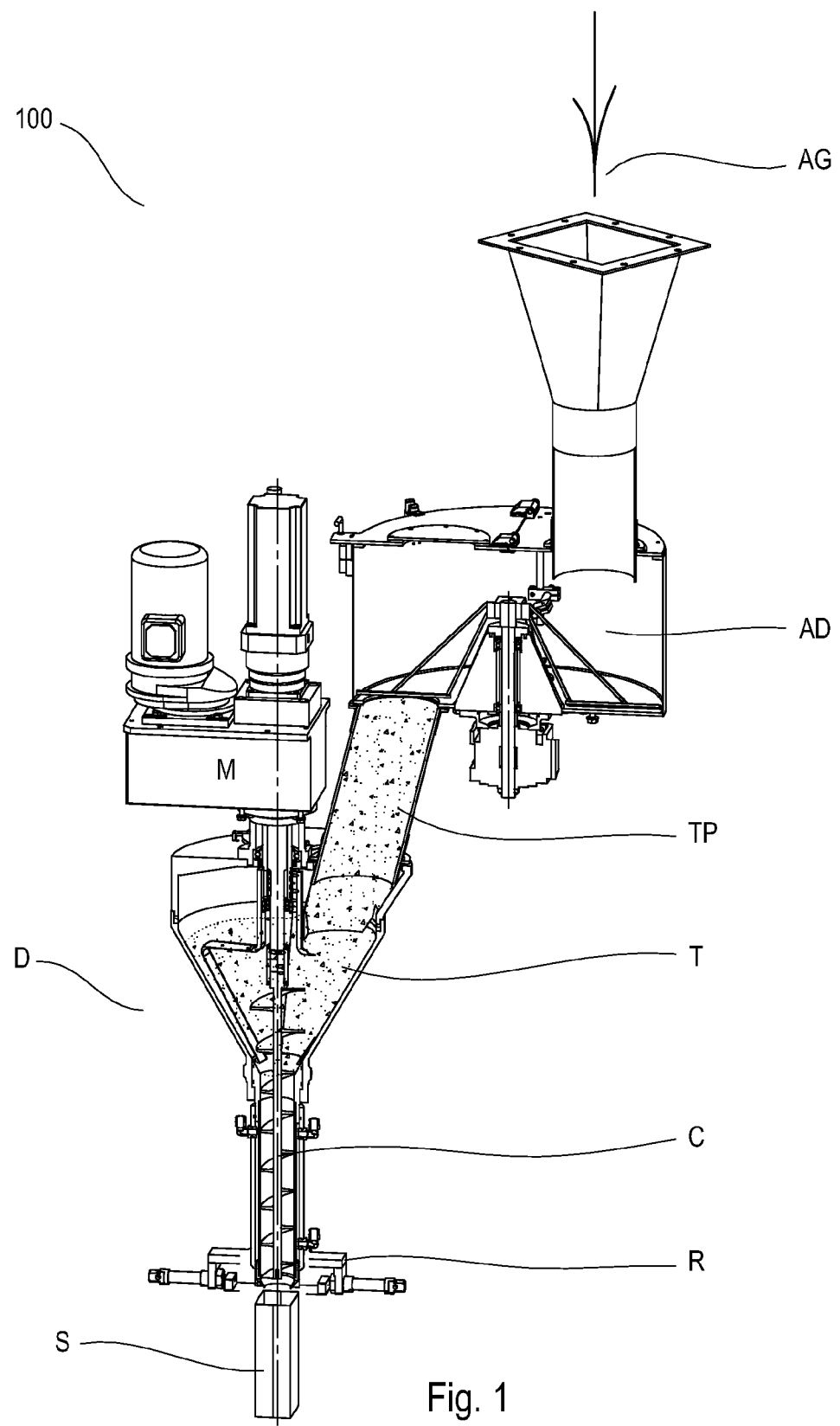
FIG. 1 schematically shows a system for packaging powders according to an embodiment of the present invention.

FIG. 1 schematically shows a system for packaging powders 100 according to an embodiment of the present invention. The system for packaging powders 100 comprises a dosing group D that makes it possible to dose the desired amount of powder inside packages S. The packages can be arranged at the outlet of the dosing group D, for example through a carousel or similar.

The system for packaging powders 100 further comprises an inlet of the powders through a centralised general feeding system AG. The feeding system is connected to a buffer container AD which is configured so as to collect the powders in inlet and transfer them through a feeding tube TP to the dosing group D.

Figure 2A:
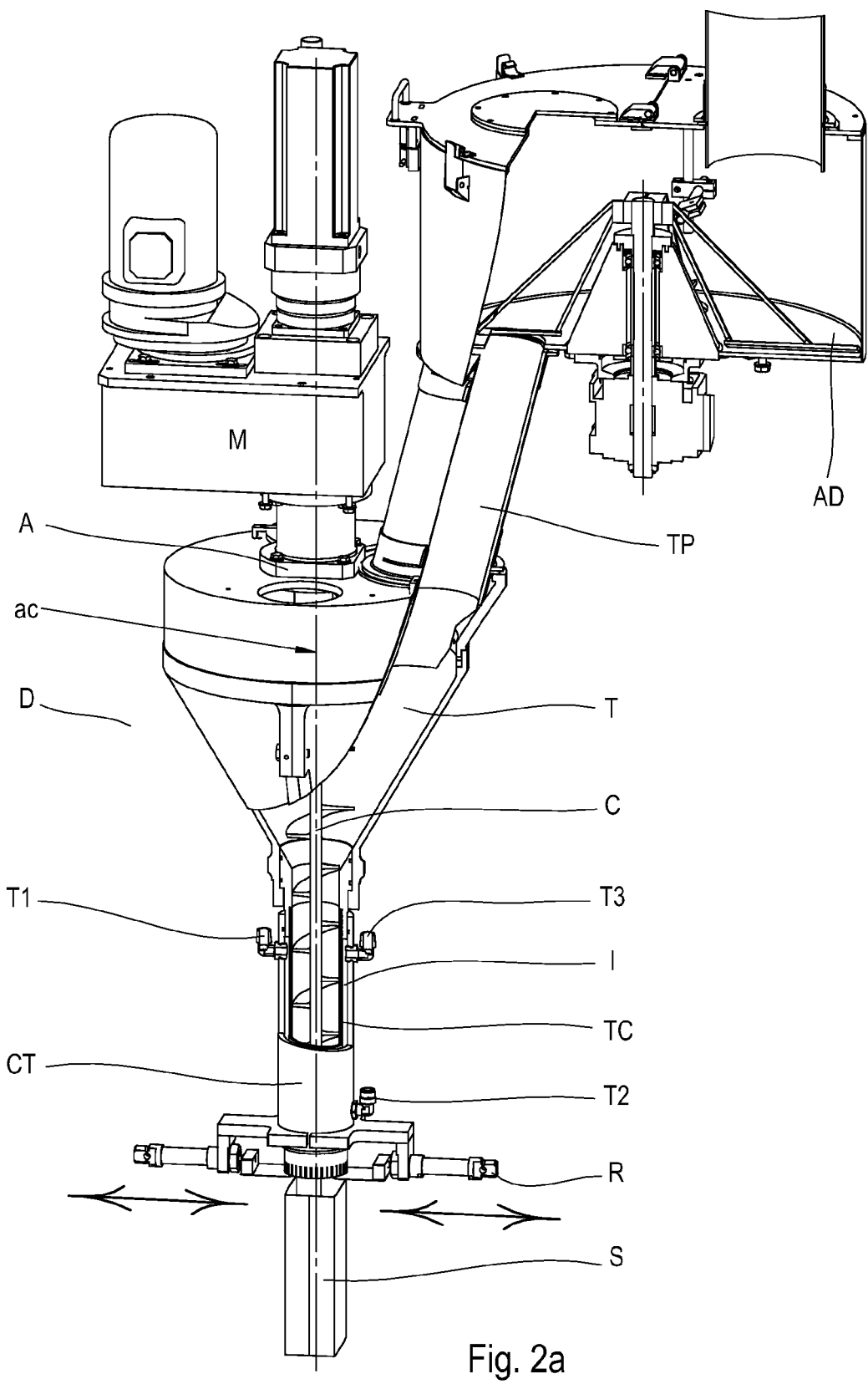
FIG. 2a schematically shows a system for packaging powders through a three-dimensional view according to an embodiment of the present invention.

As shown in detail in FIG. 2a, the dosing group D comprises a hopper T connected to a first tube TC made of filtering material.

The first tube TC internally comprises an screw conveyor C that is configured so as to be able to rotate inside the first tube TC about its axis ac. The screw conveyor C can be actuated by a motorisation group M that does not allow the rotation thereof. The volumetric flow rate exiting from the screw conveyor C can thus be controlled by adjusting the rotation speed of the screw conveyor C about its axis ac.

Figure 3:
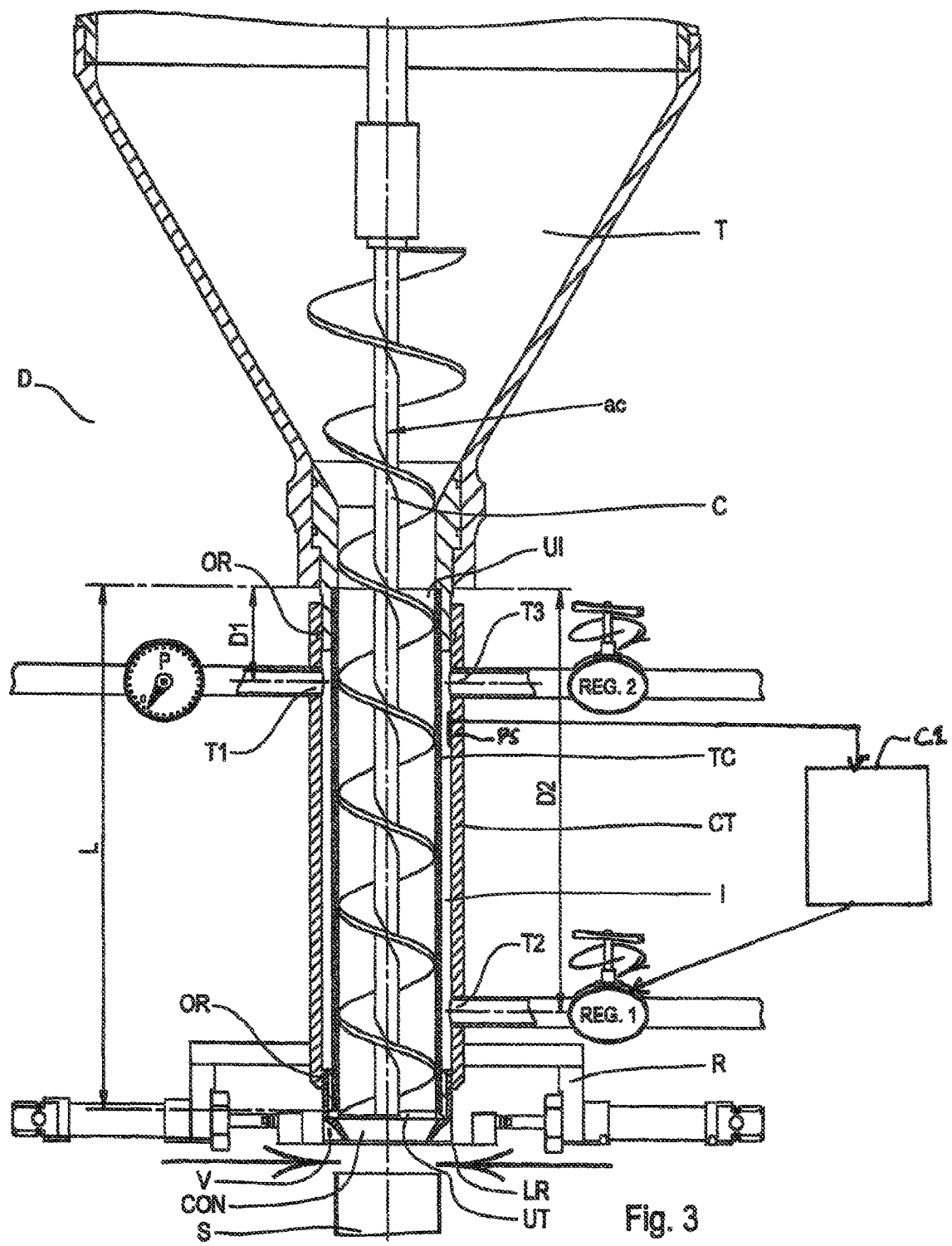
FIG. 3 schematically shows the cross section of a system for packaging powders in an area that goes from the doser to the package to be filled in a condition with the system stopped according to an embodiment of the present invention.

The first tube TC is inserted inside a second tube CT, for example a sealable tube. In this way, between the outer region of the first tube TC and the inner region of the second tube CT a gap I is formed. The gap is configured so as to be able to be sealed. For example, as shown in FIG. 3, the upper and lower ends of the gap I are sealed through two O-rings OR arranged respectively at the two ends of the gap. Moreover, the second tube CT comprises a first opening T1. The first opening T1 is configured to be able to suck air from the gap I and from the hopper T. By extracting air from the first opening T1, an area of depression is formed inside the gap I. The area of depression, thanks to the fact that the first tube is made of filtering material, also extends both in the region of the screw conveyor and up to inside the hopper T.

The first opening T1 is positioned close to the inlet of the first tube TC. This makes it possible to remove air from inside the first tube already close to the inlet of the powders inside the first tube and thus promote the suction of air up to inside the hopper.

FIG. 3 shows that the first opening T1 is positioned a distance D1 from the inlet of the first tube TC. The distance D1 according to an embodiment of the present invention is less than half of the total length L of the first tube TC. Moreover, the distance D1 can preferably be less than ⅓ of the length L of the first tube, and even more preferably less than ¼ of the length L.

As shown in FIG. 3, the first opening T1 can be connected to a vacuum pump P. This makes it possible to remove large amounts of air from the first tube so as to be able to form a large vacuum area inside the gap I, the first tube TC and the hopper T.

The second tube CT has a second opening T2 configured so as to be able to blow air, for example cold and/or dry air, inside the gap. The amount of air blown through the second opening T2 is adjusted from the signal of a pressure sensor PS positioned inside the gap. A controller C1 is capable of adjusting the amount of air blown from the pressure detected. The air blown makes it possible to partially compensate for the air sucked through the first opening T1 so as to be able to control the degree of compacting of the powders inside the first tube TC. In this way it is possible to keep the degree of compacting constant, equal to a predetermined degree of compacting. Moreover, it is clear that instead of air, the second opening T2 can be configured so as to be able to more generally blow any type of gas, for example an inert gas such as nitrogen.

Moreover, the temperature inside the first tube can tend to rise by friction. Such friction is for example that between the screw conveyor and the compacted powders or between the first tube, which is made of filtering material and thus rough, and the compacted powders. By blowing cold air it is possible to prevent overheating of the system but particularly it is possible to protect the quality of the powdered material from possible deterioration due to high temperatures.

In addition, the air blown makes it possible to partially compensate for the air sucked through the first opening so as to be able to control the degree of compacting of the powders inside the first tube TC. This makes it possible to reduce the probability of blocking of the advancing of the powders in the system due to excessive compacting of the powders.

The second opening T2 is positioned close to the outlet of the first tube TC. This makes it possible to blow cold air into the cavity I even close to the outlet UT of the first tube TC so as to effectively cool the outer surface of the first tube TC along much of its length L.

The figure shows that the second opening T2 is arranged a distance D2 from the inlet UI of the first tube TC. The distance D2 according to an embodiment of the present invention is greater than half of the length L of the first tube. The second distance D2 can preferably be greater than ⅔ of the length L of the first tube TC, and even more preferably greater than ¾ of the length L, even more preferably greater than ⅘ of the length L and even more preferably greater than ⅚ of the length L.

The second opening T2 is connected to a regulator REG1 capable of adjusting the amount of air to be blown inside the cavity I depending on the desired degree of compacting of the powders. Therefore, different degrees of compacting of the powders can be carried out depending on the type of powders to be packaged. For some types of powders, excessive compacting of the powders could indeed cause difficulties in the rotation of the screw conveyor C. Therefore, it is particularly advantageous to have a control over the degree of compacting to make it possible to use the system for packaging powders 100 with a wide variety of powders.

The regulator REG1, which can be represented for example by a simple adjustment valve, can be directly connected with the atmosphere or be directly connected to a chamber at controlled atmosphere. In the first case there is the advantage of having lower costs whereas in the second case there will be the possibility of actively controlling the type of gas inserted inside the gap. However, in both cases the pressure of the gas inserted can be equal to atmospheric pressure. Indeed, thanks to the depression that is created inside the gap I due to the suction of air, the air at atmospheric pressure (in the case in which the regulator REG1 is also partially open) will be drawn inside the gap I thus adjusting the degree of compacting of the powders.

At the outlet UT of the first tube TC a conical terminal CON is arranged that extends the first tube TC in the longitudinal direction reducing the section thereof. This makes it possible, thanks to the conical shape and therefore to the reduction in section, to effectively convey the powders coming from the screw conveyor C inside a package S. In order to optimise the cooling of the powders inside the conical terminal CON, grooves are made on its outer surface that increase the outer surface of the conical terminal CON and therefore its heat exchange coefficient.

As shown in FIG. 1 the output UT of the first tube TC, which according to an embodiment described previously is in turn connected to the conical terminal CON coincides with the outlet of the compacted powders to be inserted inside the container S. Downstream of this outlet a shutter R is arranged which is fixed directly to the second tube CT. A small part of the powders exiting from the first tube TC, due to the high degree of compacting and/or the depression inside the first tube TC, could remain anchored to it. The shutter R is configured to be able to extremely precisely cut the amount of compacted powder to be inserted inside the package S. Moreover, the shutter R, when it is closed, provides a lower closure to the first tube TC, thus supporting the compacted powders contained in the first tube TC. Moreover, the closure of the first tube TC is particularly advantageous as far as obtaining the vacuum is concerned since it makes it possible to provide a closed environment and therefore in which it is easier to obtain the vacuum. Such a shutter R can for example be made up of a pair of opposite plates LR. The closure through a pair of plates is faster than the case in which the shutter is made up of a single plate. Indeed, in the case in which there are two plates LR, the distance travelled by each plate LR is half. Moreover, a second advantage concerns the fact that with a pair of plates LR the problem of the movement of the compacted powders exiting from the first tube TC that remained anchored to it is prevented. Indeed, in the case in which there is a single plate the powders in outlet, not having a counter-resistance, would be moved along the closing direction of the plate. The presence of two plates LR thus makes it possible to have a counter-resistance and therefore to prevent such a movement. Thus having a pair of plates LR, the product deviated laterally by a plate meets the product deviated by the other plate, which arrives in the opposite direction. Therefore, a counter-resistance is thus formed that makes it possible to centrally deviate the product moved by each of the two plates LR, and makes it possible to make the cut product fall to the center of the container S.

As described earlier, the first tube TC is made of filtering material. According to an embodiment of the present invention, the first tube TC is made of sintered porous metal. The first tube TC therefore has a high rigidity due to the fact that it is made of metallic material. This ensures excellent stability thereof even during operation of the screw conveyor C which is in direct contact with the inside of the first tube TC. An example of sintered porous material that can be used for this purpose is "PORAL". The filtering fineness according to an embodiment of the present invention is proportioned to the minimum dimension of the grain size of the powder to be packaged.

FIG. 3 shows that the second tube CT comprises a third opening T3 configured so as to be able to feed the gap I with pressurised air. The pressurised air inserted inside the gap I makes it possible to free the system from possible clogging, for example from clogging of the filtering material from which the first tube TC is made. This prevents long stopping periods of the system caused by clogging. Advantageously, the third opening T3 is arranged close to the first opening T1 so that the air inserted through the third opening flows in the opposite direction with respect to the direction generated by the combined action of the suction through the opening T1 and the introduction of air from the opening T2.

According to alternative embodiments of the present invention, the pressurised air used to free the system from possible clogging can be inserted from the first opening T1. In these cases it is not necessary to make a third opening T3 in the system. Moreover, it is also possible, instead of the third opening T3 as presented in the figure, for many openings to be made so that the air inserted from the outside to more homogeneously reach the outer surface of the first tube TC and free clogging more effectively.

Figure 2B:
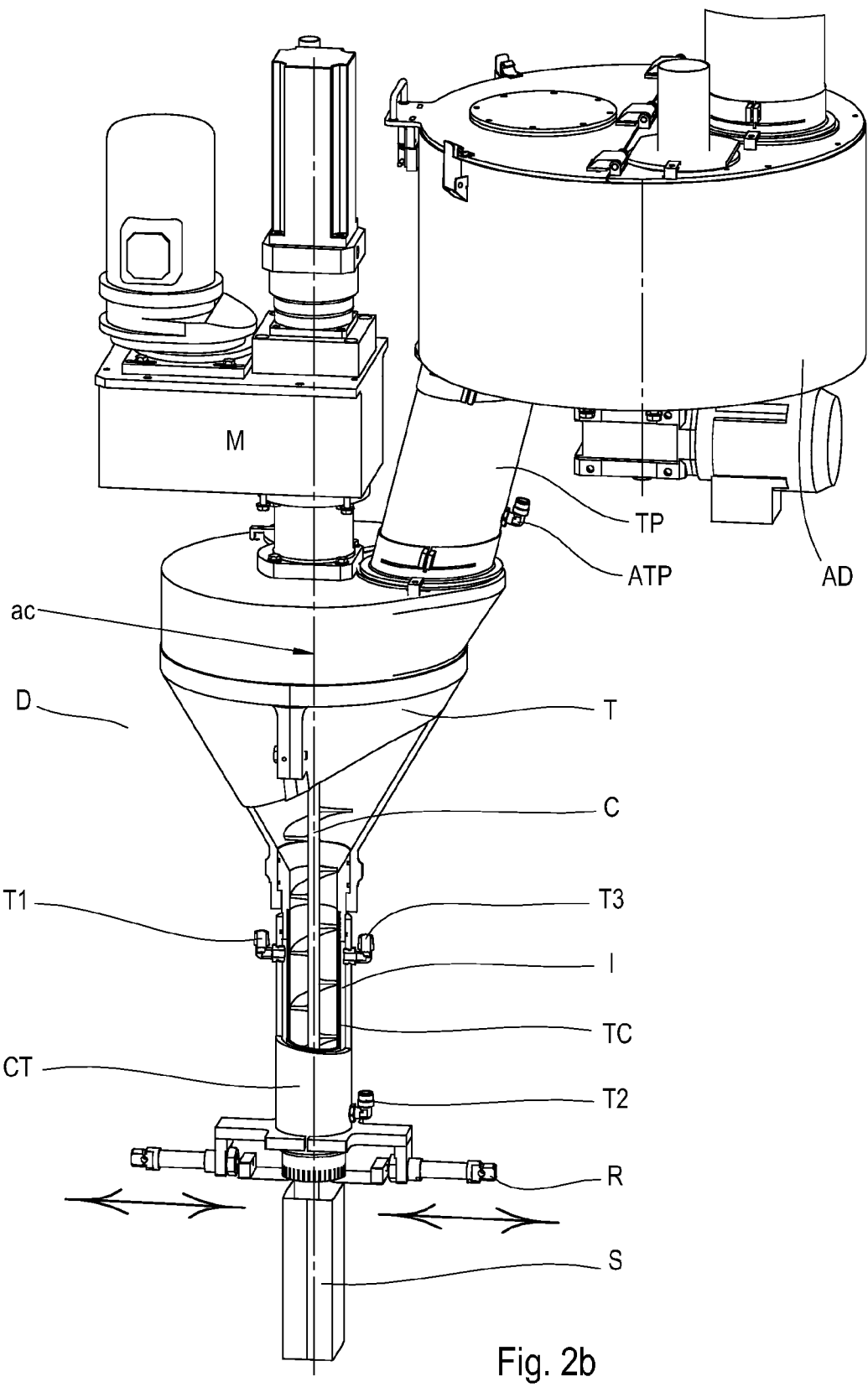
FIG. 2b schematically shows a system for packaging powders with an opening in the feeding tube through a three-dimensional view according to an embodiment of the present invention.

FIG. 2b shows that the feeding tube TP has one or more openings ATP configured so as to be able to blow gas inside the feeding tube TP and therefore consequently also in the hopper T. Such openings ATP can be found in any of the embodiments of the present invention.

Figure 13:
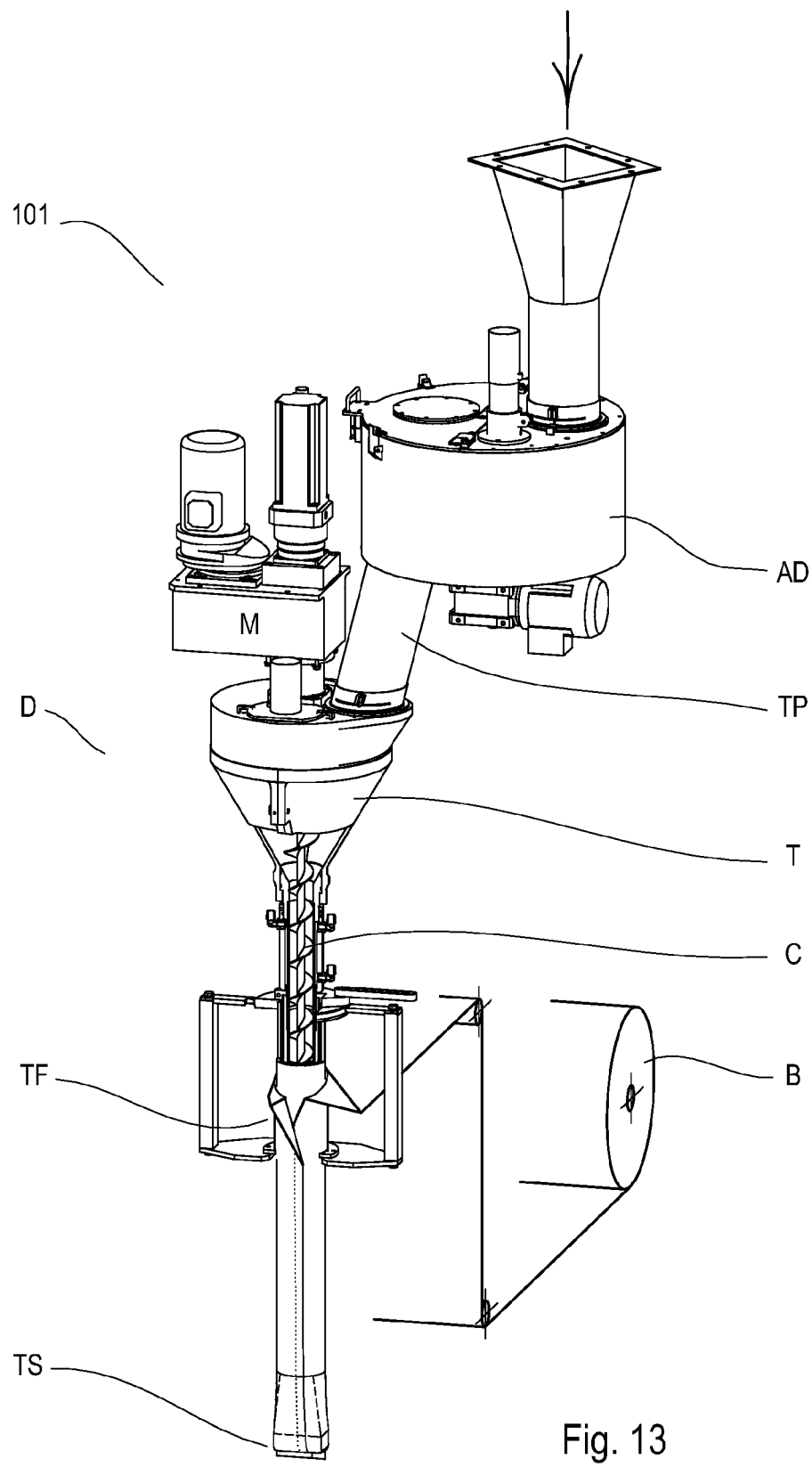
FIG. 13 schematically shows a system for packaging powders that comprises a vertical packager according to an embodiment of the present invention.

The system for packaging powders 101 represented in FIG. 13 further comprises a vertical packager. As for the system for packaging powders 100, also in this case the system comprises an inlet of the powders through a centralised general feeding system AG. The feeding system is connected to a buffer container AD which is configured so as to collect the powders in inlet and transfer them through a feeding tube TP to the dosing group D. The dosing group D makes it possible to dose the desired amount of powder inside the tubular element TS, from which the packages will then be formed.

Figure 14:
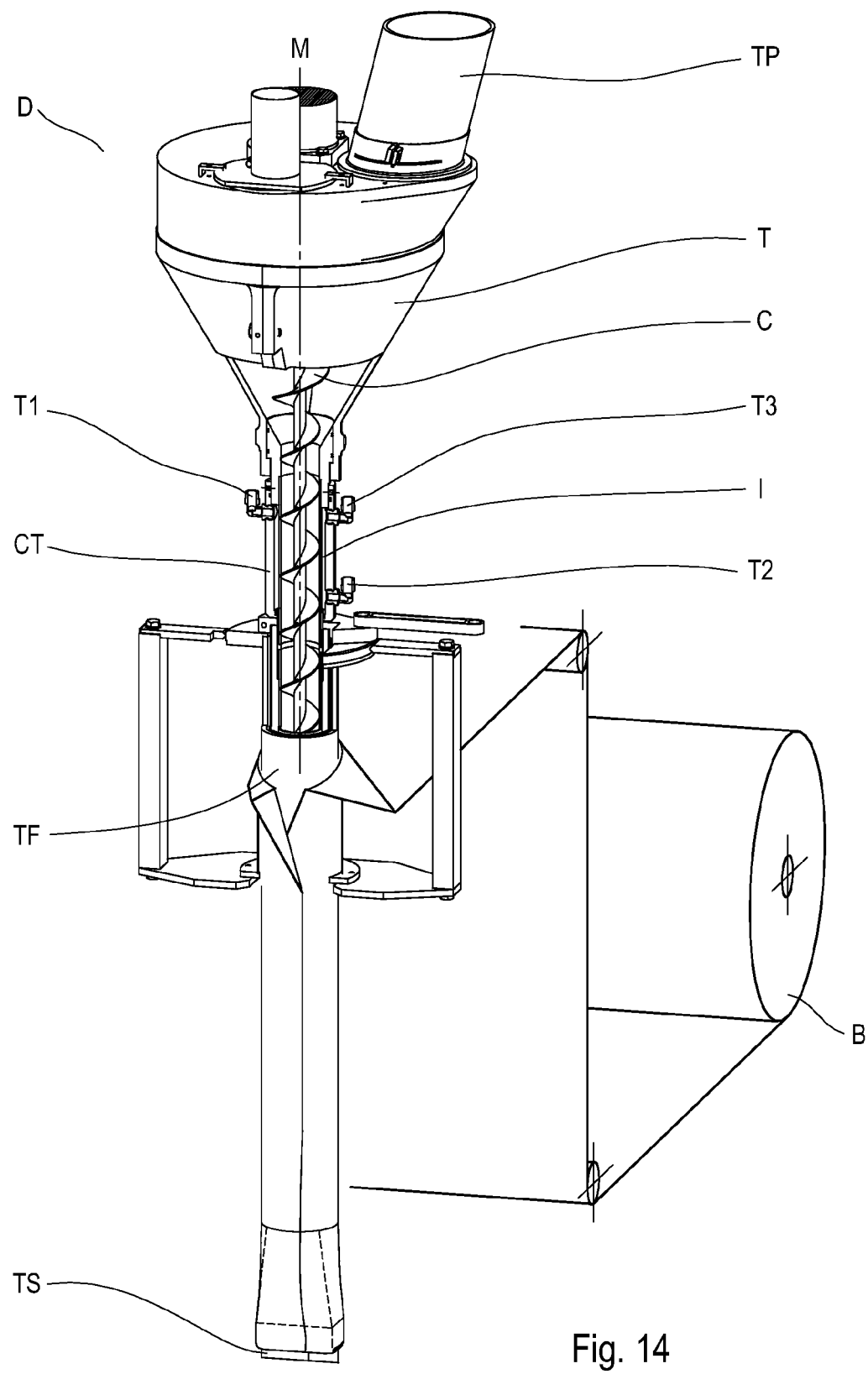
FIG. 14 schematically shows a three-dimensional view in partial section of a system for packaging powders according to an embodiment of the present invention.
Figure 15:
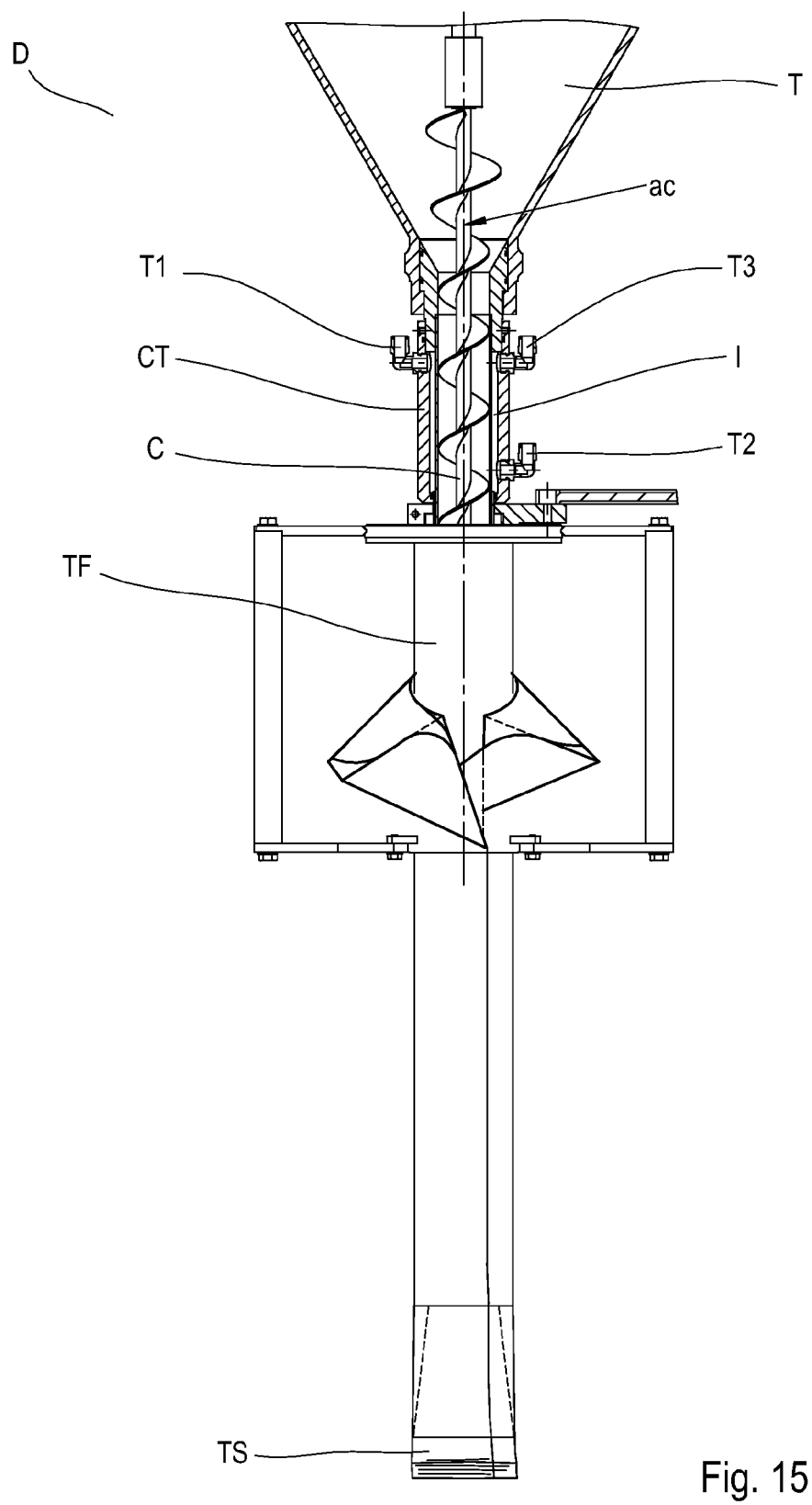
FIG. 15 schematically shows a front view in partial section of a system for packaging powders according to an embodiment of the present invention.

FIGS. 14 and 15 respectively show a three-dimensional view and a section view of the system for packaging powders 101. The system for packaging powders 101 comprises a first tube TC, a second tube CT, a gap I, a first opening T1, a second opening T2 and a third opening T3 having the same characteristics that they have in the system for packaging powders 100 presented above.

Figure 16A:
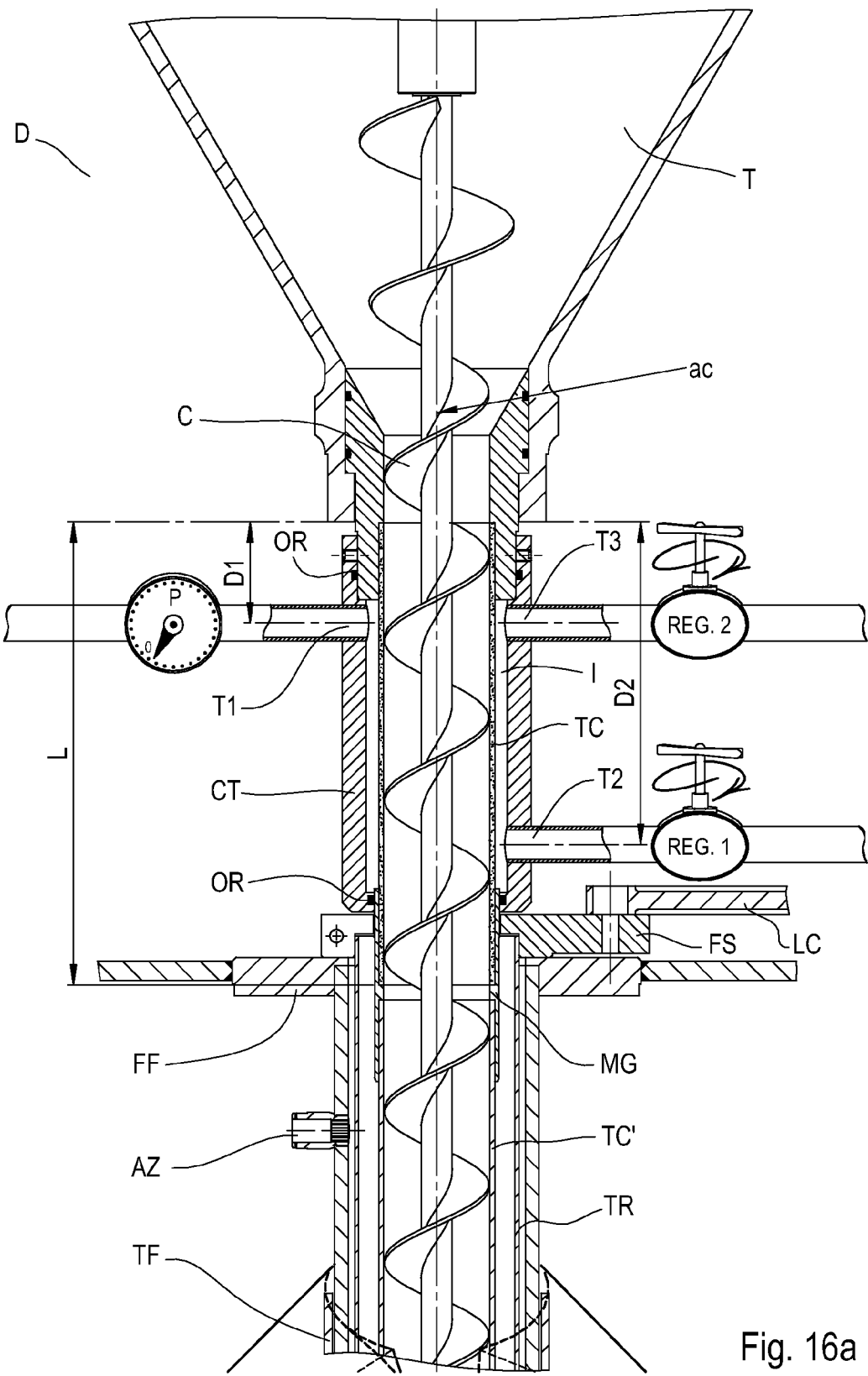
FIGS. 16a and 16b schematically show a section view respectively of an upper part and a lower part of a system for packaging powders according to an embodiment of the present invention.

As shown in FIGS. 16a, b, the first tube TC that internally comprises the screw conveyor C is connected to an extension tube TC' through a joining sleeve MG. The extension tube TC' is for example made of stainless steel. Therefore, there will thus be a tube formed from a first tube TC made of filtering material and from an extension tube TC' having a solid structure. The extension tube TC' can in any case be made with any filtering and non-filtering material. As shown in the figure, the two tubes TC, TC' have the same inner diameter. Close to the outlet UT' of the extension tube TC' there is a rotatable terminal TI which internally comprises cutting means F.

The rotatable terminal TI, which is cylindrical in shape, comprises an inner opening AP concentric with the extension tube TC' so as to convey the powders through it. Moreover, the cutting means F are positioned inside such an opening AP.

The extension tube TC' is inserted inside a rotatable tube TR. In this way, between the outer region of the extension tube TC' and the inner region of the rotatable tube TR a gap is formed. The rotatable tube TR is rotatable about the extension tube TC'. Such a rotation is ensured, as shown in the figures, by a lever LC that is connected to an upper flange FS positioned in the upper part of the rotatable tube TR. The rotatable tube TR is connected to the rotatable terminal TI so as to transmit the rotation to the terminal TI. Such a connection is ensured for example by a mechanical constraint.

The axes of the extension tube TC' and of the rotatable tube TR coincide. Between the extension tube TC' and the rotatable tube TR a centring ring AO is positioned which ensures that the rotatable tube TR is always centered with respect to the extension tube TC'. Such an element can be made for example of plastic, brass or bronze so as to help the sliding between the tubes thanks to the reduces friction coefficient of such materials.

Figure 24A:
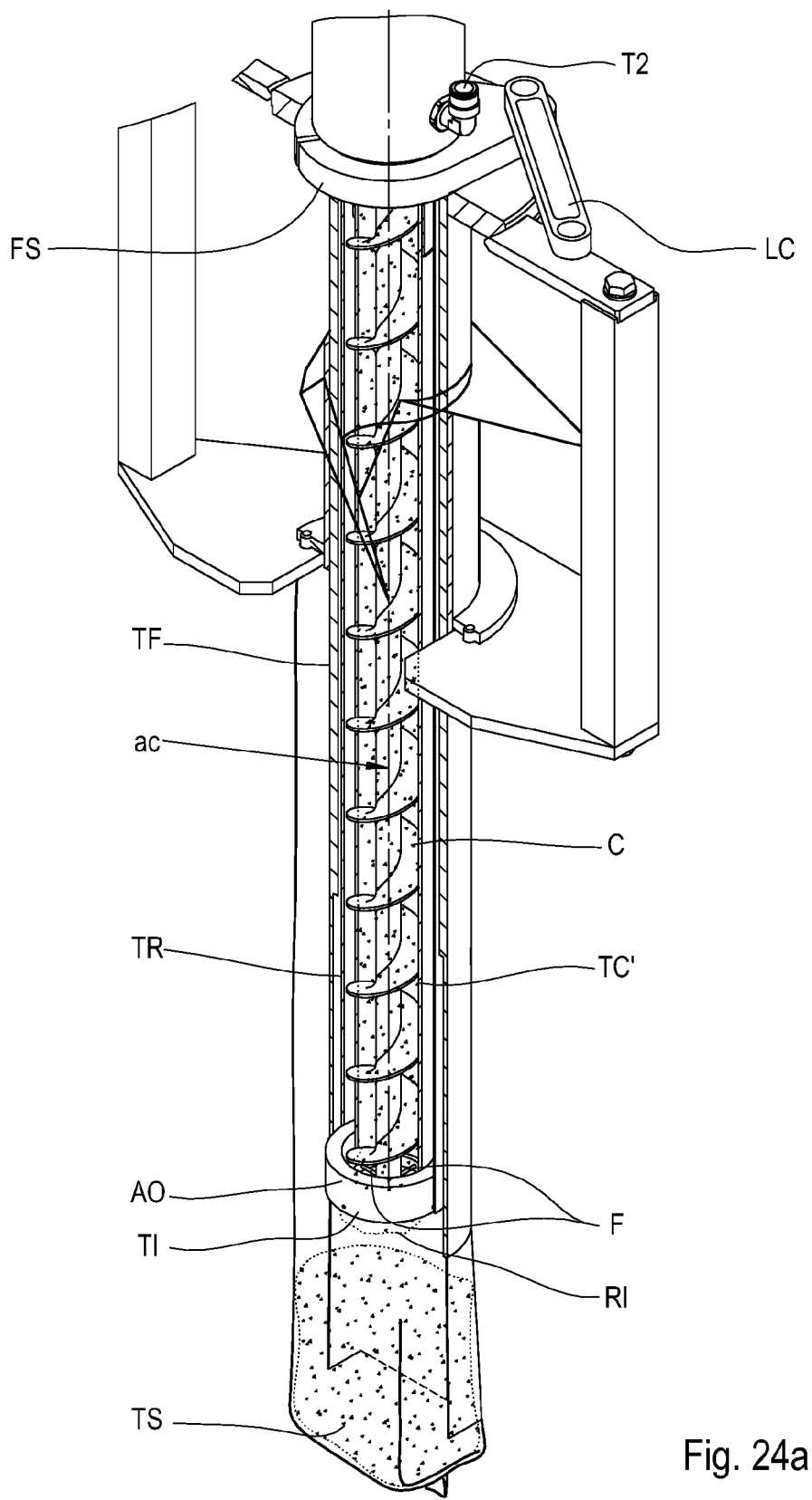
FIG. 24a schematically shows a three-dimensional view of the stopping step of the screw conveyor with the package half-filled in a system for packaging powders according to an embodiment of the present invention.

The cutting means F, represented in FIG. 24a, are represented by two wires arranged perpendicular to one another in a fan so as to form an angle of 90° between them. In this way, by rotating such cutting means F by 90° the same starting configuration is obtained since a wire will have taken the place occupied by the other wire before the rotation. Moreover, the number of wires, their section and the dimensions are selected as a function of the type of powder to be dosed and of the degree of compacting of such a powder. For example, the cutting means F can also be made up of 5, 6 or even more wires. In the case in which there are four wires, the resulting angle between one wire and the other will be 45°. Such wires can be replaced for example by blades or by knives that are installed in an analogous manner to the wires. The wires are made from a strong material suitable for contact with food products like for example stainless steel. Moreover, it is also possible to use a food-grade plastic like fishing line which makes it possible to have very low thicknesses and despite this have great mechanical strength.

The cutting means F can also be formed from a grid having a plurality of openings. In this way, it is thus possible to have cutting means F consisting of multiple wires arranged woven together and forming a plurality of openings having any shape and size.

In the embodiment step, the cutting means F can also be made by removal of material from a lower terminal TI initially without cavities. In this case, through mechanical processing it is possible to remove material so as to form the wires in this case having a square section.

The center of the fan of wires coincides with the axis of the extension tube TC' and thus consequently with the axis of the screw conveyor ac. The system thus obtained, as described having central symmetry, has cutting means positioned at the center of the extension tube TC'.

Figure 28A:
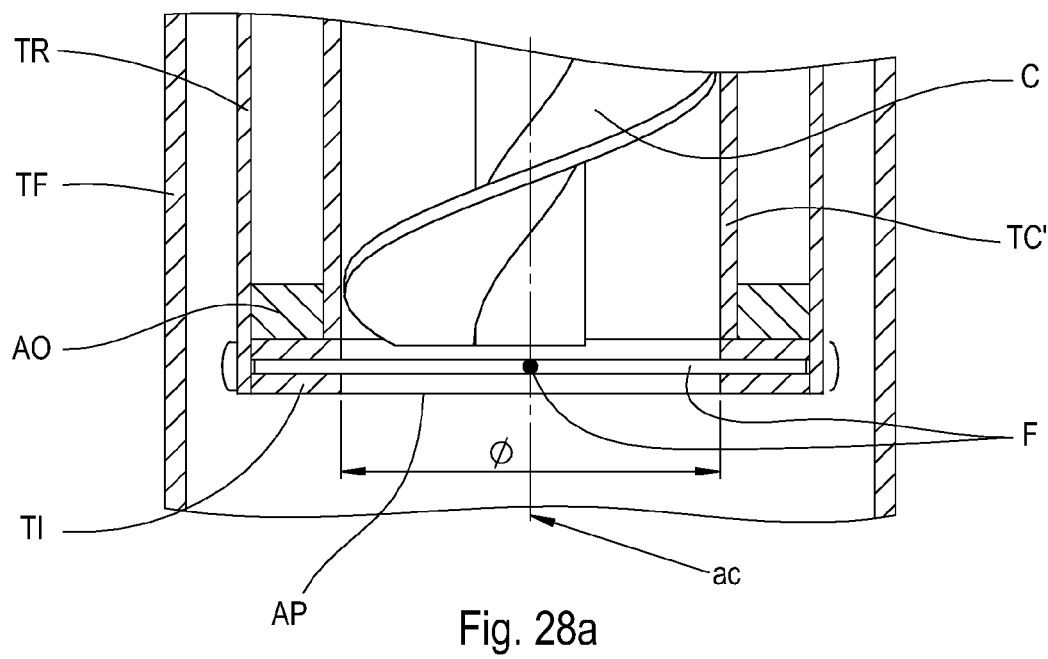
FIGS. 28 a, b, c, d and e schematically show versions of the rotatable terminal according to different embodiments of the present invention.
Figure 28B:
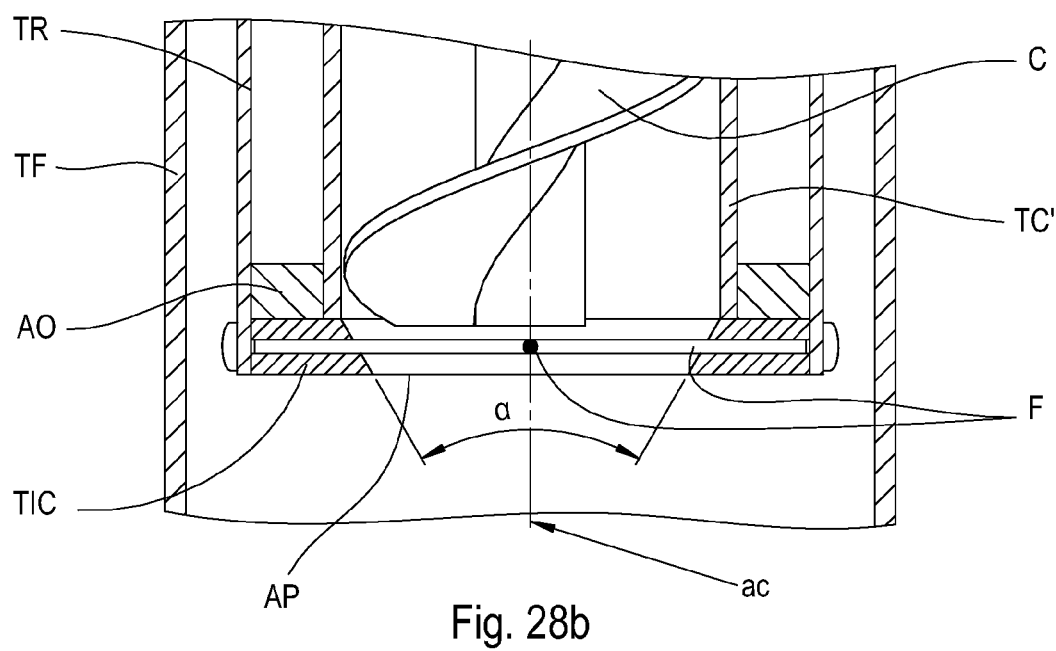
Figure 28C:
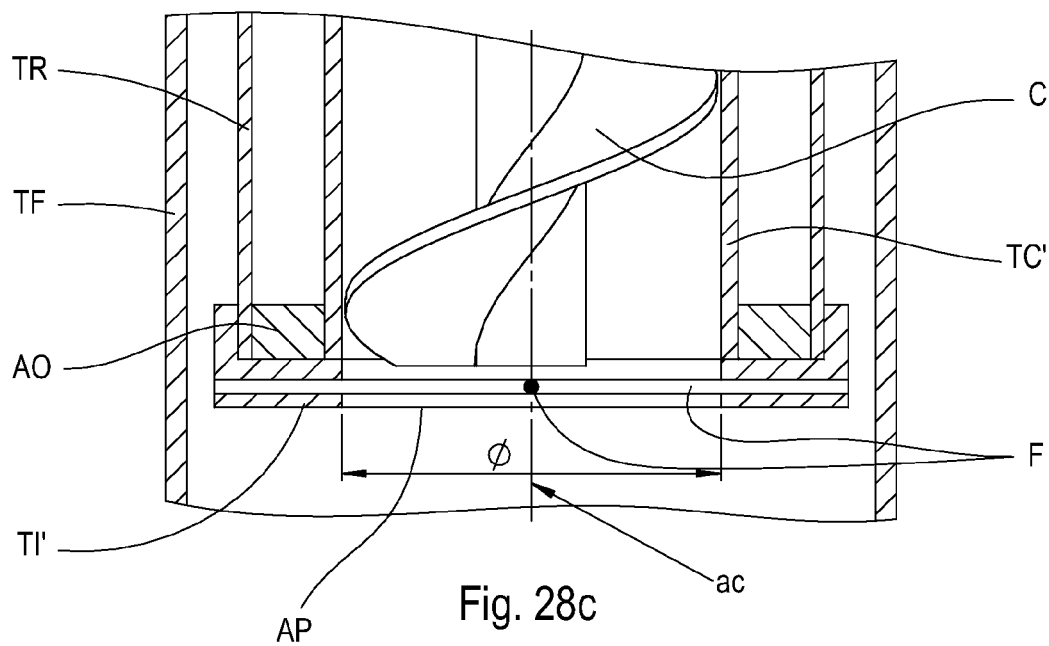
Figure 28D:
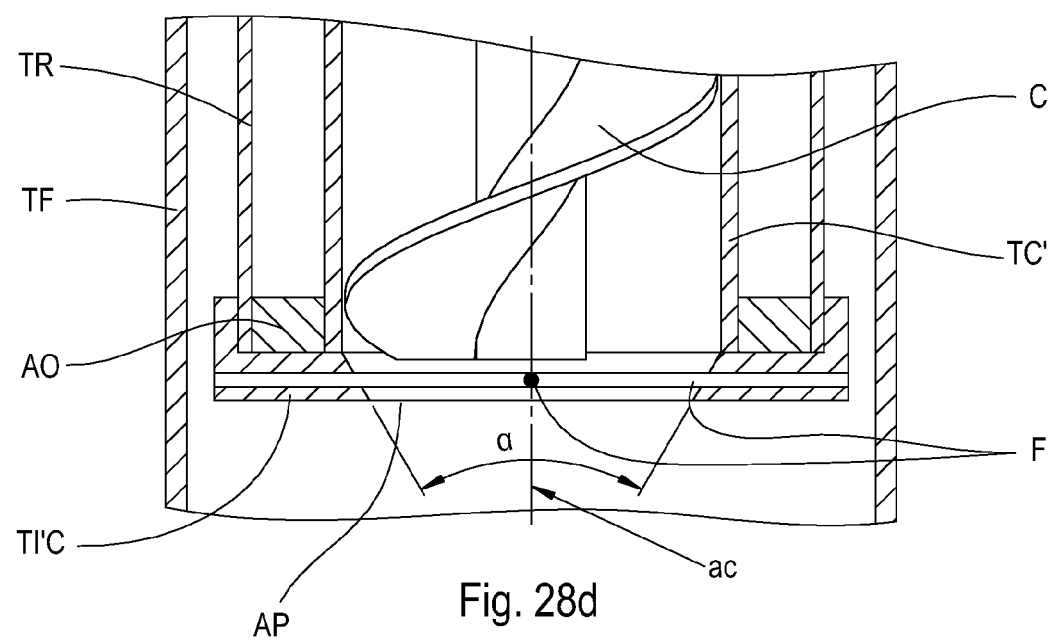

The opening AP of the rotatable terminal TI, as shown in FIG. 28a, has a cylindrical shape, thus having a constant section along the vertical axis. Such a constant section has a diameter equal to the inner diameter of the extension tube TC'. According to the solution represented in the figures the length of the extension tube TC' is less than that of the rotatable tube TR. Between the end part of the rotatable tube TR and the end part of the extension tube TC' the rotatable terminal is installed that is fixed to the rotatable tube TR. Alternatively, as represented in FIG. 28c the length of the two tubes can be the same and the rotatable terminal TI' can be installed below the lower edge of the two tubes. Alternatively, the opening AP of the rotatable terminal TIC, as shown in FIG. 28b, has a frusto-conical shape, thus having a converging section along the vertical axis: the upper part close to the outlet of the extension tube TC' has a diameter equal to the inner diameter of the extension tube TC' whereas the lower part has a smaller diameter than the upper part. The opening angle α of the cone can be adjusted depending on the degree of compacting and the type of material to be conveyed. According to the solution represented in the figures, the length of the extension tube TC' is less than that of the rotatable tube TR. Between the end part of the rotatable tube TR and the end part of the extension tube TC' the rotatable terminal TI is installed which is fixed to the rotatable tube TR. Alternatively, as represented in FIG. 28d the length of the two tubes can be the same and the rotatable terminal TI'C can be installed below the lower edge of the two tubes. The frusto-conical shape of the opening AP of the rotatable terminal TIC is advantageous since it makes it possible to further compact the powder to be dosed even in the horizontal direction, in particular contributing to eliminating the possible central cavity in the volume of powder compacted due to the central region of the screw conveyor. Moreover, the frusto-conical shape makes it possible to facilitate the alignment between the product and the package to be filled.

Figure 28E:
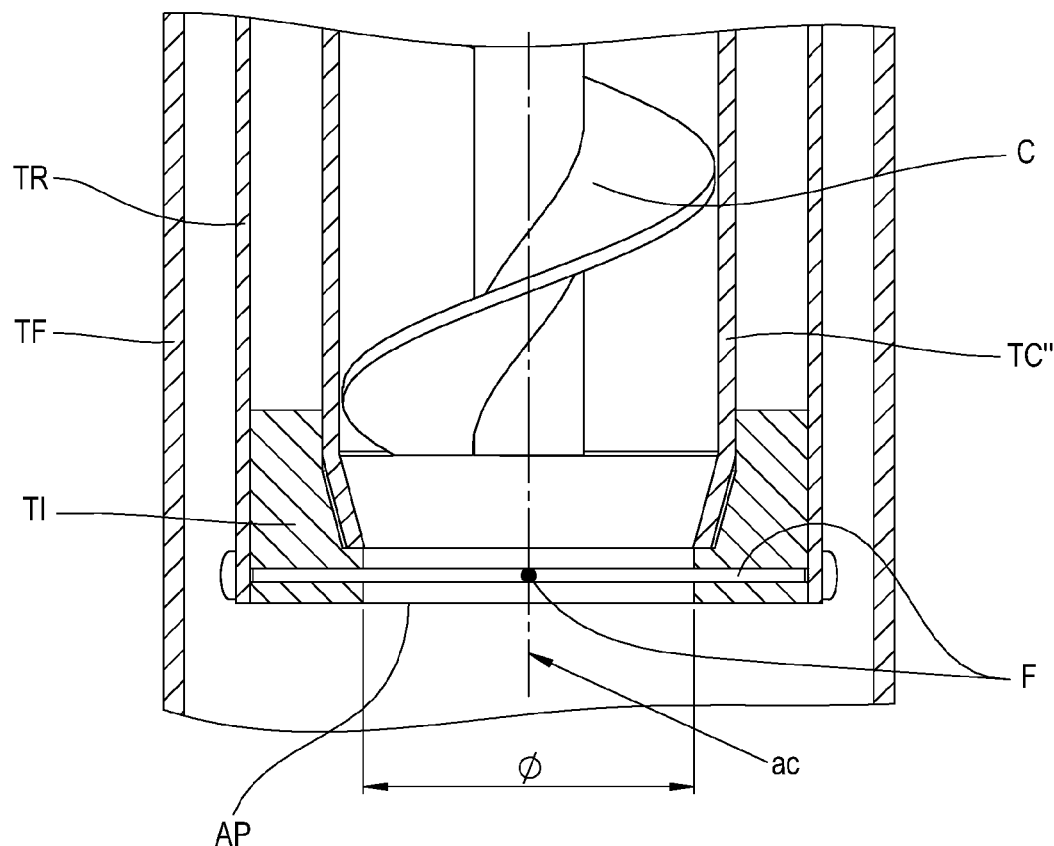

A further variant, shown in FIG. 28e, makes it possible to combine the advantages described above of having a cylindrical opening with those of having a conical opening. As shown in the figures, the extension tube TC' is in this case replaced by an extension tube TC" having a frusto-conical shape at its lower end. Therefore, thanks to such a frusto-conical portion it is in this way possible to obtain a further compacting of the powders as described above. Downstream of said conical portion there is the rotatable terminal TI having an opening AP that has a cylindrical shape. In this case the rotatable terminal TI is integrated directly in the centring ring AO, so as to form a single element.

As shown in FIG. 13 the packaging system 101 further comprises a vertical packager which comprises a forming tube TF to make it possible to receive a film coming from a reel B. Like all vertical packagers, also in this case there is a vertical welder (not represented in the figures) that allows the vertical welding of the packages and there are members (not present in the figures) capable of making the film slide towards the lower part of the forming tube TF. The forming tube TF internally contains the rotatable tube TR and consequently also the extension tube TC'. Therefore, a gap is thus formed between the rotatable tube TR and the forming tube TF. Moreover, the axis of the forming tube TF coincides with the axis of the extension tube TC'.

Figure 16B:
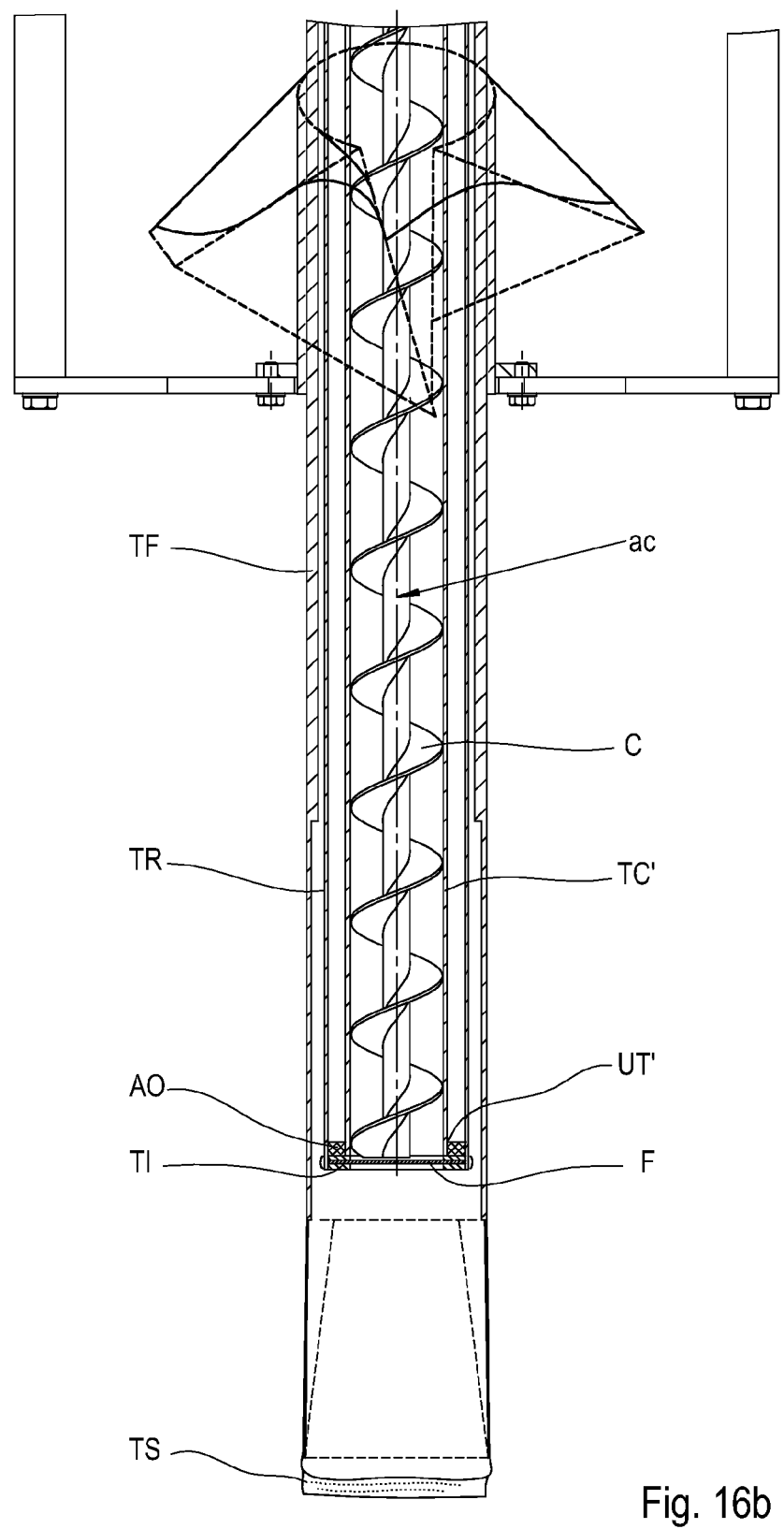
Figure 17:
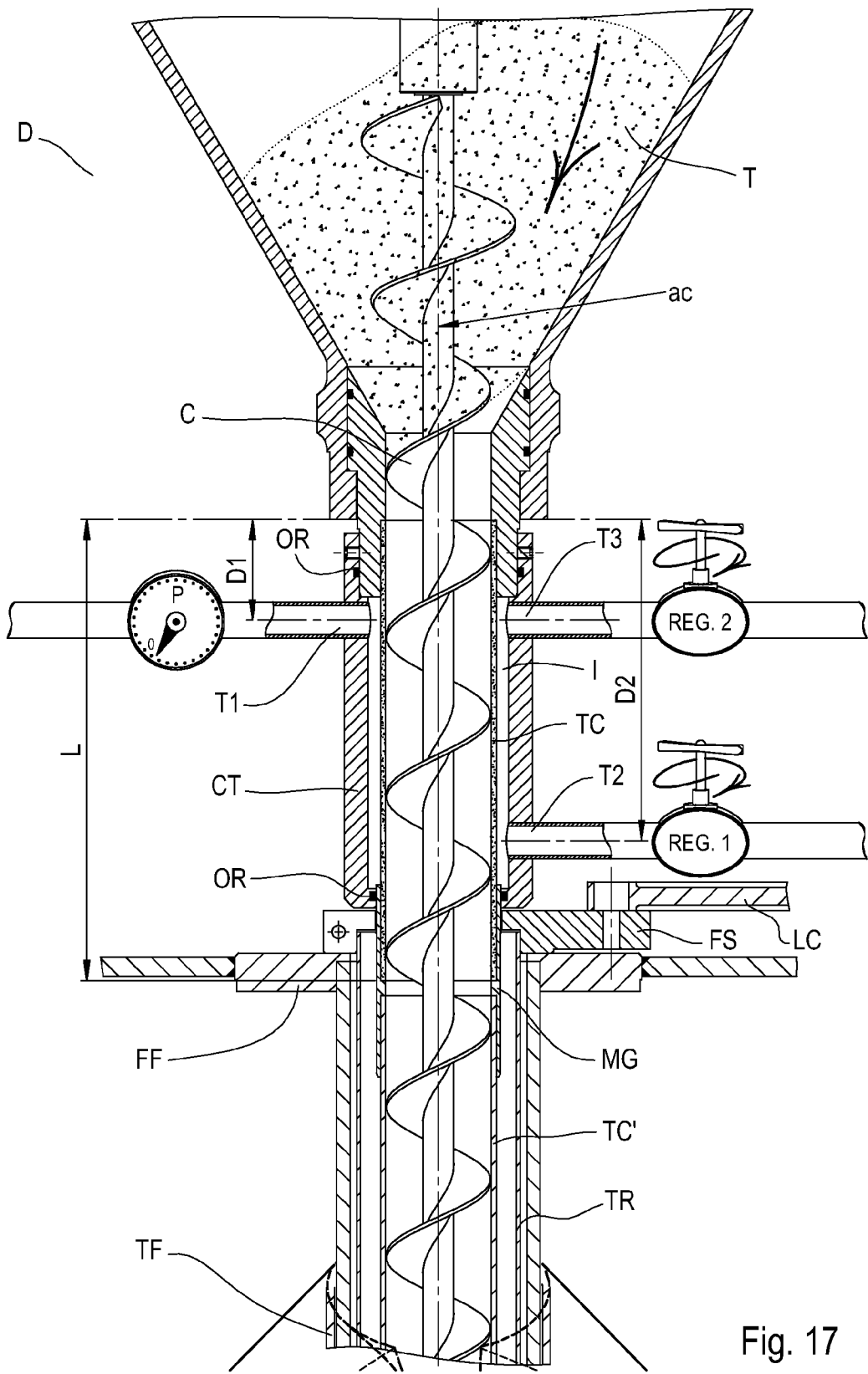
FIG. 17 schematically shows the initial step of feeding the hopper of a system for packaging powders according to an embodiment of the present invention.
Figure 18:
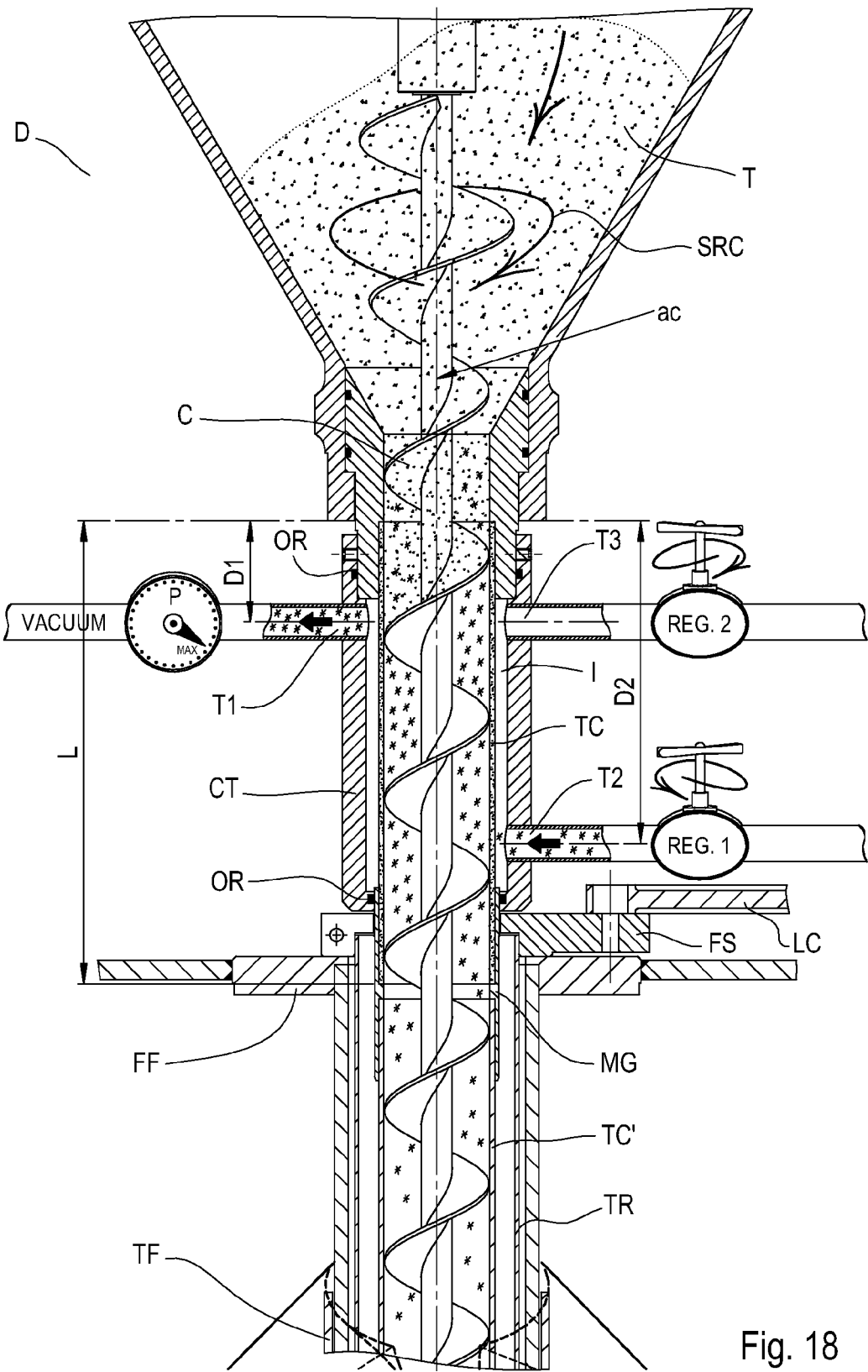
FIG. 18 schematically shows the step of creating a vacuum in a system for packaging powders according to an embodiment of the present invention.
Figure 19:
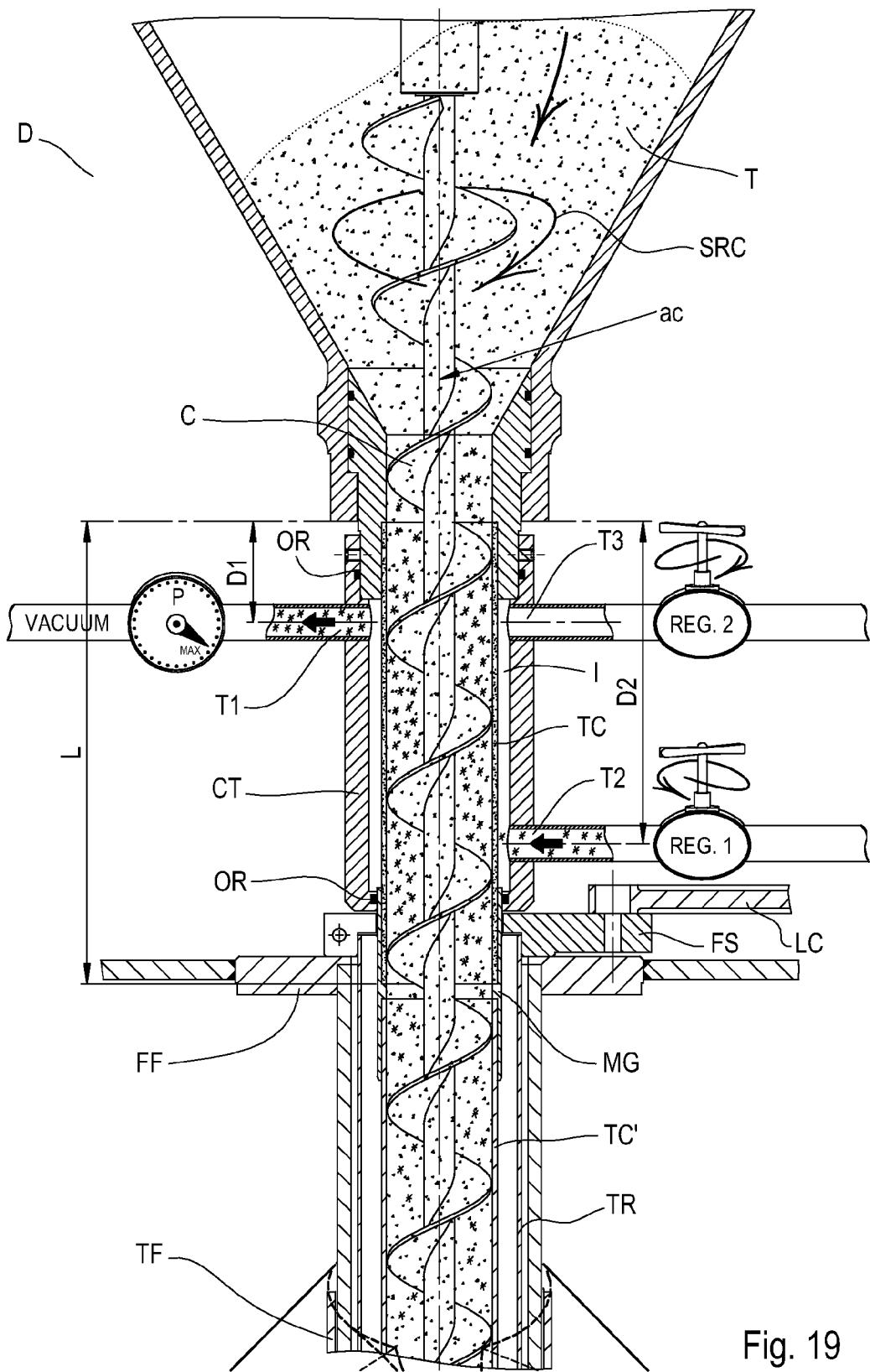
FIG. 19 schematically shows the filling of the tube through the rotation of the screw conveyor in a system for packaging powders according to an embodiment of the present invention.
Figure 20:
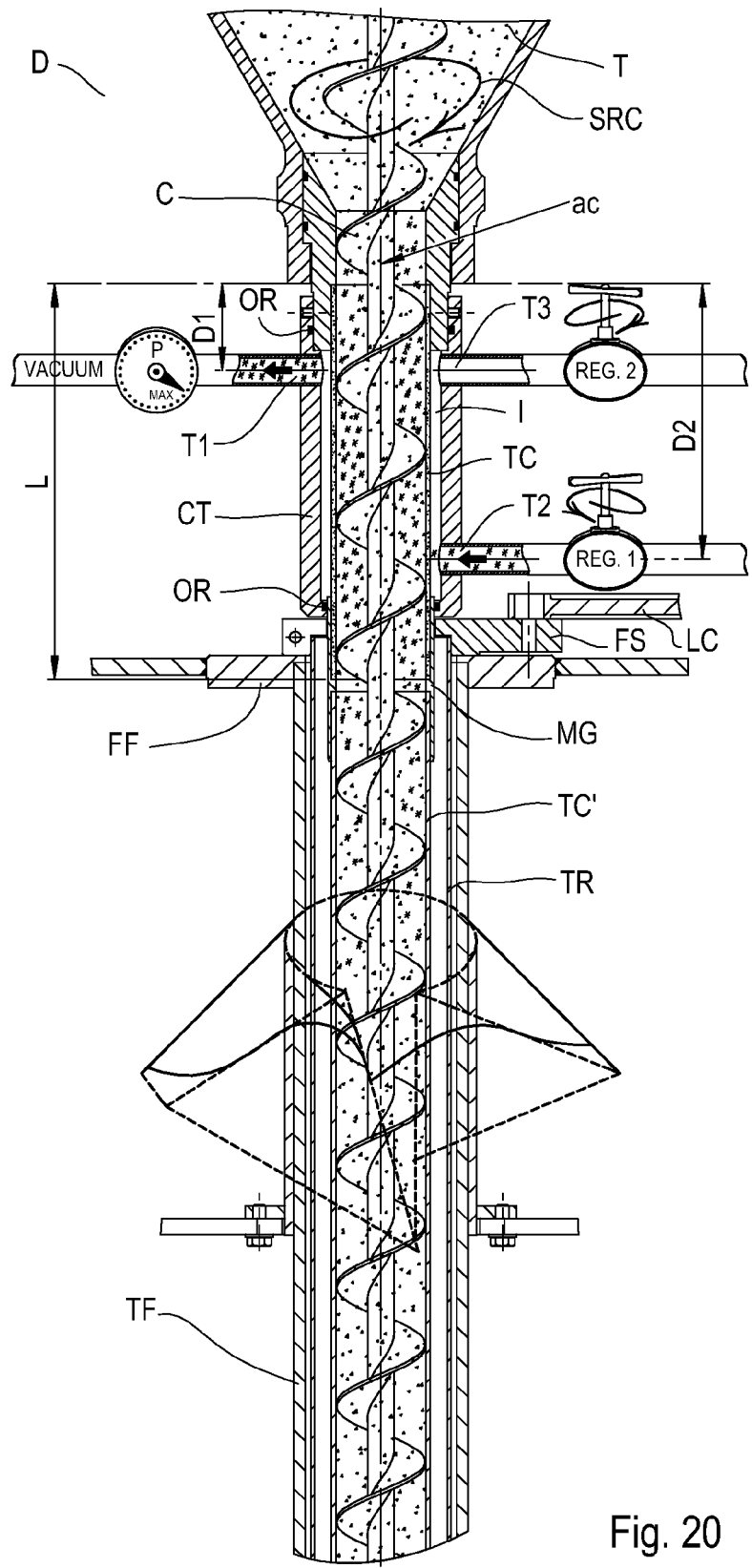
FIG. 20 schematically shows a complete view of the filling of the tube through the rotation of the screw conveyor in a system for packaging powders according to an embodiment of the present invention.

As shown in FIG. 16a, in the upper part of the forming tube TF there is at least one opening AZ from which gas can be introduced inside the gap formed between the forming tube TF and the rotatable tube TR. Such a gap, as shown in FIG. 16b, has an increase in width proceeding from the top towards the bottom so as to be able to effectively convey gas coming from the opening AZ towards the tubular element TS. In addition or alternatively, an opening (not represented in the figures) can also be made on the outer upper surface of the rotatable tube TR, for example above the upper flange FS. It is clear to those skilled in the art that the opening AZ can be replaced with a plurality of openings so as to be able to blow gas along the entire length of the circumference and thus obtain better distribution.

Moreover, the rotatable tube TR can be replaced by any other structure capable of connecting the rotatable terminal TI with the upper flange FS, like for example a grid. In this case the two aforementioned gaps will communicate. An alternative is represented by a system of rods capable of mechanically connecting the rotatable terminal TI with the upper flange TS or by a tube machined inside it.

Figure 10A:
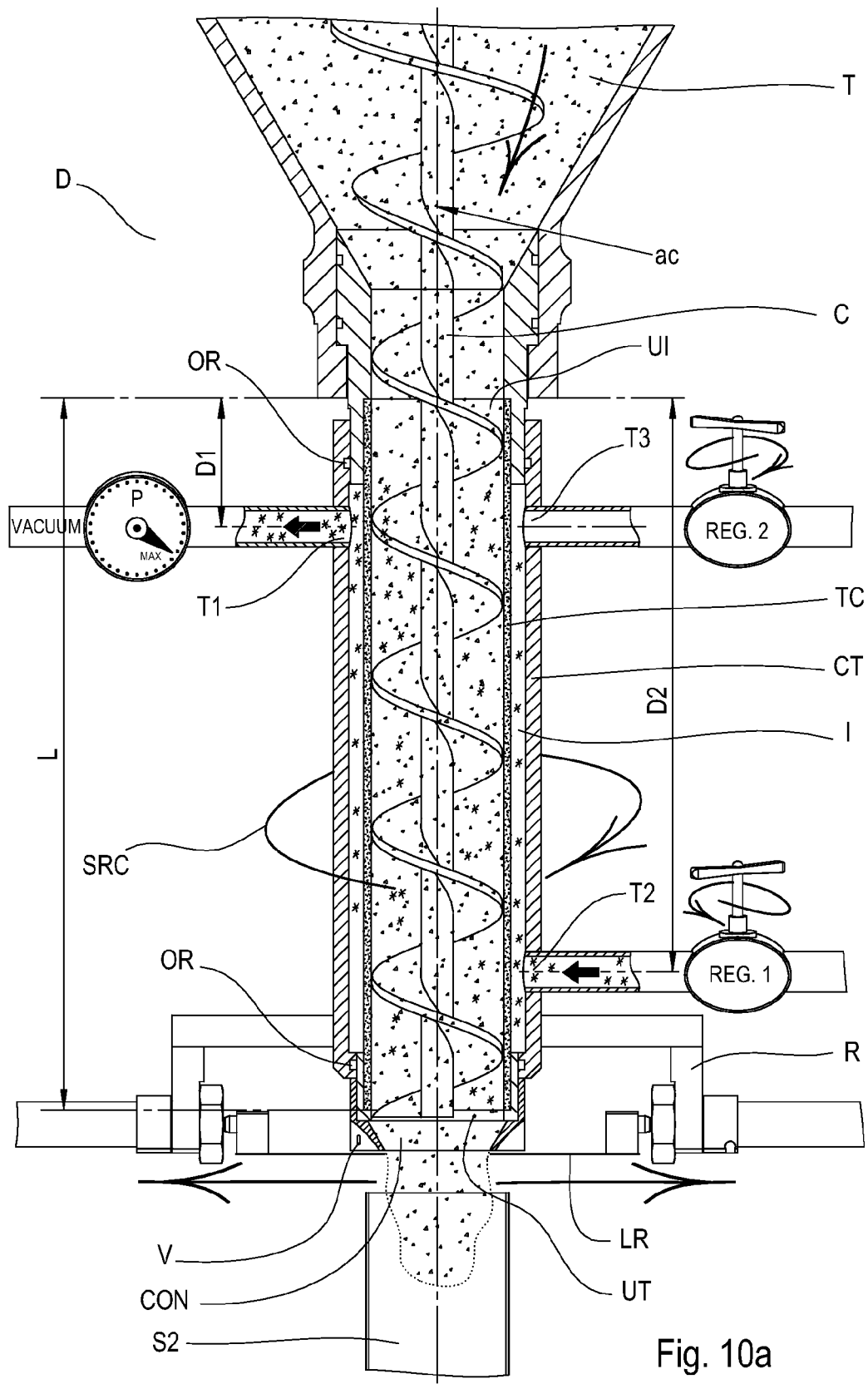
FIG. 10a schematically shows the initial step of filling a second package in a system for packaging powders according to an embodiment of the present invention.
Figure 10B:
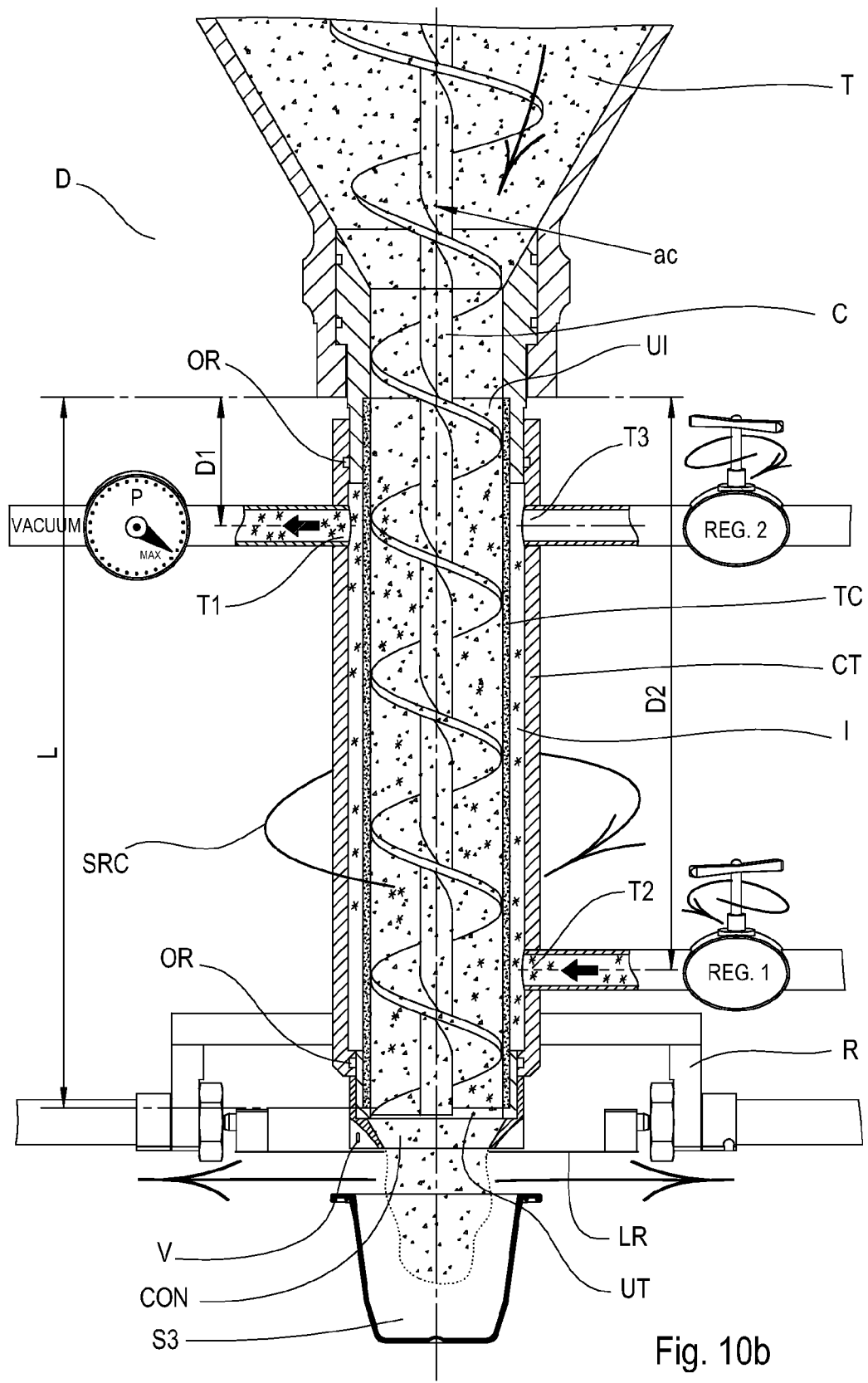
FIG. 10b schematically shows the initial step of filling a capsule in a system for packaging powders according to an embodiment of the present invention.

Moreover, as far as the systems 100, 101 quoted above are concerned, they can be used both for mini and for macro doses. It has indeed been tested that such a system is capable of packaging compacted powders both in small and large quantities. The only difference is in the dimensions of the various components. For example, in the case in which it is wished to package 1 Kg packs of flour there will be an inner diameter of the first tube TC equal to about 50 mm. In the same way, in the case for example in which capsules S3 (as shown in FIG. 10b) for producing beverages, for example coffee, are filled, where the content of compacted powders of each capsule S3 is of the order of 5-10 grams, there will be a smaller system having, for example, an inner diameter of the first tube of about 30-40 mm. In any case, however, all of the aforementioned characteristics (openings, pump, etc.) will be used for both cases. Therefore, the dimensions of said system and of its components can be enlarged and reduced proportionally.

FIG. 10b shows the filling of a capsule for producing beverages S3. Such a depicted system can be arranged in combination with multiple systems the same as or similar to it so as to constitute a multi-track system, i.e. a system that makes it possible to feed a plurality of capsules S3 or in any case containers S in parallel and simultaneously.

Moreover, it is also possible to provide a system (not depicted in the figures) in which a single hopper T is connected and feeds a plurality of first tubes T1 made of filtering material and arranged in combination so as to constitute a multi-track system capable of filling a plurality of capsules S3 or in any case containers S in parallel and simultaneously. In this case the gap I can be formed from a single second tube TC that contains the plurality of first tubes T1. Such a system makes it possible to reduce the costs since it makes it possible to make a single feeding system connected to a plurality of first tubes TC.

Hereinafter, with reference to FIGS. 4 to 10, the operative steps of the system 100 shown in FIG. 3 are described and a method for packaging powders based on a particular embodiment of the present invention is thus described.

Figure 4:
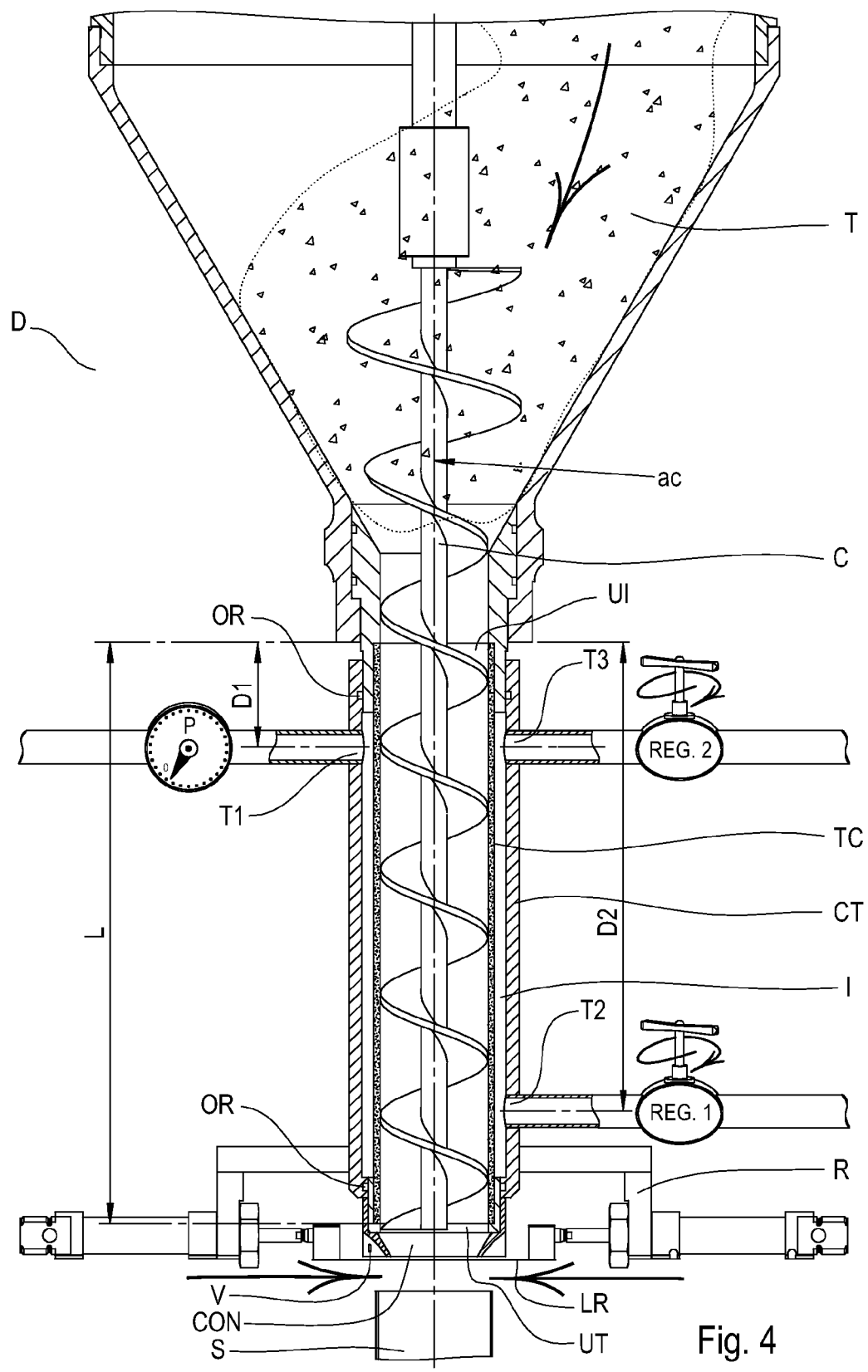
FIG. 4 schematically shows the initial step of feeding the hopper of a system for packaging powders according to an embodiment of the present invention.

FIG. 4 represents the initial step of feeding the hopper T with the powders coming from the centralised system AG. During this first step of filling the first tube TC the vacuum pump P is switched off and the regulators REG1 and REG2 are closed. The powders thus tend to drop down by gravity and enter inside the first tube TC below. The shutter R is closed. Therefore, thanks to the closing of the shutter R, a closure below the first tube TC is provided, thus supporting the compacted powders contained in the first tube TC. As described above, the closure of the first tube TC is particularly advantageous as far as making the vacuum is concerned since it makes it possible to provide a closed environment and therefore in which it is easier to make the vacuum.

Figure 5:
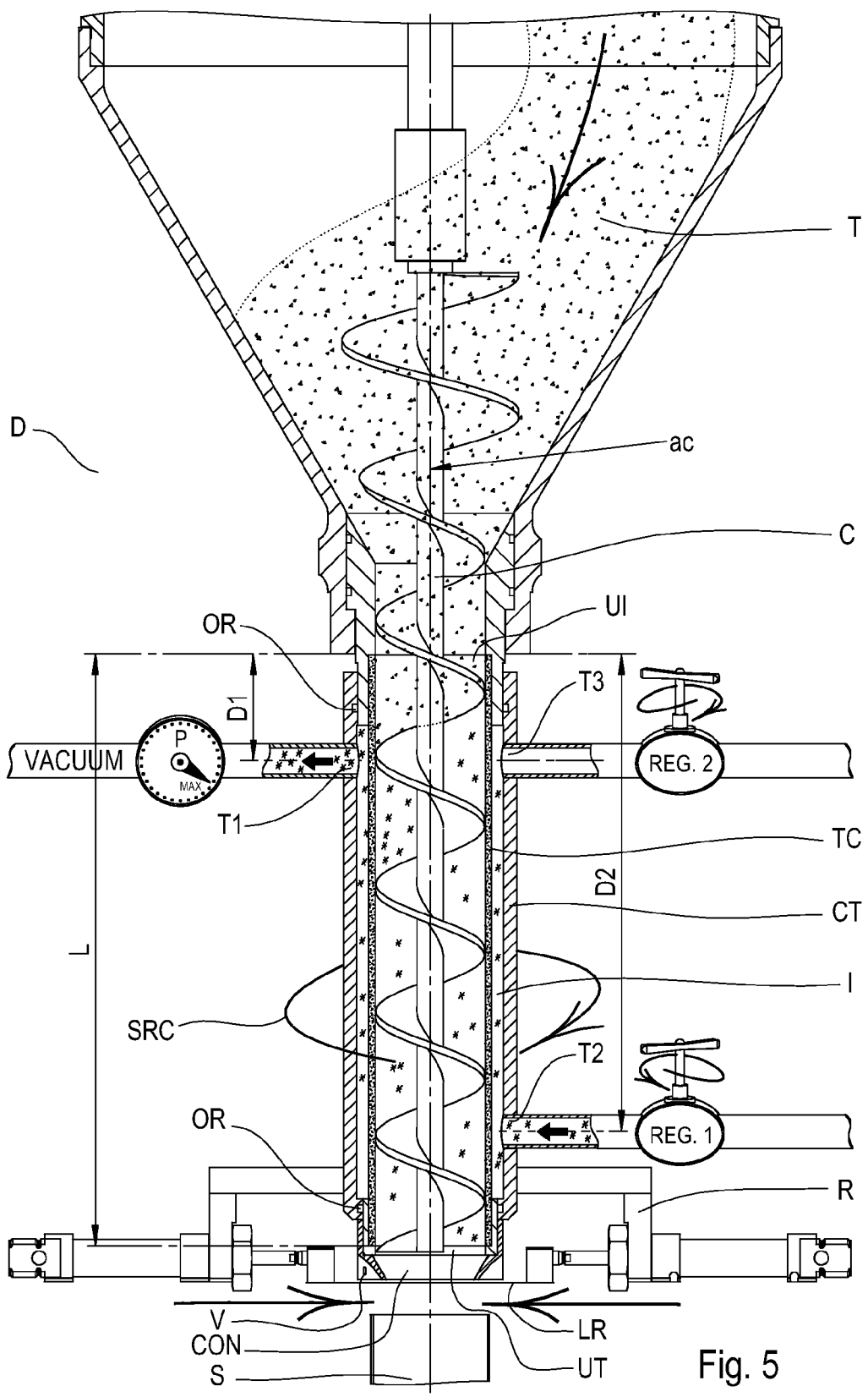
FIG. 5 schematically shows the step of creating a vacuum in a system for packaging powders according to an embodiment of the present invention.

FIG. 5 shows a step of sucking air from the inner region of the hopper T and of the first tube TC so as to compact the conveyed powders and to effectively draw the powders from inside the hopper T towards the first tube TC. The vacuum pump P is activated so as to suck air through the first opening T1. Moreover, the screw conveyor C is actuated so as to push the compacted powder towards the outlet UT of the first tube TC. The product thus begins to drop inside the first tube TC and to be compacted. In the example shown in the figures the screw conveyor C rotates in the clockwise direction SRC. The direction of rotation SRC is dictated by the direction in which the screw conveyor C is mounted. In the case in which the screw conveyor C is mounted in the opposite direction, the direction of rotation would be anti-clockwise.

FIG. 5 also shows that the regulator REG1 is opened so as to introduce air, for example cold and/or dry air from the opening T2. The cold air introduced from the opening T2 makes it possible to cool the system, for example the first tube TC.

Based on the present invention, it is possible to constantly detect the temperature of one or more of the various components of the system.

For example, it is possible to apply a common temperature sensor V (for example pt100) on the outer surface of the conical terminal CON to control the temperature thereof, for example to control that such a temperature is kept inside the range from 20° C. to 40° C.

The system can be provided with a feedback control that, based on the temperature detected by the temperature sensor, adjusts the temperature of the cold air introduced through the second opening T2. For example, the cold air can be taken from a tank. In this case, the feedback control can cool the air in the tank to the desired temperature. Alternatively, the cold air can be taken from different tanks at different temperatures. In this case, the feedback control can control from which tank to take the air.

In addition, the air blown from the opening T2 makes it possible to partially compensate for the air sucked through the first opening T1 so as to be able to control the degree of compacting of the powders inside the first tube. Indeed, it has been observed that in the case of excessive compacting of the powders through suction from the first opening, the advancing of the powders in the system could be obstructed. It is thus possible to partially compensate for the suction effect from the first opening by controlling the air flow introduced from the opening T2 obtaining a precise control of the degree of compacting of the powders and thus reducing the probability of blocking the advancing of the powders in the system. The introduction of air through the second opening T2 causes a variation of the operative conditions of the vacuum pump P. The air blown from the opening T2 can be replaced with an inert gas, like for example nitrogen. This solution is particularly advantageous since, given that the air originally contained inside the powders is mostly sucked by the first opening T1, it is possible to enrich the atmosphere inside the first tube TC with an inert gas and thus obtain an oxygen-poor atmosphere. Therefore, in the case in which the powders used are for example coffee, it is possible to obtain packages having compacted powders but not under vacuum and having an extremely low amount of oxygen. In this way it is possible to prevent the oxidation of coffee. For example, it is possible to have a final coffee package that in appearance seems normal but contains an extremely low amount of oxygen, even though it is not under vacuum. Indeed, in the case for example in which the user decides to blow a large amount of inert gas through the second opening T2, it is possible to partially or even completely eliminate the vacuum effect and use the system described above to greatly lower the amount of oxygen contained in the final package.

During the period of activity of the vacuum pump P the suction pressure can for example reach a value of the order of a tenth of a bar, for example it can be in the range from 0.2 bar to 0.6 bar in the case in which the first regulator Reg1 is closed. In the case of opening such a regulator in order to adjust the degree of compacting of the powders, the suction pressure of the vacuum pump can be raised for example by 10-30% depending on the required degree of compacting and thus on how much air is blown inside the second opening.

Moreover, the suction flow rate of the vacuum pump P can be controlled from a pressure or depression sensor (not depicted) positioned inside the hopper T. Indeed, in order to reach a constant flow rate inside the screw conveyor C it is important for the powders to be drawn directly from inside the hopper T by the depression formed there. In the case for example in which the pressure inside the hopper T is too high, there could be variations in flow rate inside the screw conveyor C, due to a non-homogeneous degree of compacting of the powders, which could result in errors in measuring the amount of product to be inserted in the package.

Therefore, depending on the pressure detected by the pressure sensor positioned inside the hopper T it will be possible to consequently adjust the flow rate of the vacuum pump P.

It is clear that the depression inside the hopper T during the period of activity of the vacuum pump P will not be homogeneous in every point of the hopper T. Therefore, the adjustment will depend greatly on the point at which such a depression is measured. Indeed, the closer such a sensor is positioned to the first tube TC, the lower the value of the detected pressure will be. The inventor has discovered that it is particularly advantageous to position for example the depression sensor a distance from the inlet of the first tube TC equal to at least half of the height of the hopper, more preferably at least ¾ of the height of the hopper T so as to make it possible to effectively detect the influence of the vacuum pump P on the powders that enter the inlet of the hopper T.

In particular, the inventor has discovered that to prevent oscillations in flow rate during the period of activity of the vacuum pump P it is particularly advantageous to directly connect the input signal coming from the pressure sensor in the hopper T with the regulator (not depicted) that controls the flow rate of the vacuum pump P. Indeed, as soon as the pressure sensor detects a pressure increase in the hopper T, the regulator can transmit a signal to the vacuum pump P thus increasing the suction flow rate of the pump P.

However, alternatively, it is also possible to ensure that the variation signal at the vacuum pump P is provided only after the pressure inside the hopper T has changed by a greater range than a predetermined range so as to prevent an excessive change of the operating parameters of the vacuum pump P.

Moreover, it is also possible to insert a pressure sensor (not depicted) inside the gap I so as to measure the depression inside the gap I and thus so as to be able to detect the degree of compacting of the powders.

Moreover, such a pressure sensor can be connected to the regulator REG1 of the second opening T2 so as to adjust the degree of opening of the regulator REG1 depending on the detected depression and thus the degree of compacting of the powders. Such a pressure sensor is preferably positioned a distance from the first opening T1 greater than half of the length L of the first tube TC, more preferably a distance from the first opening T1 greater than ¾ of the length L of the first tube TC.

Figure 6:
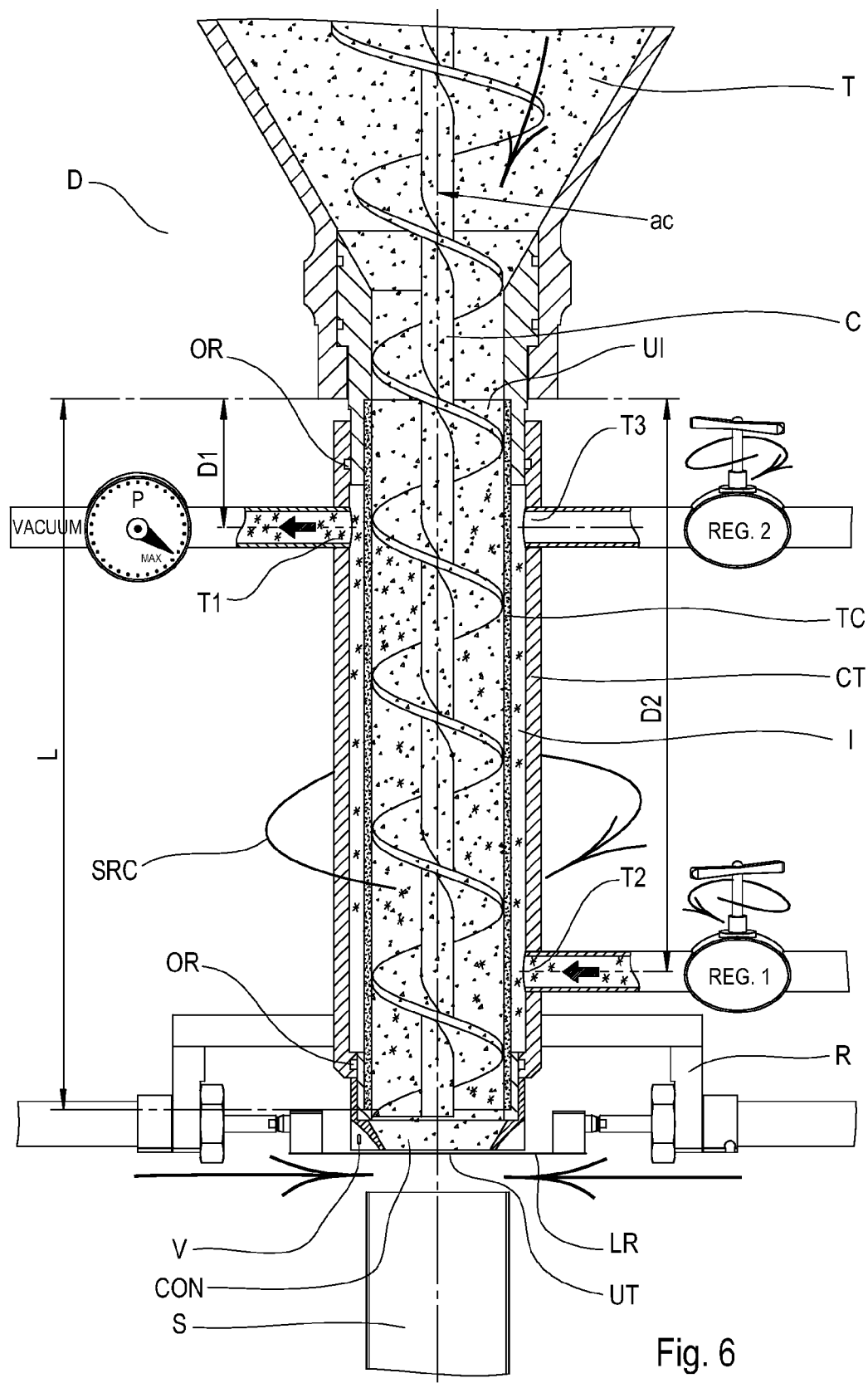
FIG. 6 schematically shows the filling of the tube through the rotation of the screw conveyor in a system for packaging powders according to an embodiment of the present invention.

FIG. 6 shows that the first tube TC is completely filled with compacted powders which reach the level of the closed shutter R. The shutter indeed blocks the passage of the powders.

Figure 7:
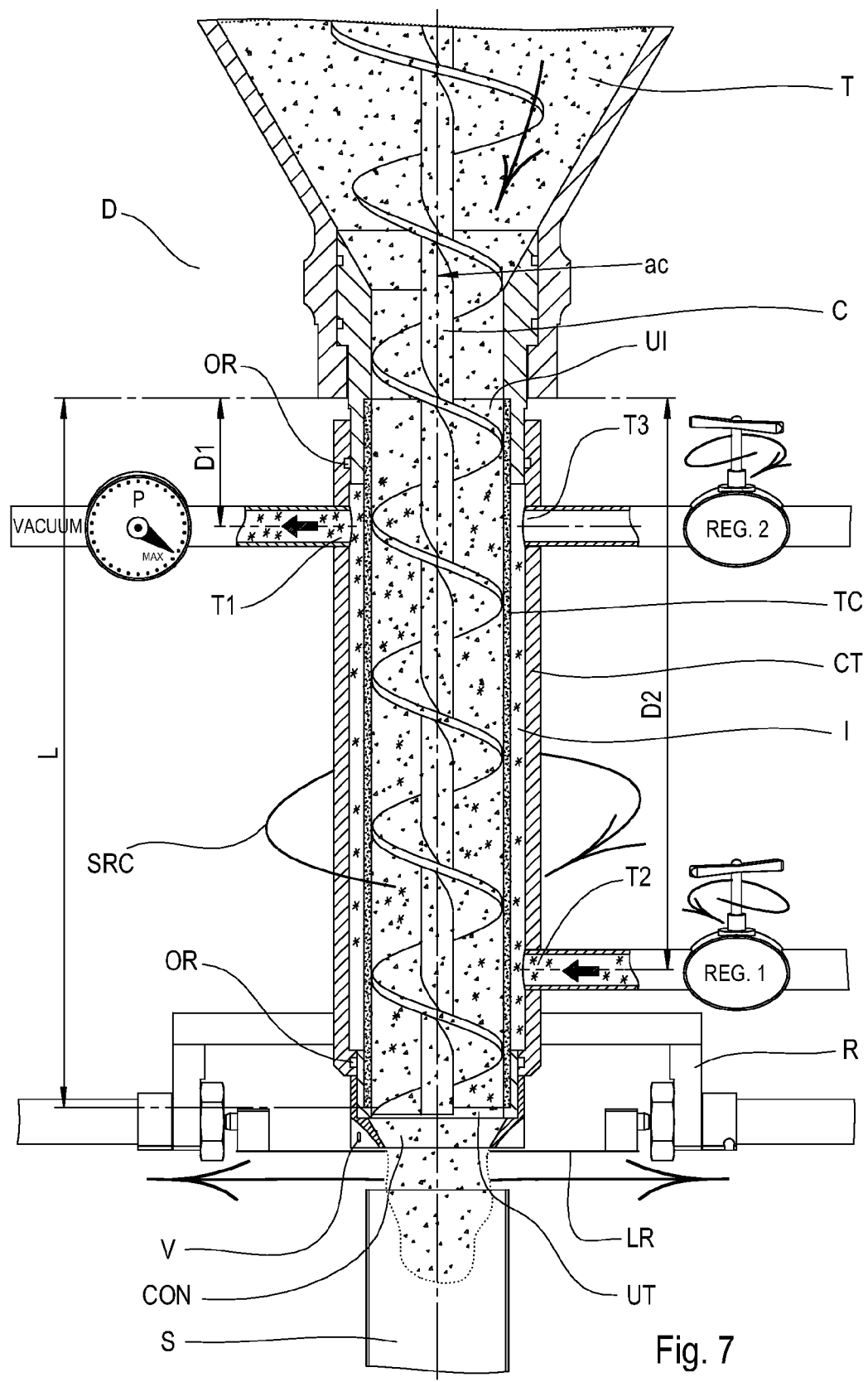
FIG. 7 schematically shows the initial step of filling a package in a system for packaging powders according to an embodiment of the present invention.

Hereinafter, as shown in FIG. 7, the shutter R is opened and the compacted product starts to drop into the package S.

Given that thanks to the system of the present invention the flow rate at the outlet of the screw conveyor C is constant and the rotation speed of the screw conveyor is a controllable parameter, it is possible to precisely control the amount of product exiting from the shutter R by adjusting the rotation time of the screw conveyor that rotates at the controlled speed.

Figure 8:
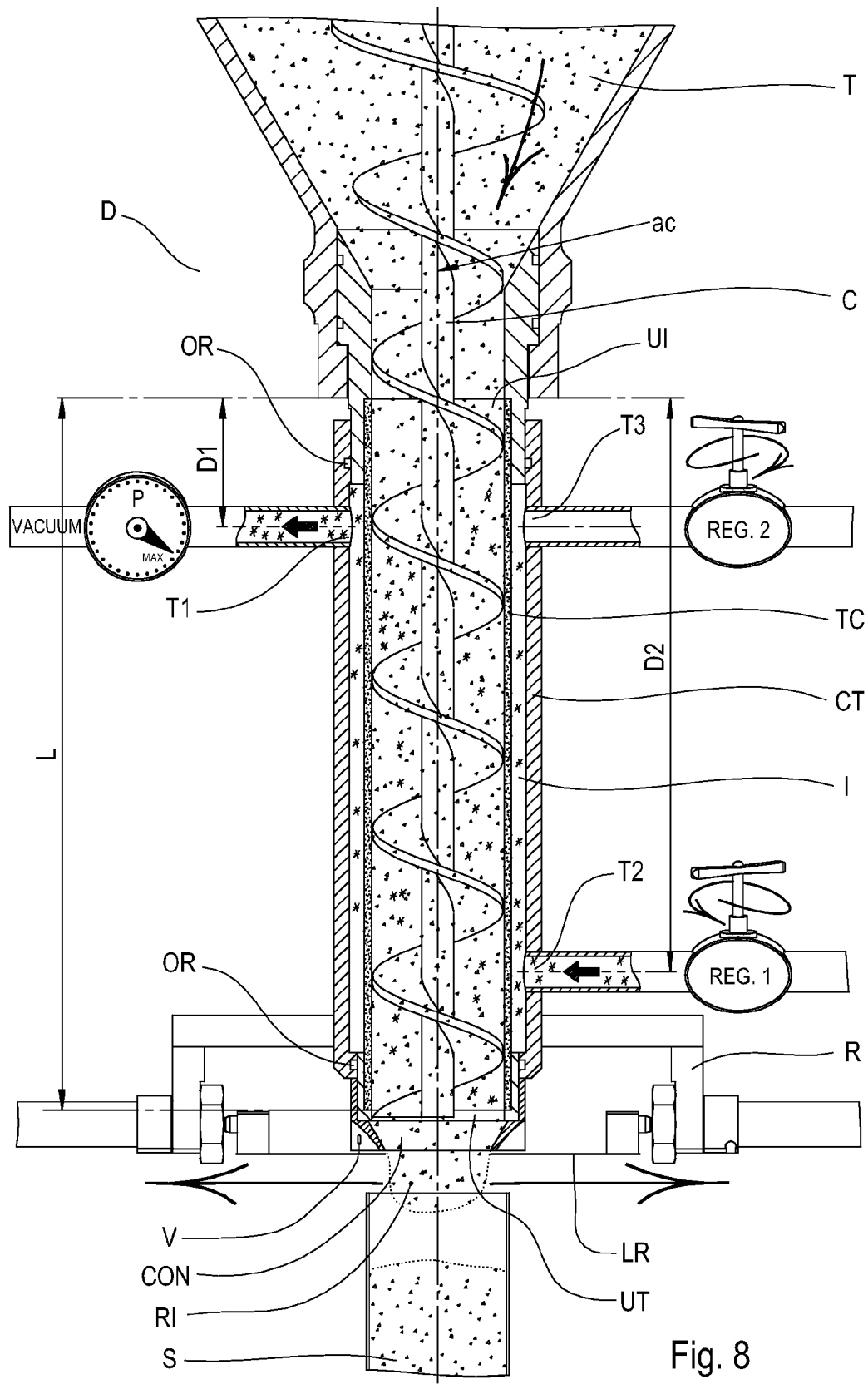
FIG. 8 schematically shows the step of stopping the screw conveyor with the package half-filled in a system for packaging powders according to an embodiment of the present invention.

Once the desired amount of product has been conveyed to the outside of the shutter R the rotation of the screw conveyor C is stopped (FIG. 8).

As shown in FIG. 8, following the compacting of the powders, sometimes not all of the compacted product falls inside the package S. Indeed, there can be a remainder RI of compacted powders exiting from the shutter R which could remain constrained to the powders contained inside the first tube TC due to the high degree of compacting and/or the depression inside the first tube TC.

These amounts can also reach values of 8-10 g or even greater, depending on the type of material and the degree of compacting.

Figure 9:
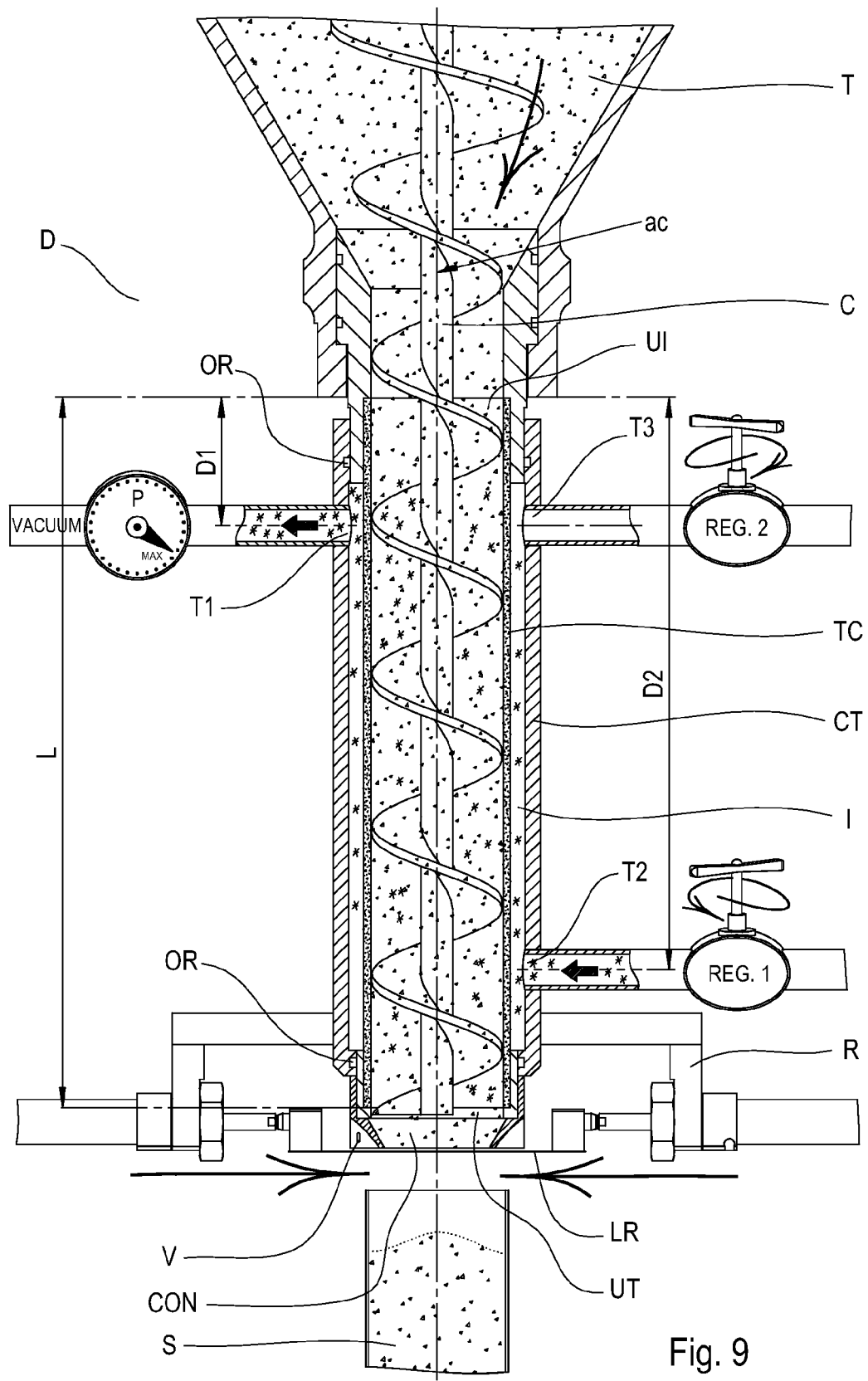
FIG. 9 schematically shows the closing of the shutter with the cutting of the remainder of initial product in a system for packaging powders according to an embodiment of the present invention.

FIG. 9 shows that the shutter R is subsequently closed again. Through the closing of the shutter R the remainder RI of compacted powders exiting from the shutter R is thus cut and adds to the amount of powders already present in the package S.

In this way it is possible to obtain a high precision of dosing. Such precision is dependent on the amount of compacted powders to be inserted in the container S. As an example for a container S containing 1 Kg of compacted powders there can be 1 g.

The plates LR of the shutter R further ensure a closure of the tube and therefore avoid the loss of product in the passage from one package S to the next. Therefore, when a second package S2 reaches the outlet of the shutter R, as shown in FIG. 10, the plates LR of the shutter reopen and the new package S2 can thus be filled. In addition, the plates LR of the shutter R, thanks to the fact that they are configured so as to be able to close the lower opening of the first tube TC, make it possible to increase the degree of vacuum inside the system, thus resulting in a greater degree of compacting.

Figure 11:
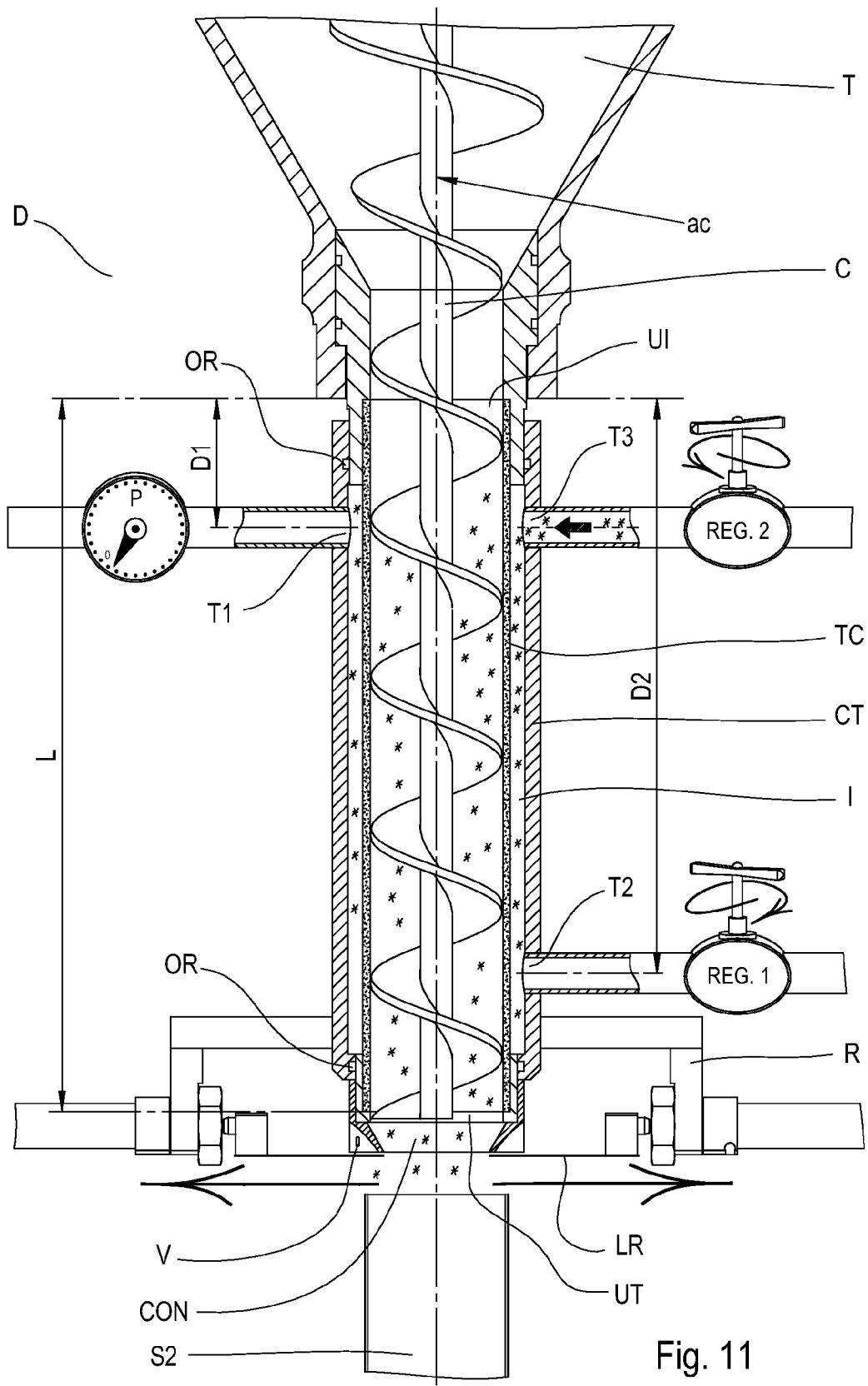
FIG. 11 schematically shows a cleaning operation of the first tube in a system for packaging powders according to an embodiment of the present invention.

Based on the present invention, a method is also described for a cleaning operation of the first tube in the system 100 for packaging powders. FIG. 11 shows the method for carrying out the cleaning of the first tube TC which is made of porous material. During cleaning the vacuum pump P is switched off and the regulator REG 1 is closed. Thereafter, the second regulator REG2 is opened and pressurised air flows inside the gap I. Inside the gap a maximum pressure of 5-6 bar can be reached so as to be able to effectively open the clogged pores.

Figure 12:
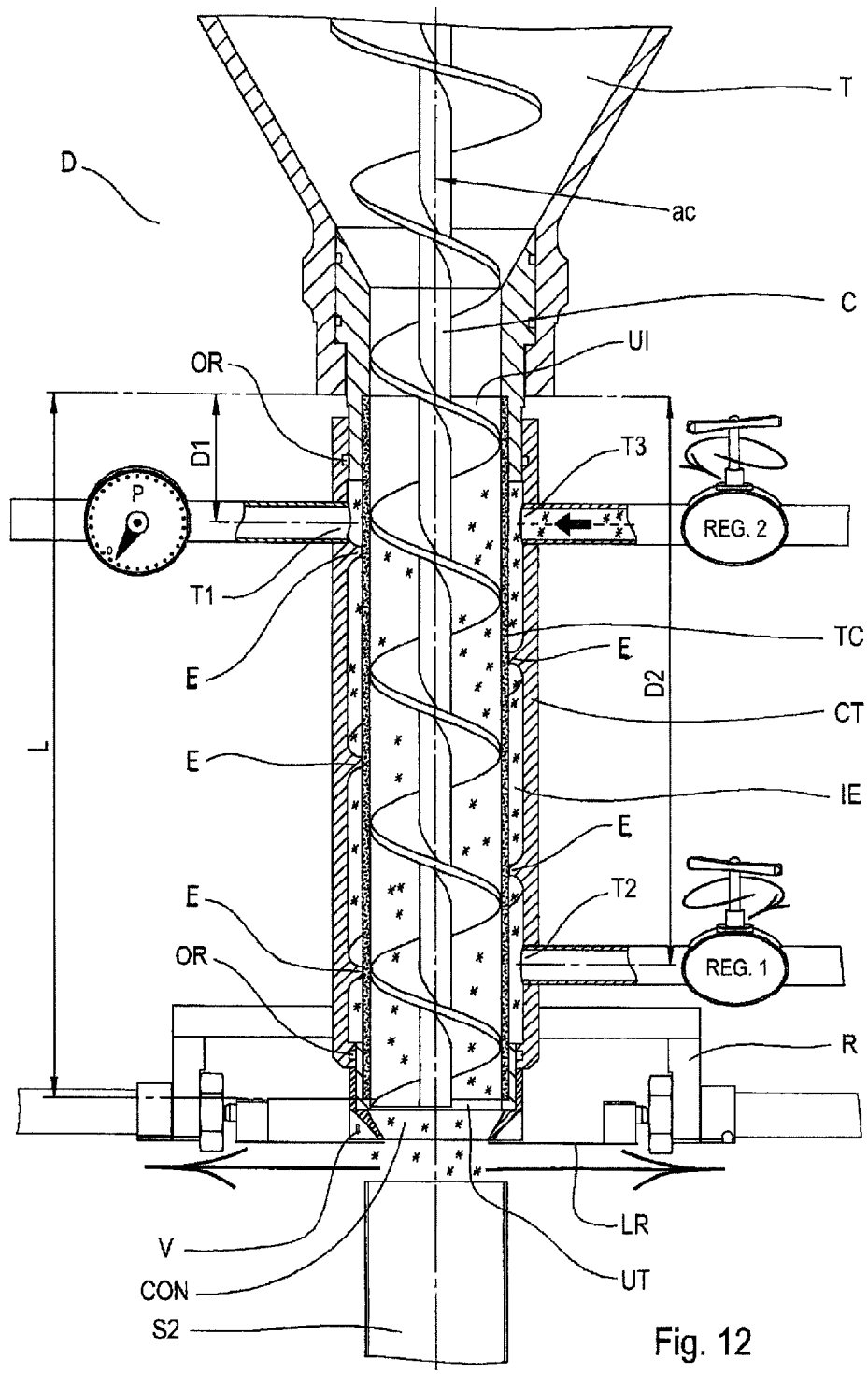
FIG. 12 schematically shows a cleaning operation of the first tube in a system for packaging powders according to a further embodiment of the present invention.

FIG. 12 schematically shows a system for packaging powders 100 according to a further embodiment of the present invention. As can be seen from FIG. 12, inside the second tube CT there is a spiral IE configured so as to convey air from the second opening T2 to the first opening T1. The definition of an air path makes it possible to effectively convey the air blown inside the cavity I on the entire perimeter of the outer surface of the first tube TC.

For example, the spiral can be made by forming a threading E on the inner wall of the second tube CT. The first tube TC is in contact with the threading E. The path for the air is made between the turns of the threading.

FIG. 12 in particular shows a cleaning step. In this case the cleaning operation is carried out for a packaging system 100 comprising a spiral IE inside the second tube CT. Such an operation comprises the same steps described with reference to FIG. 11. The pressurised air follows the path defined by the spiral IE.

Hereinafter, with reference to FIGS. 17 to 27, the operative steps of the system 101 shown in FIGS. 16a, b are described and a method for packaging powders based on a particular embodiment of the present invention is thus described.

The steps of compacting the powders of the system 101 are analogous to those of the system 100 presented above. The difference is indeed in the cutting of the powders and in the type of packaging. Therefore, by what has been stated, the method for packaging powders through the system 101 is distinguished from the method for packaging powders through the system 100 in that it occurs below the outlet of the first tube TC. The process described in FIGS. 17-20 therefore coincides with the process described earlier in FIGS. 4-6.

Figure 21:
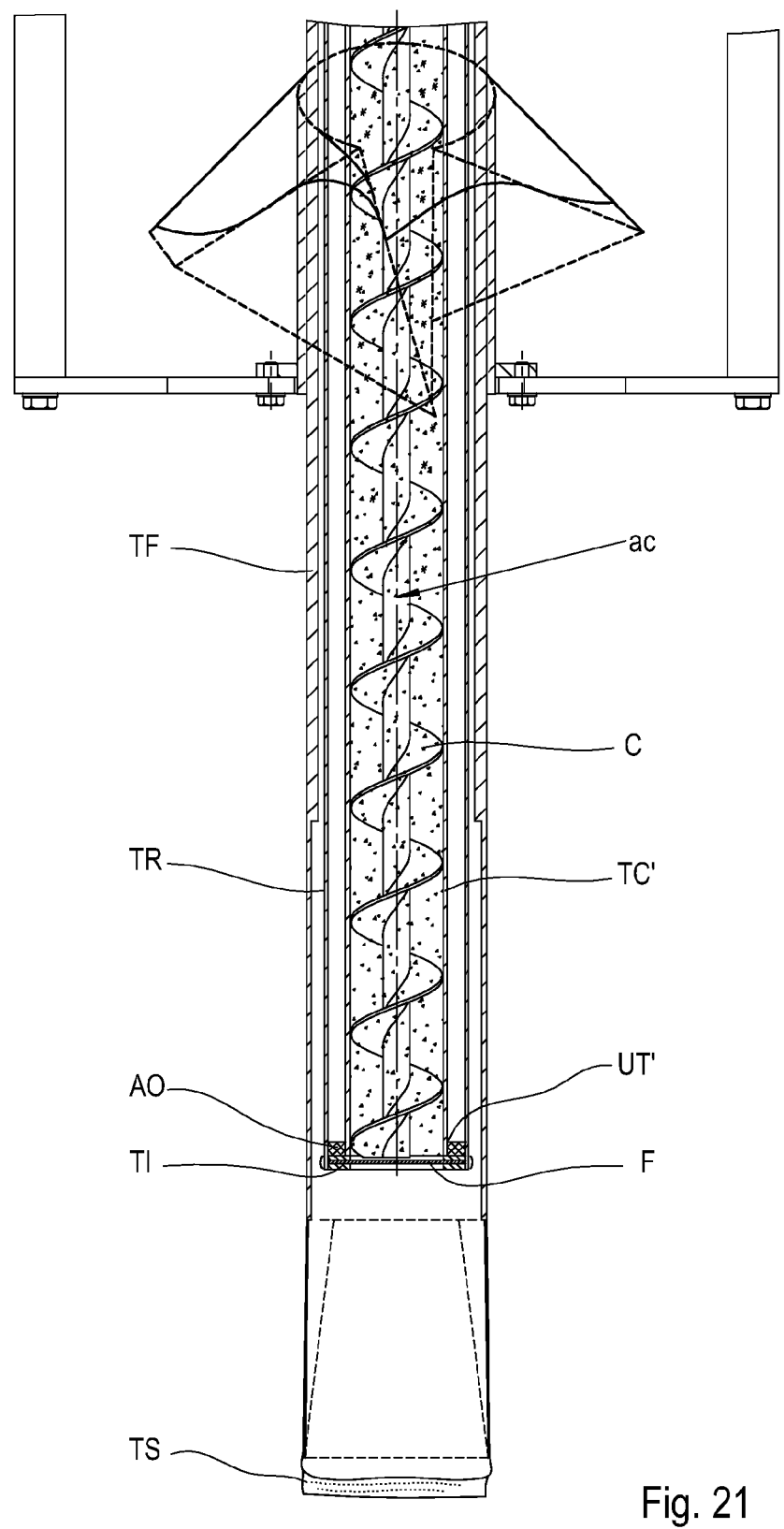
FIG. 21 schematically shows the lower part of a system for packaging powders in the state in which the tube has been filled according to an embodiment of the present invention.

FIG. 21 represents the initial step of feeding the extension tube TC' with the compacted powders. The vertical packager slides the film coming from the reel B downwards, welded longitudinally and arranged on the outer surface of the forming tube TF. Such a film slides to the outlet of the forming tube TF so as to form a tubular element TS that in a second step, after filling a welding closed, will form the package. As shown in the figures, the tubular element TS is welded at the bottom, and such a process will however be described hereinafter.

Figure 22:
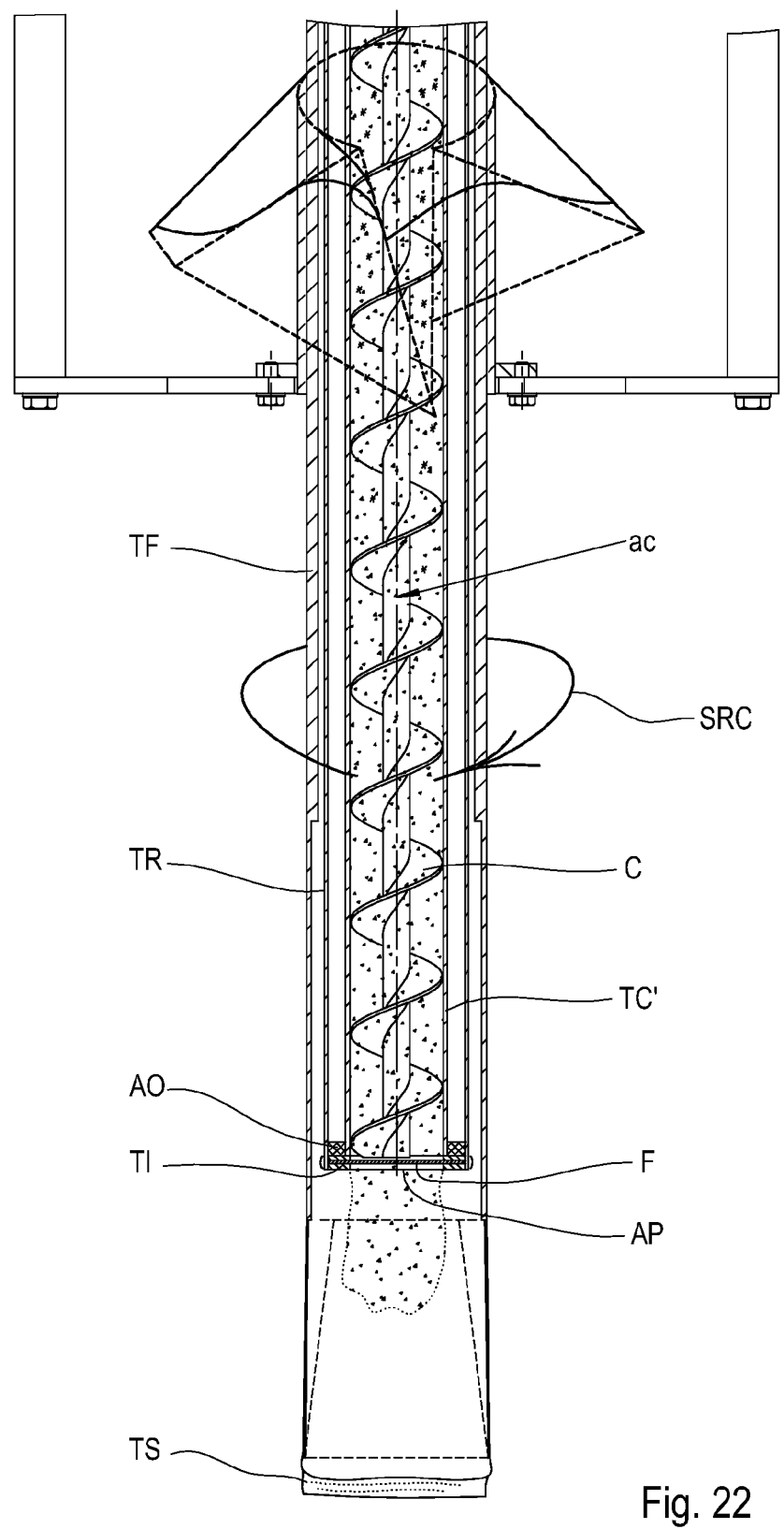
FIG. 22 schematically shows the descent of the compacted powders inside the tubular element in a system for packaging powders according to an embodiment of the present invention.

In a subsequent step, depicted in FIG. 22, the volumetric dosing of the screw conveyor C takes place. By rotating around its axis ac, it makes the required volumetric amount of compacted powders reach the tubular element. Since the powders are compacted homogeneously, the amount by weight of compacted powders arriving at the tubular element is therefore also known. In this step, as described earlier and as represented in the figures, there is only the movement of the screw conveyor C around its axis ac in the direction SRC represented in the figures, whereas all of the other moving members are stationary.

Figure 23:
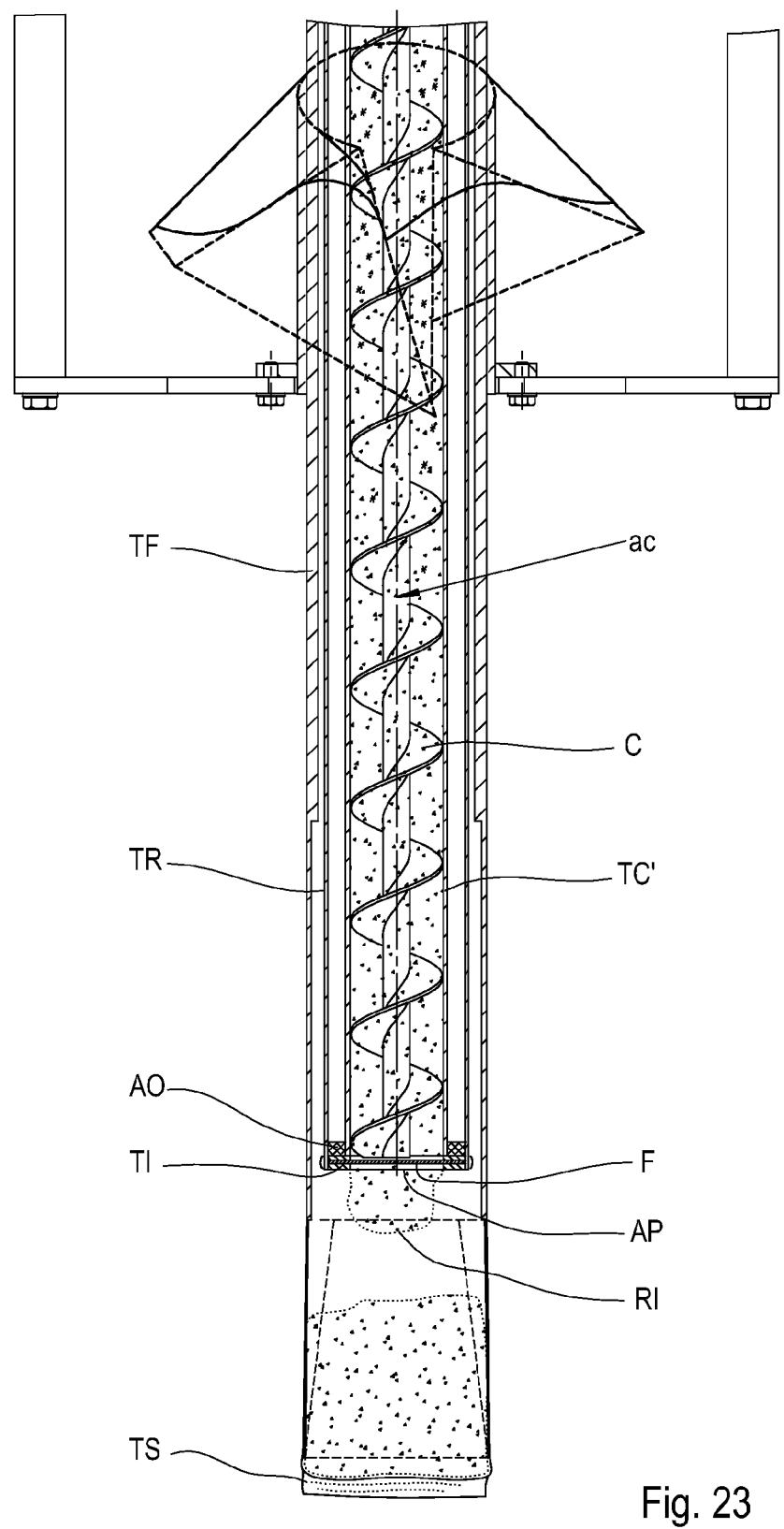
FIG. 23 schematically shows the stopping step of the screw conveyor with the package half-filled in a system for packaging powders according to an embodiment of the present invention.

In a subsequent step, represented in FIG. 23, after the required flow rate of compacted powders has reached the tubular element TS, the stopping of the screw conveyor C takes place. However, due to the high degree of compacting and/or due to the vacuum present inside the extension tube TC' a part RI of the compacted powders remains anchored to it and does not detach by gravity. The vacuum present inside the extension tube TC' is due to the fact that for the compacting of the powders the air contained inside the powders is extracted thus forming a large depression area. Such a remainder RI can represent a significant weighing error in filling. Such an error is accentuated more for smaller packages.

For this reason it becomes necessary to cut the remainder RI of the compacted powders still anchored to the outlet. Therefore, as shown in FIG. 24a, through the movement of the lever LC along the direction SRLC it is possible to move the upper flange FS of the second tube TR so as to allow the rotatable tube TR to rotate about its axis. The degrees by which the rotatable tube TR is rotated depend on the number of wires or blades of the cutting means F used. Indeed, in order to cut the remainder RI effectively, it is necessary to rotate the cutting members F by an angle greater than or equal to the angular distance between two wires. In the case for example in which it concerns a single wire the rotation will be equal to 180°, in the case of two wires the rotation will be equal to 90°, in the case of four wires it will be equal to 45° and so on. As described previously the number of wires is dependent on the type of powders and on the degree of compacting and it can be changed depending on which materials are being used. It is clear to those skilled in the art that the cutting system through a rotatable terminal TI can be used in the system 100 presented above by replacing for example the shutter R with the rotatable terminal TI that contains the cutting means F. The rotation of the rotatable terminal TI can in this case be ensured by the rotation of the second tube CT.

In the embodiment depicted, the lever LC allows the rotation of the flange FS in both directions: clockwise and anti-clockwise. Therefore, in the case depicted it is possible, once cutting has been carried out, to return to the starting position. It is obvious to those skilled in the art that in the case in which it is wished to avoid the step of returning to the starting position the lever LC can be replaced with a system that allows the upper flange FS to rotate 360° like for example gear, rack or similar systems.

Figure 25:
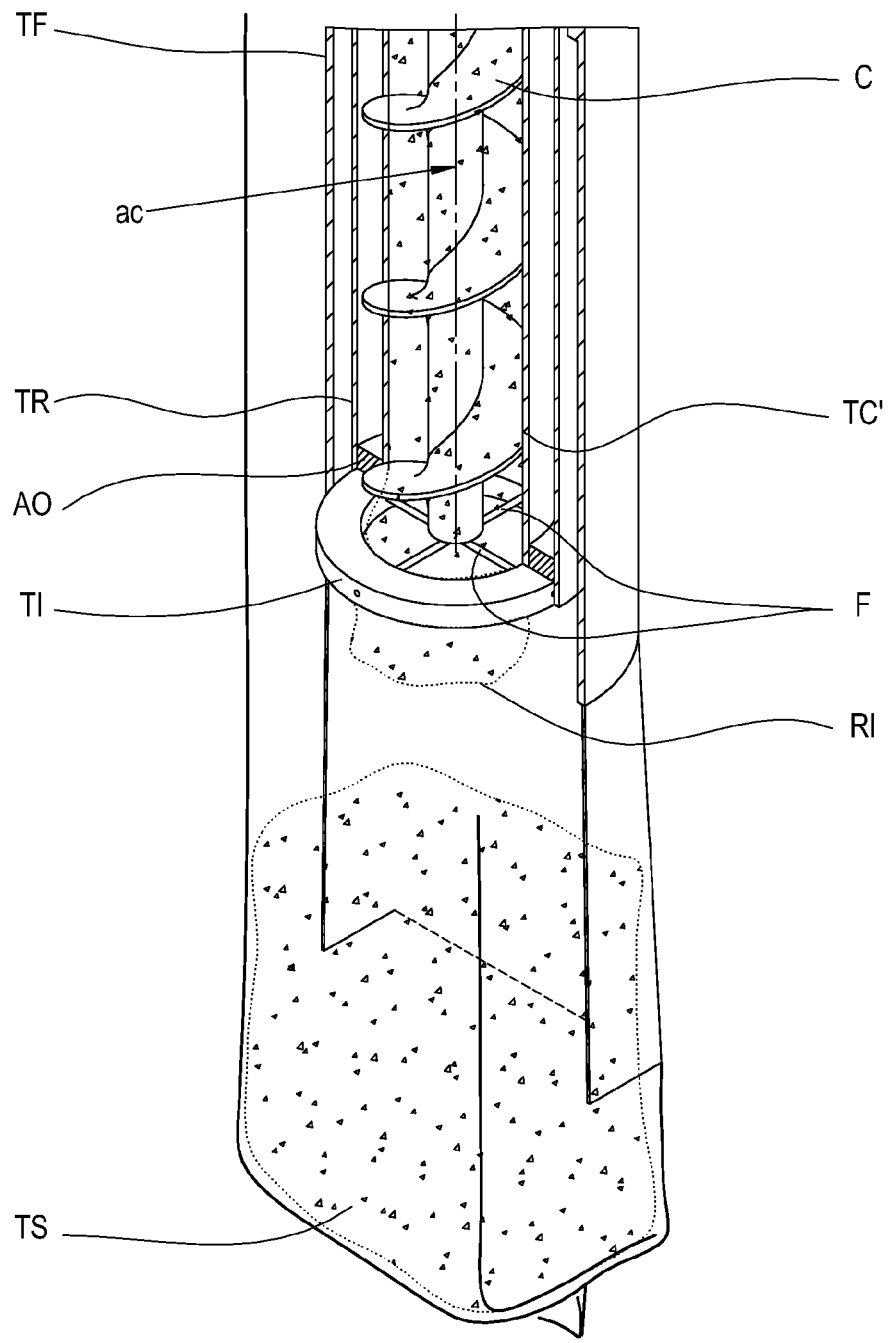
FIG. 25 shows a detail of the stopping step of the screw conveyor with the package half-filled in a system for packaging powders according to an embodiment of the present invention.
Figure 26:
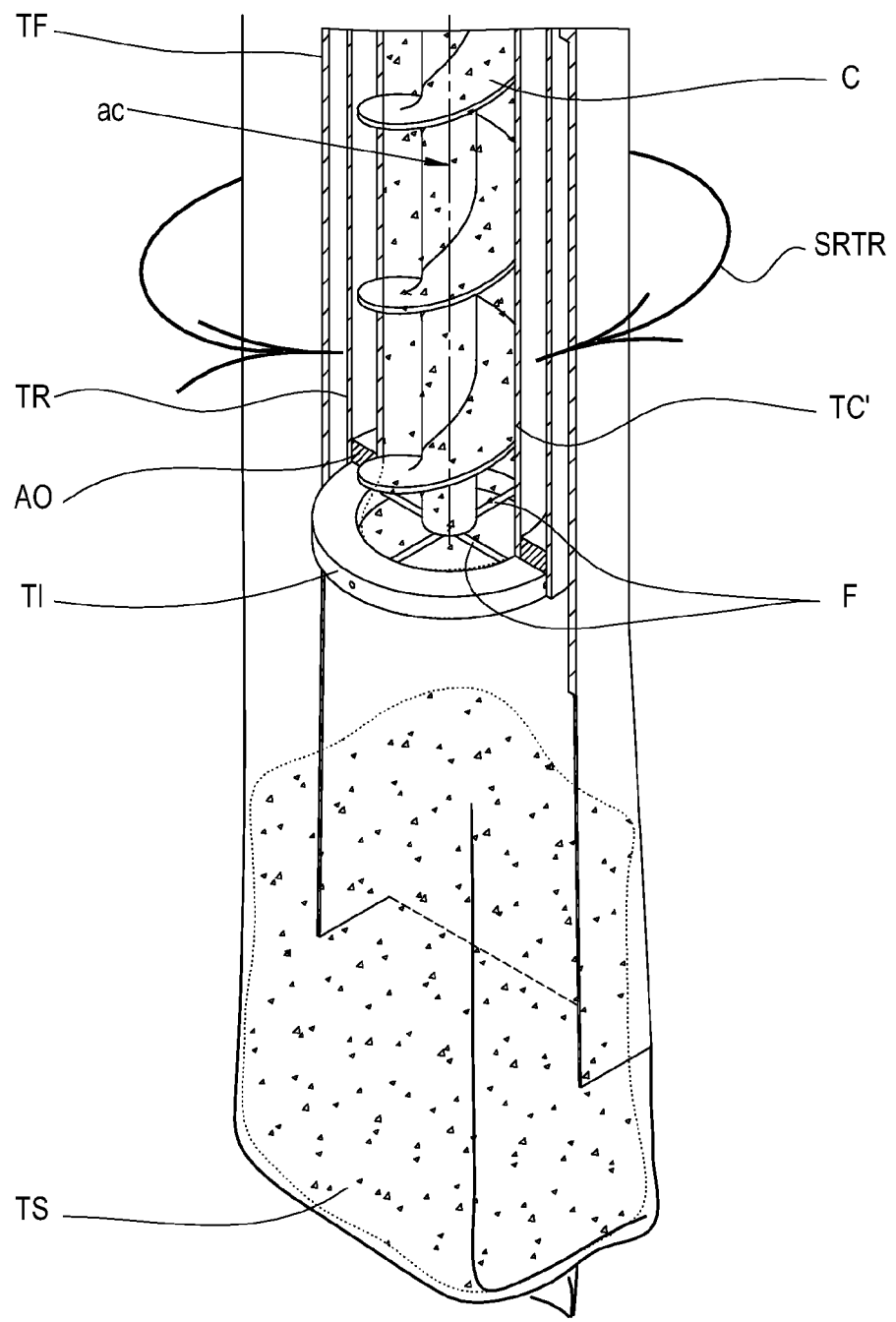
FIG. 26 shows the rotation of the tube rotating in a system for packaging powders according to an embodiment of the present invention.
Figure 27:
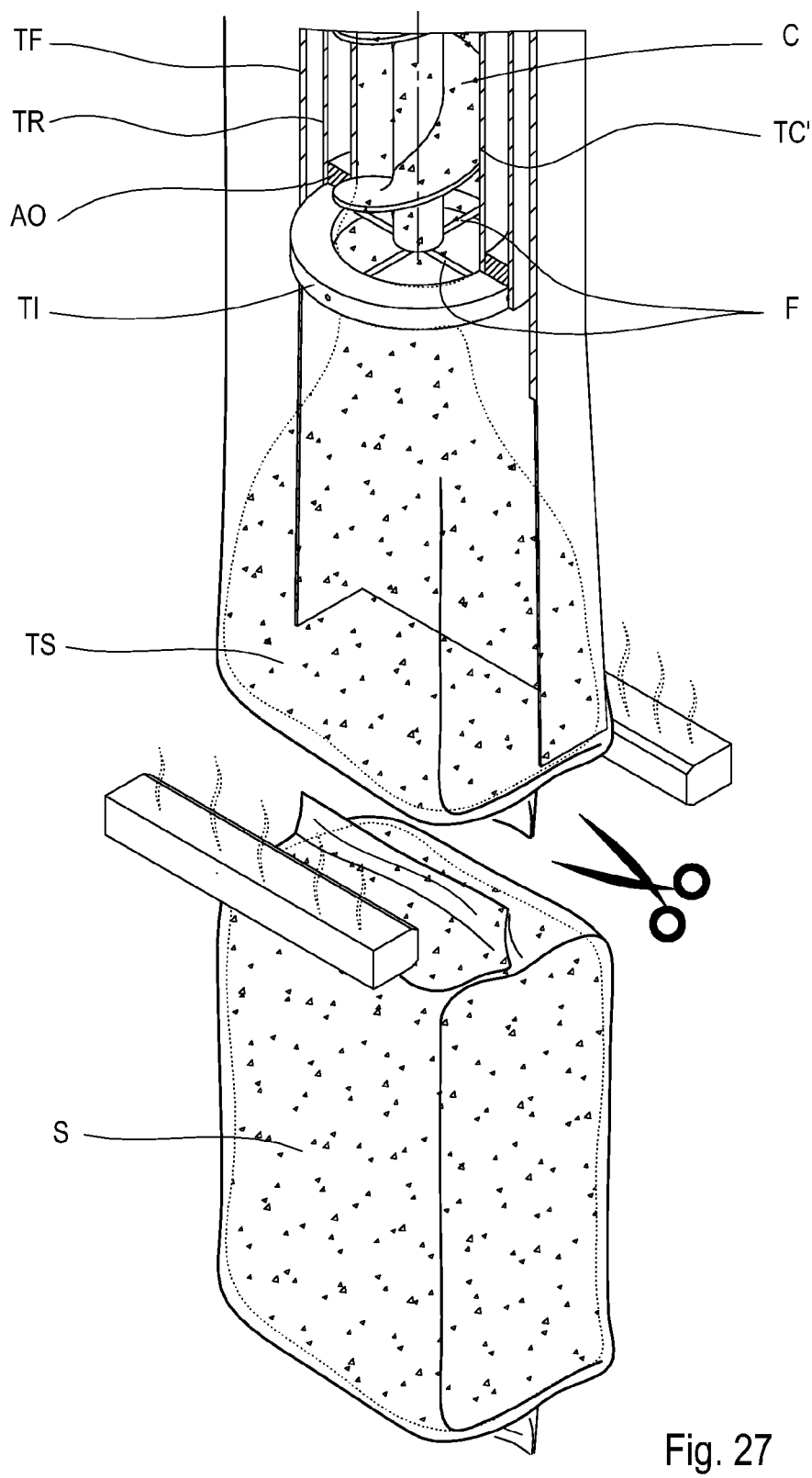
FIG. 27 shows the completion of the packet with shearing and welding in a system for packaging powders according to an embodiment of the present invention.

FIG. 25 represents a detail of the remainder RI still anchored to the outlet of the first tube. Following the rotation by 90° of the rotatable tube TR (represented in FIG. 26) and thus consequently the rotation of the rotatable terminal TI having cutting means F made up of two wires, the remainder is driven inside the tubular element TS so that the required amount of compacted powders is conveyed inside the tubular element TS.

In the case described above, following cutting, the rotatable tube TR is brought back into the position where it was before the rotation described above. Alternatively, it is also possible to proceed with a rotation in a first direction, then carry out the dosing step through the rotation of the screw conveyor C, and thereafter take the rotatable terminal TI to its original position by carrying out a second rotation in the opposite direction with respect to the first. In this way, the cutting would be carried out in the return step of the rotatable terminal TI. Therefore, the rotatable terminal TI will in this case be equipped with blades directed so as to be able to cut in the return step in the case in which blades have been selected as cutting means F. On the other hand, in the case in which they are cutting means TI represented by wires, in this case there is not the problem of the cutting direction since they can be used without distinction in both of the cutting directions.

At this point the tubular element TS is ready to be closed. Therefore, in a subsequent step, depicted in FIG. 27 the closing of the upper part of the tubular element TS takes place through welding and therefore there is thus the formation of a package S. In carrying out the welding at the same time both the lower part of the new tubular element TS is closed and the upper part of the old tubular element TS is closed, thus forming a package S. After the welding has been carried out the package produced can be separated from the tubular element TS through shearing. Following the welding process and before the shearing process is carried out it is already possible to fill the next tubular element TS since, as stated, with the welding the lower closure of the new tubular element TS is prepared. In particular, said processes can also be carried out simultaneously.

Figure 24B:
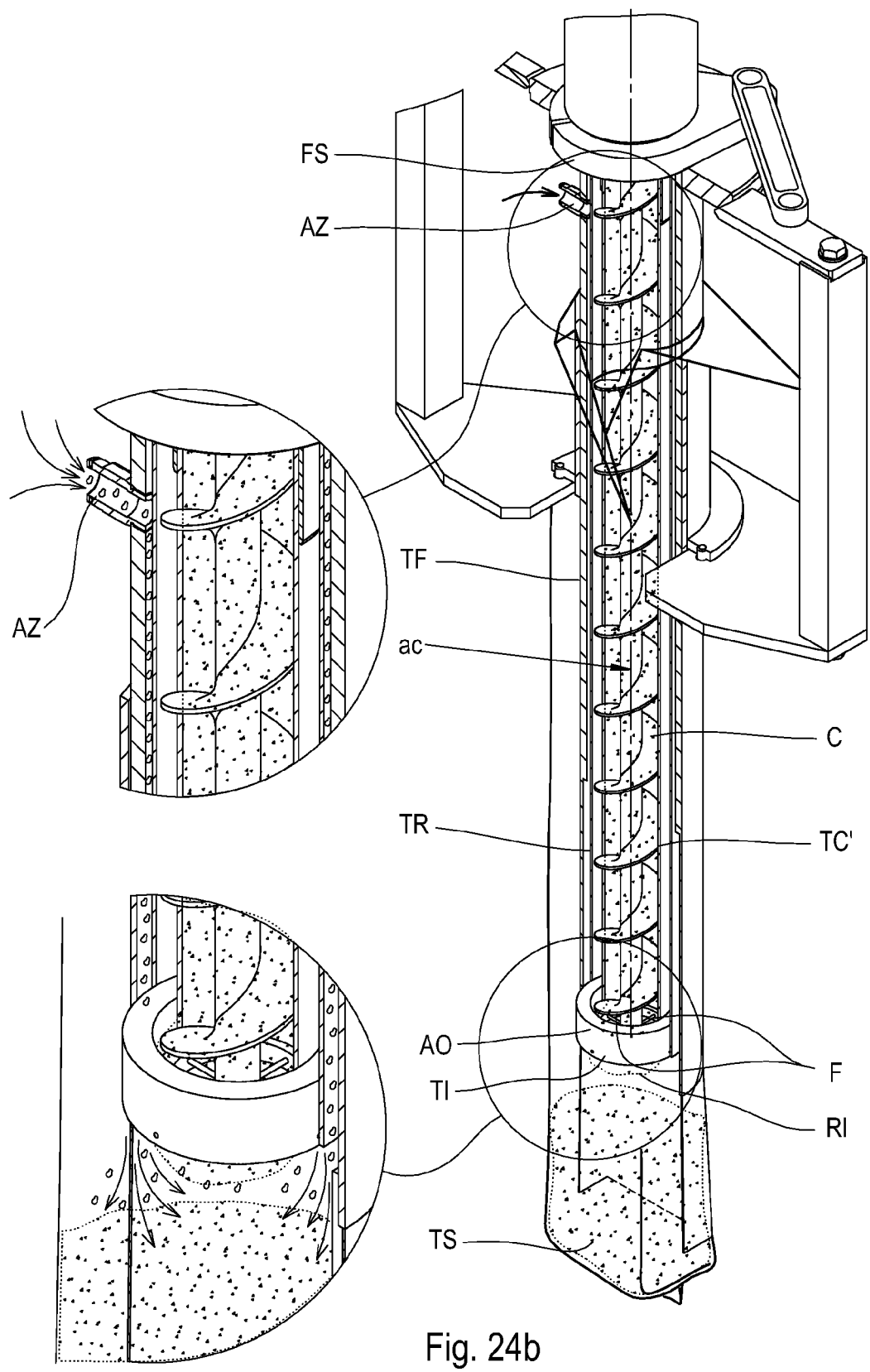
FIG. 24b schematically shows a three-dimensional view of the stopping step of the screw conveyor with the package half-filled while an introduction of gas in the opening of the forming tube takes place in a system for packaging powders according to an embodiment of the present invention.

As shown in FIG. 24b, in order to make it possible to compensate for the depression contained inside the tubular element TS it is possible to insert gas inside the gap formed between the rotating tube TR and the forming tube TF. In this way, it is thus possible to compensate for the air that is drawn from inside the tubular element TS through the various tubes. The compensation is particularly important for the formation of the tubular element TS since it, expanding outwards, draws air inside it through the tubes with which it is placed in communication. In the absence of such compensation therefore the package S could be ruined.

Moreover, in the case in which it is wished to prevent the contact of the compacted powders (which therefore have previously been removed of much of the air contained inside them) with an oxygen-rich atmosphere, it is possible to introduce an inert gas, like for example nitrogen inside the opening AZ of the forming tube. In the case for example in which coffee is being handled, this solution is particularly advantageous since, as well known, it would be harmful for the coffee to be in contact with an oxygen-rich atmosphere, since the coffee could oxidise.

The amount of gas to be inserted inside the opening AZ is adjusted according to what depression is created inside the tubular element TS during the unwinding step. Such a depression can indeed be different depending on the format of the package to be made and on the type of film used. Such adjustment can for example be carried out through a tap.

As shown in FIG. 2b, gas can be introduced inside the opening ATP of the feeding tube TP. Such a gas is preferably an inert gas such as nitrogen. This solution is particularly advantageous since it makes it possible to enrich the atmosphere inside the hopper T with an inert gas and thus reduce the amount of oxygen contained by percentage. In this way, combining the introduction of nitrogen with the suction from the opening T1 it is thus possible to obtain an oxygen-poor atmosphere. Such an opening ATP can also be represented by a plurality of openings so as to be able to increase the amount of gas introduced. According to alternative embodiments of the present invention, openings (not depicted) can be carried out on the outer surface of the hopper T replacing or in addition to the opening ATP of the feeding tube.

Therefore, combining the introduction of nitrogen in the opening ATP of the feeding tube TP and in the opening AZ of the forming tube TF, it is thus possible to obtain a package C having compacted powders, which however is not under vacuum, and having an extremely low amount of oxygen due to the fact that the atmosphere inside the packaging system has been enriched with an inert gas such as nitrogen.

It has been shown that the present invention makes it possible to substantially compact the powders to be packaged. This makes it possible to save, for the same weight, a substantial volume of the final package. For example, in the case of 1 Kg packages of flour, a reduction of the height of the packages by about 25-30 mm with respect to packages obtained with the systems and methods known in the state of the art has been observed. Moreover, by reducing the air inside the compacted powders and therefore the packages, the presence of gases, for example oxygen, which could deteriorate the packaged powders is substantially reduced. With the present invention benefits are thus obtained in terms of how long the properties of the packaged properties last, for example the organoleptic properties. Moreover, benefits are also obtained in economic terms, due to the saving of material necessary to form the packages. Moreover, benefits are also obtained in logistics: given that the packages contain less air, net of the weight of the product the volume to be transported will be less. These advantages thus make it possible to optimise production. Moreover, thanks to the installation of a vertical packager it is also possible to reach an extremely high packaging speed.

Even if the present invention has been described with reference to the embodiments described above, it is clear to those skilled in the art that it is possible to make different modifications, variations and improvements to the present invention in light of the teaching described above and in the attached claims, without departing from the object and the scope of protection of the invention.

For example, even if a system with vertical extension has been described, the system based on the present invention can also be implemented with horizontal extension. Moreover, even if the presence of a vacuum pump has been described, any other type of system for sucking air can also be used. Moreover, even if it has been shown that the present invention has a first opening adapted for removing air and a second adapted for blowing air, the present invention can be implemented with a plurality of air inlets and air outlets.

The method and the system for packaging powders described in the present invention makes it possible to package any type of powdered material in any field. An example of powdered material that can be packaged is flour, and more generally any type of powdered material present in the food industry. Another example is represented by powders used in the building trade, for example lime. A further example is represented by powders used to obtain beverages, for example ground coffee. The first tube can for example be interchangeable so as to be able to be replaced to change the filtering fineness in the case in which there are big variations in the grain size of the powder to be packaged.

In addition, even if the presence of cylindrical tubes has been shown, it is clear to those skilled in the art that such tubes can be replaced with any type of tubes, for example having sections of any shape like for example a square or polygonal section. It is clear for those skilled in the art that the term tube is meant in the widest sense to indicate any type of body having an inner cavity.

Moreover, the shape of the rotatable terminal as well as the shape of the tubes is not constrained to being round. Moreover, the step of cutting the package is not constrained to being carried out through mechanical shearing since it could for example be carried out by laser cutting. Moreover, even if a single opening of the hopper and of the forming tube adapted for blowing gas has been shown, the present invention can be implemented with a plurality of openings so as to make the distribution of air as homogeneous as possible.

Finally, fields that are deemed known by those skilled in the art have not been described in order to avoid needlessly excessively overshadowing the described invention.

Consequently, the invention is not limited to the embodiments described above, but is only limited by the scope of protection of the attached claims.

What is claimed is:

1. System for packaging powders comprising:
a hopper adapted for receiving the powders and a first tube having a total length comprising an inlet connected to said hopper, wherein said first tube internally comprises a screw conveyor configured so as to rotate about an axis inside said first tube so as to convey the powders towards an outlet of said first tube,
wherein said first tube is made of filtering material and is arranged inside a second tube so as to make a gap between said first tube and said second tube, said gap being configured so as to be able to be, sealed;
wherein said second tube comprises a first opening located from the inlet of said first tube a first distance less than half of the total length of said first tube configured to be able to suck air from said gap and from said hopper;
wherein said second tube further comprises a second opening located from the inlet of said first tube a second distance greater than half of the total length of said first tube coupled to said gap forming an uninterrupted gap between said first tube and said second tube configured to be able to blow gas inside said uninterrupted gap and said second opening is connected to a regulator capable of adjusting the amount of the gas to be blown inside said uninterrupted gap depending on a desired degree of compacting of the powders,
and a pressurized air regulator capable of providing pressurized air connected to a third opening in said second tube and coupled to said uninterrupted gap, wherein the third opening is arranged close to the first opening, so that the pressurized air inserted through the third opening flows in an opposite direction with respect to a direction generated by a combined action of a suction through the first opening and introduction of the gas from the second opening;
a pressure sensor positioned inside said uninterrupted gap, said pressure sensor generating a pressure signal representative of a pressure within said uninterrupted gap; and
a controller coupled to said pressure sensor and said regulator and receiving the pressure signal from said pressure sensor, wherein said controller controls the regulator adjusting the amount of the gas to be blown inside said uninterrupted gap depending upon the pressure signal to adjust the pressure within said uninterrupted gap,
whereby the desired degree of compacting of the powders is capable of being obtained.

2. System for packaging powders according to claim 1, wherein said first opening is connected to a vacuum pump.

3. System for packaging powders according to claim 1, further comprising one or more temperature detectors to detect a temperature of one or more components of the system, wherein the system is configured to adjust one or more of the physical parameters from temperature, pressure or relative humidity of the air introduced through said second opening based on the temperature detected.

4. System for packaging powders according to claim 1 wherein:
the third opening is arranged at a third distance from the inlet of said first tube, wherein the third distance of the third opening is equal to the first distance of the first opening.

5. System for packaging powders according to claim 4 wherein:
the third opening is laterally opposite the first opening.

6. System for packaging powders comprising:
a hopper adapted for receiving the powders and a first tube comprising an inlet connected to said hopper, wherein said first tube internally comprises a screw conveyor configured so as to rotate about an axis inside said first tube so as to convey the powders towards an outlet of said first tube,
wherein said first tube is made of filtering material and is arranged inside a second tube so as to make a gap between said first tube and said second tube, said gap being configured so as to be able to be sealed;
wherein said second tube comprises a first opening configured to be able to suck air from said gap and from said hopper;
wherein said second tube further comprises a second opening coupled to said gap between said first tube and said second tube configured to be able to blow air inside said gap and said second opening is connected to a regulator capable of adjusting the amount of gas to be blown inside the gap depending on a desired degree of compacting of the powders; and
wherein inside said second tube there is a spiral configured so as to convey air from said second opening to said first opening.

7. Method for packaging powders in containers through a system that conveys the powders through a hopper and a first tube having a total length and having an inlet connected to said hopper with a screw conveyer towards the containers, wherein said method comprises the following steps:
sucking air from an uninterrupted inner region of said hopper and of said first tube at a first location from the inlet of said first tube a first distance less than half of the total length of said first tube so as to compact the conveyed powders;
detecting a pressure of the air within the uninterrupted inner region; and
introducing a gas in the uninterrupted inner region at a second location from the inlet of said first tube a second distance greater than half of the total length of said first tube to partially compensate for the air removed in said step of sucking air;
adjusting the pressure of the gas within the uninterrupted inner region during said step of introducing the gas while packaging of the powders in the containers so as to adjust the amount of gas introduced at the second location based on the pressure detected in said step of detecting the pressure; and
selectively injecting a pressurized gas into the uninterrupted inner region at a third location adjacent the inlet of the first tube,
whereby a degree of compacting of the powders inside said first tube is capable of adjustment during packaging of the powders and a constant flow rate of the powders is maintained with the screw conveyor.

8. Method according to claim 7, wherein said gas is introduced to adjust the degree of compacting is an inert gas.

9. Method according to claim 7, further comprising a step of detecting a temperature of one or more components of said system and a step of introducing gas wherein one or more of a parameter of the gas introduced among temperature, pressure or relative humidity is adjusted based on the detected temperature.

10. A system for packaging powders comprising:
a hopper having an outlet;
a first porous tube having a total length and an inlet adjacent the outlet of said hopper and an opposing outlet;
a screw conveyer extending through the outlet of said hopper and into said first porous tube;
a second tube placed around said first porous tube, wherein an uninterrupted gap is formed between an exterior surface of said first porous tube and an interior surface of said second tube, the uninterrupted gap having an upper seal and a lower seal;
a vacuum coupled to the uninterrupted gap adjacent the inlet of said first porous tube between the upper seal and the lower seal at a first distance from the inlet less than half of the total length of said first porous tube; and
an adjustable gas regulator coupled to the uninterrupted gap adjacent the opposing outlet of said first porous tube between the upper seal and the lower seal at a second distance from the inlet greater than half of the total length of said first porous tube;
a pressure sensor positioned inside the uninterrupted gap, said pressure sensor generating a pressure signal representative of a pressure within the uninterrupted gap; and
a controller coupled to said Pressure sensor and said regulator and receiving the pressure signal from said pressure sensor, wherein said controller controls the regulator adjusting the amount of gas to be blown inside the uninterrupted gap depending upon the pressure signal to adjust the pressure within the uninterrupted gap so as to obtain a desired degree of compacting of the powders; and
a pressurized air regulator capable of providing pressurized air connected to the uninterrupted gap at the first distance of said vacuum from the inlet of said first porous tube,
whereby compactness of the powders dispensed from said first tube is capable of being controlled by adjusting said adjustable gas regulator and said vacuum facilitating accurate packaging of the powder.

11. A method for compacting powder for packaging powders in containers comprising the steps of:
feeding powder into a first filtering tube having a total length and an internal screw conveyor and having an inlet and an outlet;
forming an uninterrupted gap around the first filtering tube with a second tube placed around the first filtering tube between the inlet and the outlet;
sealing the uninterrupted gap between the inlet and the outlet;

sucking a gas from the uninterrupted gap at a first location adjacent the inlet at a first distance from the inlet less than half of the total length of the first filtering tube;

detecting a pressure of the gas within the uninterrupted gap resulting from said step of sucking the gas from the uninterrupted gap;

injecting a gas into the uninterrupted gap at a second location adjacent the outlet at a second distance from the inlet greater than half of the total length of the first filtering tube sufficient to partially compensate for the gas removed from the uninterrupted gap in said step of sucking the gas;

adjusting the pressure of the gas within the uninterrupted gap based on the pressure detected in said step of detecting the pressure while packaging of the powders in the containers so as to adjust the amount of gas injected into the uninterrupted gap based on the pressure detected in said step of detecting the pressure of the gas within the uninterrupted gap; and selectively injecting a pressurized gas into the uninterrupted gap at a third location at the first distance from the inlet in said, step of sucking, wherein the pressurized gas flows in an opposite direction with respect to a direction generated by a combined action of said step of sucking and said step of injecting, whereby a desired degree of compacting of the powders is capable of being controlled and a constant flow rate maintained during the packaging of the Powders in the containers.

12. A method for compacting powder comprising the steps of:

feeding powder into a first filtering tube having a total length and an internal screw conveyor and having an inlet and an outlet;

forming an uninterrupted gap around the first filtering tube with a second tube placed around the first filtering tube between the inlet and the outlet;

placing a spiral within the uninterrupted gap to convey the gas;

sealing the uninterrupted gap between the inlet and the outlet;

sucking a gas from the uninterrupted gap at a first location adjacent the inlet at a first distance from the inlet less than half of the total length of the first filtering tube;

detecting a pressure of the gas within the uninterrupted gap resulting from said step of sucking the gas from the uninterrupted gap;

injecting a gas into the uninterrupted gap at a second location adjacent the outlet at a second distance from the inlet greater than half of the total length of the first filtering tube sufficient to partially compensate for the gas removed from the uninterrupted gap in said step of sucking the gas; and adjusting the pressure, of the gas within the uninterrupted gap based on the pressure detected in said step, of detecting the pressure while packaging of the powders in the containers so as to adjust the amount of gas injected into the uninterrupted gap based on the pressure detected in said step of detecting the pressure of the gas within the uninterrupted gap, whereby a desired degree of compacting of the powders is capable of being controlled and a constant flow rate maintained during the packaging of the powders in the containers.

13. System for packaging powders comprising:

a hopper having an outlet;

a first porous tube having a total length and an inlet adjacent the outlet of said hopper and an opposing outlet;

a screw conveyer extending through the outlet of said hopper and into said first porous tube;

a second tube placed around said first porous tube, wherein an uninterrupted gap is formed between an exterior surface of said first porous tube and an interior surface of said second tube, the uninterrupted gap having an upper seal and a lower seal;

a spiral placed within the uninterrupted gap between said first tube and said second tube configured so as to convey air from said second opening to said first opening;

a vacuum coupled to the uninterrupted gap adjacent the inlet of said first porous tube between the upper seal and the lower seal at a first distance from the inlet less than half of the total length of said first porous tube; and an adjustable gas regulator coupled to the uninterrupted gap adjacent the opposing outlet of said first porous tube between the upper seal and the lower seal at a second distance from the inlet greater than half of the total length of said first porous tube;

a pressure sensor positioned inside the uninterrupted gap, said pressure sensor generating a pressure signal representative of a pressure within the uninterrupted gap; and a controller coupled to said pressure sensor and said regulator and receiving the pressure signal from said pressure sensor, wherein said controller controls the regulator adjusting the amount of gas to be blown inside the uninterrupted gap depending upon the pressure signal to adjust the pressure within the uninterrupted gap so as to obtain a desired degree of compacting of the powders; and a pressurized air regulator capable of providing Pressurized air connected to the uninterrupted gap, whereby compactness of the powders dispensed from said first tube is capable of being controlled by adjusting said adjustable gas regulator and said vacuum facilitating accurate packaging of the powder.

* * * * *